United States Patent
Yamamoto

(10) Patent No.: US 7,487,151 B2
(45) Date of Patent: Feb. 3, 2009

(54) INFORMATION PROCESSING APPARATUS, INFORMATION PROCESSING METHOD, PROGRAM FOR IMPLEMENTING INFORMATION PROCESSING METHOD, INFORMATION PROCESSING SYSTEM, AND METHOD FOR INFORMATION PROCESSING SYSTEM

(75) Inventor: Noriyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 983 days.

(21) Appl. No.: 10/987,158

(22) Filed: Nov. 15, 2004

(65) Prior Publication Data
US 2005/0165782 A1     Jul. 28, 2005

(30) Foreign Application Priority Data
Dec. 2, 2003     (JP)     ............... 2003-403146

(51) Int. Cl.
G06F 17/00    (2006.01)
G06F 17/30    (2006.01)
G06F 7/00     (2006.01)
G06K 9/62     (2006.01)

(52) U.S. Cl. ................... 707/7; 707/E17.009

(58) Field of Classification Search ......... None
See application file for complete search history.

(56) References Cited

U.S. PATENT DOCUMENTS

| 6,816,150 B2 * | 11/2004 | Casebolt et al. | ............. | 345/166 |
| 6,822,758 B1 * | 11/2004 | Morino | ...................... | 358/1.9 |
| 6,834,387 B2 * | 12/2004 | Jeyachandran et al. | ...... | 709/207 |
| 6,850,229 B2 * | 2/2005  | Casebolt et al. | ............. | 345/173 |
| 6,850,252 B1 * | 2/2005  | Hoffberg | ................... | 715/716 |
| 6,873,706 B1 * | 3/2005  | Miyazaki et al. | ............. | 380/30 |

(Continued)

FOREIGN PATENT DOCUMENTS

EP     1 026 601 A2     8/2000

(Continued)

OTHER PUBLICATIONS

Boolean Logic and Alternative Information-Processing Devices Bourianoff, G.; Brewer, J.E.; Cavin, R.; Hutchby, J.A.; Zhirnov, V.; Computer vol. 41, Issue 5, May 2008 pp. 38-46 Digital Object Identifier 10.1109/MC.2008.145.*

(Continued)

Primary Examiner—Michael B Holmes
(74) Attorney, Agent, or Firm—Oblon, Spivak, McClelland, Maier & Neustadt, P.C.

(57) ABSTRACT

An information processing apparatus selects a proper content that well matches preference of a user and recommends it. A matrix calculator acquires M (one or more) feature vectors CCV whose elements are given by weight values assigned to a total of N (two or more) pieces of content meta information and context information. The matrix calculator produces a matrix CCM whose columns are given by the M feature vectors CCV and converts it into an approximate matrix CCM* by modifying the weight values of the respective elements of the M feature vectors CCV such that correlations of elements among the M feature vectors CCV are emphasized. Based on the approximate matrix CCM*, a user preference vector (UPV) generator produces a user preference vector UPV*. A matching unit calculates similarity between the user preference vector UPV* and a feature vector CCV produced from new content meta information or context information.

43 Claims, 32 Drawing Sheets

U.S. PATENT DOCUMENTS

| | | | | |
|---|---|---|---|---|
| 6,917,842 | B2* | 7/2005 | Shimizu et al. | 700/96 |
| 6,954,867 | B2* | 10/2005 | Casebolt et al. | 713/323 |
| 6,995,747 | B2* | 2/2006 | Casebolt et al. | 345/157 |
| 6,996,418 | B2* | 2/2006 | Teo et al. | 455/562.1 |
| 7,023,425 | B2* | 4/2006 | Casebolt et al. | 345/163 |
| 7,038,700 | B2* | 5/2006 | Kawaguchi et al. | 345/646 |
| 7,043,639 | B2* | 5/2006 | Mukogawa | 713/182 |
| 7,054,701 | B2* | 5/2006 | Shimizu et al. | 700/98 |
| 7,058,317 | B2* | 6/2006 | Yamazaki | 399/8 |
| 7,120,365 | B2* | 10/2006 | Yamazaki | 399/8 |
| 7,124,312 | B2* | 10/2006 | Casebolt et al. | 713/323 |
| 7,127,324 | B2* | 10/2006 | Batori et al. | 700/182 |
| 7,136,939 | B2* | 11/2006 | Kishimoto et al. | 710/8 |
| 7,139,718 | B2* | 11/2006 | Jeyachandran et al. | 705/8 |
| 7,146,502 | B2* | 12/2006 | Hayashi | 713/176 |
| 7,147,025 | B2* | 12/2006 | Kitora | 152/415 |
| 7,174,051 | B2* | 2/2007 | Kondo et al. | 382/299 |
| 7,181,017 | B1* | 2/2007 | Nagel et al. | 380/282 |
| 7,197,162 | B2* | 3/2007 | Murakami | 382/100 |
| 7,200,242 | B2* | 4/2007 | Murakami | 382/100 |
| 7,227,998 | B2* | 6/2007 | Nakayama et al. | 382/232 |
| 7,231,522 | B2* | 6/2007 | Murakami et al. | 713/176 |
| 7,269,272 | B2* | 9/2007 | Murakami | 382/100 |
| 7,277,894 | B2* | 10/2007 | Kondo et al. | 707/102 |
| 7,287,253 | B2* | 10/2007 | Yamamura et al. | 717/176 |
| 7,287,284 | B2* | 10/2007 | Hayashi | 726/32 |
| 7,305,448 | B2* | 12/2007 | Go | 709/207 |
| 7,315,821 | B2* | 1/2008 | Monchi et al. | 704/273 |
| 7,349,880 | B1* | 3/2008 | Kitao | 705/37 |
| 7,351,904 | B2* | 4/2008 | Tamori | 84/609 |
| 7,352,974 | B2* | 4/2008 | Yamazaki | 399/8 |
| 7,408,674 | B2* | 8/2008 | Moro et al. | 358/1.9 |
| 7,424,518 | B2* | 9/2008 | Go | 709/207 |
| 2003/0217047 | A1 | 11/2003 | Marchisio | |

FOREIGN PATENT DOCUMENTS

| | | |
|---|---|---|
| WO | WO 01/60064 A2 | 8/2001 |
| WO | WO 02/071265 A2 | 9/2002 |

OTHER PUBLICATIONS

Prospects for single molecule information processing devices Wada, Y.; Proceedings of the IEEE vol. 89, Issue 8, Aug. 2001 pp. 1147-1173 Digital Object Identifier 10.1109/5.940278.*

Prolog to prosepcts for single molecule information processing devices Esch, J.: Proceedings of the IEEE vol. 89, Issue 8, Aug. 2001 pp. 1145-1146 Digital Object Identifier 10.1109/JPROC.2001.940264.*

Nanoscale CMOS Wong, J.-S.P.; Frank, D.J.; Solomon, P.M.; Wann, C.H.J.; Welser, J.J.; Proceedings fo the IEEE vol. 87, Issue 4, Apr. 1999 pp. 537-570 Digital Object Identifier 10.1109/5.752515.*

An approach to computational complexity: nondiscrete biomolecular computing Rambidi, N.G.; Computer vol. 25, Issue 11, Nov. 1992 pp. 51-54 Digital Object Identifier 10.1109/2.166414.*

Application of quantum-based devices: trends and challenges Iafrate, G.J.; Stroscio, M.A.; Electron Devices, IEEE Transactions on vol. 43, Issue 10, Oct. 1996 pp. 1621-1625 Digital Object Identifier 10.1109/16.536805.*

Control system of PLS 2-GeV electron linac Ko, I. S.; Kim, J. H.; Choi, J.; Namkung, W.; Nuclear Science, IEEE Transactions on vol. 43, Issue 1, Part 1, Feb. 1996 pp. 25 Digital Object Identifier 10.1109/23.485999.*

The Phoenix framework: a practical architecture for programmable networks Putzolu, D.; Bakshi, S.; Yadav, S.; Yavatkar, R.; Communications Magazine, IEEE vol. 38, Issue 3, Mar. 2000 pp. 160-165 Digital Object Identifier 10.1109/35.825654.*

The triples rule Hoffman, R.R.; Hayes, P. Ford, K.M.; Hancock, P.; Intelligent Systems, IEEE vol. 17, Issue 3, May/Jun. 2002 pp. 62-65 Digital Object Identifier 10.1109/MIS.2002.1005633.*

Nanocomputing by field-coupled nanomagnets Csaba, G.; Imre, A.; Bernstein, G.H.; Porod, W.; Metlushko, V.; Nanotechnology, IEEE Transactions on vol. 1, Issue 4, Dec. 2002 pp. 209-213 Digital Object Identifier 10.1109/TNANO.2002.807380.*

Coupled resonator optical waveguides Mookherjea, S.; Yariv, A.; Selected Topics in Quantum Electronics, IEEE Journal of vol. 8, Issue 3, May-Jun. 2002 pp. 448-456 Digital Object Identifier 10.1109/JSTQE.2002.1016347.*

The excitonic quantum computer Rossi, F.; Nanotechnology, IEEE Transactions on vol. 3, Issue 1, Mar. 2004 pp. 165-172 Digital Object Identifier 10.1109/TNANO.2004.824018.*

Assessing random dynamical network architectures for nanoelectronics Teuscher, Christof; Gulbahce, Natali; Rohlf, Thimo; Nanoscale Architectures, 2008. NANOARCH 2008. IEEE International Symposium on Jun. 12-13, 2008 pp. 16-23 Digital Object Identifier 10.1109/NANOARCH.2008.4585787.*

Feasibility Study of Surface Acoustic Wave RFID for Information Processing Asset Management Byung Youn Song; Chattopadhyay, A.; Chu, P.; Prabhu, B.S.; Jae Yeol Lee; Gadh, R.; Junghoon Lee; RFID, 2008 IEEE International Conference on Apr. 16-17, 2008 pp. 19-26 Digital Object Identifier 10.1109/RFID.2008.4519375.*

Voice Command Recognition with Dynamic Time Warping (DTW) using Graphics Processing Units (GPU) with Compute Unified Device Architecture (CUDA) Poli, G.; Levada, A.L.M.; Mari, J.F.; Saito, J.H.; Computer Architecture and High Performance Computing, 2007. SBAC-PAD 2007. 19th International Symposium on Oct. 24-27, 2007 pp. 19-25.*

Power Deduction in Digital Signal Processing Circuit using Inventive CPL Subtractor Circuit Senthilpari, C.; Diwakar, K.; Prabhu, C.M. R.; Semiconductor Electronics, 2006. ICSE '06. IEEE International Conference on Oct. 29, 2006-Dec. 1, 2006 pp. 820-824 Digital Object Identifier 10.1109/SMELEC.2006.380751.*

Strongly Interacting Polaritions in Coupled Arrays of Cavities Hartmann, M.J.; Brandao, F.G.S.L.; Plenio, M.B.; Lasers and Electro-Optics, 2007 and the International Quantum Electronics Conference. CLEOE-IQEC 2007, European Conference on Jun. 17-22, 2007 pp. 1-1 Digital Object Identifier 10.1109/CLEOE-IQEC.2007.4386794.*

Bio-Microelectronic Information Processing Device Consisting of Natural Neurons on a CMOS Microsystem Hafizovic, S.; Heer, F.; Frey, U.; Ugniwenko, T.; Blau, A.; Ziegler, C.; Hierlemann, A.; Solid-State Sensors, Actuators and Microsystems Conference, 2007. Transducers 2007, International Jun. 10-14, 2007 pp. 1223-1226.*

Power and Thermal Management in VLSI Circuits Mohab, A.; Thermal Issues in Emerging Technologies: Theory and Application, 2007. THETA 2007. International Conference on Jan. 3-6, 2007 pp. 1-2 Digital Object Identifier 10.1109/THETA.2007.363398.*

Precise pulse width measurement in write pre-compensation test Okawara, H.; Test Conference, 2004. Proceedings. ITC 2004. International 2004 pp. 972-979 Digital Object Identifier 10.1109/TEST.2004.1387362.*

An improvable ferroelectric tactile sensor with acoustic running wave Todorova, V.; Mladenov, M.; Microelectronics, 2002. MIEL 2002. 23rd International Conference on vol. 1, May 12-15, 2002 pp. 269-272 vol. 1 Digital Object Identifier 10.1109/MIEL.2002.1003191.*

Capturing human judgment to simulate objective function Moroni, A.; Von Zuben, F.; Manzolli, J.; Mammana, A.; Evolutionary Computation, 2002, CEC '02. Proceedings of the 2002 Congress on vol. 1, May 12-17, 2002 pp. 529-534 Digital Object Identifier 10.1109/CEC.2002.1006290.*

The modified procedure analysis of the cardiac pulse sequences Koshelev, V.I.; Andrejev, V.G.; Voskresenskiy, A.V.; Electron Devices and Materials, 2002. SIBEDEM 2002. The IEEE-Siberian Conference on Mar. 19-20, 2002 pp. 61-62 Digital Object Identifier 10.1109/SIBEDM.2002.998067.*

Wireless communication of vital signs using the Georgia Tech Wearable Motherboard Firoozbakhsh, B.; Jayant, N.; Park, S.; Jayaraman, S.; Multimedia and Expo, 2000. ICME 2000. 2000 IEEE International Conference on vol. 3, Jul. 30-Aug. 2, 2000 pp. 1253-1256 vol.*

* cited by examiner

FIG. 2

| CONTEXT SELECTION | | |
|---|---|---|
| Place: COMPANY | DISPLAY CONTENT | APPLY CONTEXT |
| Occasion: WORKING | SEARCH MAILS | SEARCH WEB PAGES |
| Mental: FRESH | | |
| Emotional: HAPPY | | |
| Rating: IMPORTANT | | |

SELECTED CONTENT
From:○○○
To:□□□
Subject:PARTY ON JULY 16
Data:2003/07/14 12:30:00

Hello,
I think ABC is a good restaurant for the party on July 16. Please give me your opinion.

FIG. 5

| CONTENT META DATA/ CONTEXT DATA | | NUMBER OF OCCURRENCES | | | | | | |
|---|---|---|---|---|---|---|---|---|
| | | Doc1 | Doc2 | Doc3 | Doc4 | Doc5 | Doc6 | Doc7 |
| CONTENT META INFORMATION | KINDERGARTEN | 2 | 0 | 0 | 0 | 0 | 2 | 0 |
| | CHILD | 2 | 0 | 2 | 0 | 0 | 1 | 0 |
| | EARLY LEAVING | 1 | 0 | 0 | 0 | 0 | 0 | 1 |
| | URGENT | 0 | 1 | 0 | 0 | 1 | 0 | 0 |
| | CALL | 0 | 1 | 1 | 0 | 0 | 0 | 0 |
| | SEA | 0 | 0 | 0 | 1 | 0 | 0 | 0 |
| | PARTY | 0 | 0 | 0 | 1 | 0 | 0 | 0 |
| | BEER | 0 | 0 | 0 | 0 | 1 | 0 | 0 |
| | PATENT | 0 | 0 | 1 | 0 | 1 | 0 | 0 |
| | COLD | 0 | 0 | 0 | 0 | 0 | 1 | 1 |
| CONTEXT INFORMATION A | HOME | 0 | 1 | 0 | 1 | 1 | 1 | 0 |
| | COMPANY | 1 | 0 | 0 | 1 | 0 | 0 | 1 |
| CONTEXT INFORMATION B | RELAXED | 0 | 0 | 1 | 0 | 1 | 0 | 0 |
| | TENSE | 0 | 1 | 0 | 0 | 0 | 0 | 0 |
| | HAPPY | 1 | 0 | 1 | 0 | 0 | 0 | 0 |
| | SAD | 0 | 0 | 0 | 0 | 0 | 1 | 1 |
| | | ↓ | ↓ | ↓ | ↓ | ↓ | ↓ | ↓ |
| | | CCV₁ | CCV₂ | CCV₃ | CCV₄ | CCV₅ | CCV₆ | CCV₇ |

FIG. 7

|  | | Doc1 | Doc2 | Doc3 | Doc4 | Doc5 | Doc6 | Doc7 |
|---|---|---|---|---|---|---|---|---|
| | KINDERGARTEN | 2 | 0 | 0 | 0 | 0 | 2 | 0 |
| | CHILD | 2 | 0 | 2 | 0 | 0 | 1 | 0 |
| | EARLY LEAVING | 1 | 0 | 0 | 0 | 0 | 0 | 1 |
| | URGENT | 0 | 1 | 0 | 0 | 1 | 0 | 0 |
| | CALL | 0 | 1 | 0 | 0 | 0 | 0 | 0 |
| | SEA | 0 | 0 | 1 | 0 | 0 | 0 | 0 |
| | PARTY | 0 | 0 | 0 | 1 | 0 | 0 | 0 |
| D (CCM) | BEER | 0 | 0 | 0 | 1 | 0 | 0 | 0 |
| | PATENT | 0 | 0 | 0 | 0 | 1 | 0 | 0 |
| | COLD | 0 | 0 | 0 | 0 | 0 | 1 | 1 |
| | HOME | 0 | 0 | 1 | 0 | 0 | 1 | 0 |
| | COMPANY | 1 | 1 | 0 | 1 | 1 | 0 | 1 |
| | RELAXED | 0 | 0 | 0 | 1 | 0 | 0 | 0 |
| | TENSE | 0 | 1 | 0 | 0 | 1 | 0 | 0 |
| | HAPPY | 1 | 0 | 1 | 0 | 0 | 0 | 0 |
| | SAD | 0 | 0 | 0 | 0 | 0 | 1 | 1 |

FIG. 10

$$V = \begin{pmatrix} -0.75011 & 0.070705 & -0.36599 & 0.049638 & -0.50031 & -0.21358 & -1.46E-17 \\ -0.08075 & 0.62725 & 0.172939 & -0.2594 & 0.045963 & 0.026955 & -0.7071068 \\ -0.2591 & -0.07962 & -0.45351 & -0.29968 & 0.767191 & -0.20606 & -2.09E-17 \\ -0.06934 & 0.359533 & -0.12501 & 0.86867 & 0.299818 & 0.07631 & -1.05E-16 \\ -0.08075 & 0.62725 & 0.172939 & -0.2594 & 0.045963 & 0.026955 & 0.70710678 \\ -0.5781 & -0.25278 & 0.512503 & 0.006472 & 0.227967 & 0.535937 & -2.74E-16 \\ -0.13474 & -0.0928 & 0.567694 & 0.136078 & 0.122554 & -0.78576 & -6.56E-17 \end{pmatrix}$$

| Dk (CCM*) | Doc1 | Doc2 | Doc3 | Doc4 | Doc5 | Doc6 | Doc7 |
|---|---|---|---|---|---|---|---|
| KINDERGARTEN | 1.85961 | 0.036767 | 0.584367 | 0.016627 | 0.036767 | 1.777914 | 0.558081 |
| CHILD | 1.986116 | -0.04743 | 0.92603 | 0.177529 | -0.04743 | 1.054635 | -0.04938 |
| EARLY LEAVING | 0.58835 | 0.092475 | 0.139544 | 0.028192 | 0.092475 | 0.620495 | 0.235786 |
| URGENT | 0.083258 | 0.859743 | -0.21489 | 0.418994 | 0.859743 | -0.04649 | 0.101693 |
| CALL | 0.041629 | 0.429871 | -0.10745 | 0.209497 | 0.429871 | -0.02325 | 0.050846 |
| SEA | 0.354701 | -0.10745 | 0.279145 | 0.046034 | -0.10745 | -0.06252 | -0.21516 |
| PARTY | 0.123182 | 0.209497 | 0.046034 | 0.149698 | 0.209497 | -0.11487 | -0.09499 |
| BEER | 0.123182 | 0.209497 | 0.046034 | 0.149698 | 0.209497 | -0.11487 | -0.09499 |
| PATENT | 0.041629 | 0.429871 | -0.10745 | 0.209497 | 0.429871 | -0.02325 | 0.050846 |
| COLD | 0.114938 | 0.027601 | -0.27768 | -0.20986 | 0.027601 | 1.05306 | 0.741343 |
| HOME | 0.582898 | -0.13069 | 0.216627 | -0.06883 | -0.13069 | 0.598243 | 0.177141 |
| COMPANY | 0.908048 | 1.110869 | 0.185842 | 0.691875 | 1.110869 | 0.066837 | -0.10655 |
| RELAXED | 0.123182 | 0.209497 | 0.046034 | 0.149698 | 0.209497 | -0.11487 | -0.09499 |
| TENSE | 0.083258 | 0.859743 | -0.21489 | 0.418994 | 0.859743 | -0.04649 | 0.101693 |
| HAPPY | 1.05631 | -0.06582 | 0.633846 | 0.169215 | -0.06582 | 0.165678 | -0.32842 |
| SAD | 0.114938 | 0.027601 | -0.27768 | -0.20986 | 0.027601 | 1.05306 | 0.741343 |
| | CCV*$_1$ | CCV*$_2$ | CCV*$_3$ | CCV*$_4$ | CCV*$_5$ | CCV*$_6$ | CCV*$_7$ |

FIG. 15

| | | |
|---|---|---|
| | KINDERGARTEN | 0 |
| | CHILD | 0 |
| | EARLY LEAVING | 0 |
| | URGENT | 0 |
| | CALL | 0 |
| | SEA | 0 |
| | PARTY | 0 |
| cCCV | BEER | 0 |
| | PATENT | 0 |
| | COLD | 0 |
| | HOME | 1 |
| | COMPANY | 0 |
| | RELAXED | 0 |
| | TENSE | 0 |
| | HAPPY | 1 |
| | SAD | 0 |

FIG. 16

| UPV* | $CCV^*_1$ | $CCV^*_2$ | $CCV^*_3$ | $CCV^*_4$ | $CCV^*_5$ | $CCV^*_6$ | $CCV^*_7$ |
|---|---|---|---|---|---|---|---|
| SIMILARITY | 0.862033 | −0.18318 | 0.998422 | 0.158176 | −0.18318 | 0.475417 | −0.19423 |

INFORMATION PROCESSING APPARATUS, INFORMATION PROCESSING METHOD, PROGRAM FOR IMPLEMENTING INFORMATION PROCESSING METHOD, INFORMATION PROCESSING SYSTEM, AND METHOD FOR INFORMATION PROCESSING SYSTEM

BACKGROUND OF THE INVENTION

1. Field of the Invention

The present invention relates to an information processing apparatus, an information processing method, a program for implementing an information processing method, an information processing system, and a method for an information processing system, and more particularly, to an information processing apparatus, an information processing method, a program for implementing an information processing method, an information processing system, and a method for an information processing system, in which information indicating preference of a user is used in calculation of similarity to properly select a content to be recommended to the user.

2. Description of the Related Art

It is known to select a content such as a television or radio broadcast program that matches preference of a user on the basis of content information such as an EPG (Electronic Program Guide) and recommend the selected content to the user. Hereinafter, a television or radio broadcast program will be referred simply as a program unless confused with a computer program. Various methods are known to acquire information indicating the preference of a user, and a content is recommended to the user in various manners depending on the method of acquiring information indicating the preference of the user. For example, television broadcast programs viewed by a user is logged, and a program is recommended based on the log data.

In this technique, each time a program is viewed by a user, meta data associated with the viewed program is stored. When the amount of stored meta data has reached a particular level, a weight is assigned to each meta data (or data indicating an attribute that is common to a plurality of program meta data) depending on the frequency of occurrence or by means of tf/idf method. A vector is then produced for each program meta data such that elements of the vector are given by the respective weights (hereinafter, such a vector will be referred to as a feature vector). Furthermore, a vector indicating preference of the user (hereafter, referred to as a user preference vector) is produced based on one or more feature vectors. In the conventional technique based on program viewing log data, the user preference vector is used as information indicating the preference of the user. The similarity of a content meta vector associated with a candidate program (vector whose elements are given by weights assigned to program meta data of the candidate program) relative to the user preference vector. If it is determined that the similarity is high, the candidate program is recommended to the user.

In this conventional technique based on the program viewing log data, the number of dimensions (the number of elements) of the user preference vector increases and thus the complexity of operation increases with increasing types of contents (TV programs) (that is, with the number of program meta data). To solve the above problem, various techniques are known to reduce the number of dimensions.

For example, it is known to project all vectors onto optimum bases (axes) by means of singular value decomposition (principal component analysis) thereby reducing the number of dimensions (for example, refer to (1) Japanese Unexamined Patent Application Publication No. 2001-155063, (2) "Computer information retrieval using latent semantic structure", U.S. Pat. No. 4,839,853, Jun. 13, 1989, (3) "Computerized cross-language document retrieval using latent semantic indexing", U.S. Pat. No. 5,301,109, Apr. 5, 1994).

However, in the conventional technique based on the program viewing log data, the user preference vector (used as a reference in calculation of similarity of a candidate program) does not necessarily indicate correct preference of a user, and thus a content (TV program) recommended based on the user preference vector is often refused by the user.

SUMMARY OF THE INVENTION

In view of the above, it is an object of the present invention to provide a technique of using information correctly indicating the preference of the user in calculation of similarity of a content to be recommended.

In an aspect, the present invention provides an information processing apparatus comprising modification means for acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1, generation means for generating a reference information set including N pieces of individual information produced based on the M information sets each including N pieces of individual information modified by the modification means, and similarity calculation means for acquiring, as a comparative information set, a new information set including N individual information elements and calculating the similarity of the comparative information set with respect to the reference information set produced by the generation means.

The N pieces of individual information of each of the M information sets acquired via the modification means may include at least one or more pieces of content meta information indicating a particular content or a part of the particular content or indicating an attribute of the content and also include at least one or more pieces of context information indicating an internal or external state in which the content was used by the user.

The context information may include a value or a normalized value thereof assigned as a weight value to location information indicating a spatial location of the user.

The context information may include a value or a normalized value thereof assigned as a weight value to emotion information indicating emotion of the user.

The context information may include a value acquired by the user or by a sensor disposed in the vicinity of the user or a normalized value thereof.

The modification means may include vectorization means for, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information, and matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, wherein the generation means may produce the reference information set including N elements, based on the M columns of the second matrix produced by the matrix generation means, and the similarity calculation means may produce a comparative vector including N elements from the comparative information set and calculates the similarity between the comparative vector and the reference vector produced by the generation means.

The generation means may select at least one or more columns of the M columns of the second matrix and add elements in each row over all selected columns thereby producing the reference vector.

The generation means may select, from the M columns of the second matrix, columns having high similarity to each other in terms of an element corresponding to context information and add elements in each row over all selected columns thereby producing the reference vector.

The generation means may select, from the M columns of the first matrix, columns having high similarity to each other in terms of an element corresponding to context information, and further select, from the second matrix, columns corresponding to the selected columns of the first matrix and add elements in each row over all columns selected from the second matrix thereby producing the reference vector.

The generation means may produce reference vectors by directly employing the respective M columns of the second matrix produced by the matrix generation means.

The vectorization means may assign the weight value to each of the N pieces of individual information by using the frequency of occurrence of each of the N pieces of individual information in the content or based on a normalized value of the frequency of occurrence.

The vectorization means may produce a feature vector whose elements are respectively given by products of the weight values assigned to the respective N pieces of individual information and N variable coefficients.

The similarity calculation means may calculating the similarity by acquiring, as the comparative information, an information set including N pieces of individual information associated with a new content, assigning a weight value to each of the N pieces of individual information, producing a comparative vector whose elements are given by the weight values assigned to the N pieces of individual information, and calculating the similarity between the comparative vector and the reference vector, and the image processing apparatus may further comprise presentation means for, if the similarity calculated by the similarity calculation means is equal to or higher than a threshold value, presenting the new content as a recommended content to the user.

When the presentation means presents the recommended content to the user, the presentation means may also present a reason for the recommendation based on the reference vector.

The similarity calculation means may calculate the similarity by before the comparative vector is produced, further acquiring an information set including N pieces of individual information associated with a content being currently used by the user, assigning weight values to the respective N pieces of individual information, producing a feature vector whose elements are given by the weight values assigned to the respective N pieces of individual information for the content being currently used by the user, calculating similarity between the produced feature vector and one or more reference vectors produced by the generation means, producing a new reference vector based on a reference vector having similarity equal to or higher than a threshold value, and after the comparative vector is produced, calculating similarity between the reference vector and the comparative vector.

The similarity calculation means may calculate the similarity by before the comparative vector is produced, further acquiring one or more pieces of context information indicating a current context in which the user is, assigning weight values to the respective pieces of context information, producing a current context feature vector whose elements corresponding to the respective pieces of context information are given by the assigned weight values and the other elements are given by 0, calculating similarity between the current context feature vector and one or more reference vectors produced by the generation means, producing a new reference vector based on a reference vector having similarity equal to or higher than a threshold value, and after the comparative vector is produced, calculating similarity between the reference vector and the comparative vector.

The matrix generation means may produce the second matrix by decomposing the first matrix into the product of a first component matrix with N rows and N columns, a second component matrix with N rows and M columns, and a transpose of a third component matrix with M rows and M columns, producing a fourth component matrix with N rows and K columns from the first component matrix (where K is an integer less than the rank of the first matrix), producing a fifth component matrix with K rows and K columns from the second component matrix, and producing a sixth component matrix with M rows and K columns from the third component matrix, and producing the second matrix given by the product of the fourth component matrix, the fifth component matrix, and the transpose of the sixth component matrix.

The similarity calculation means may calculate the similarity by acquiring, as the comparative information, an information set including N pieces of individual information associated with a new content, assigning weight values to the respective N pieces of individual information, producing the comparative feature vector whose elements are given by the weight values assigned to the respective N pieces of individual information, converting the comparative vector and the reference vector into vectors whose dimension is reduced to K by multiplying the comparative vector and the reference vector by the transpose of the fourth component matrix from left, and calculating similarity between the comparative vector with dimensions reduced to K and the reference vector with dimensions reduced to K, wherein the image processing apparatus may further comprise presentation means for, if the similarity calculated by the similarity calculation means is equal to or higher than a threshold value, presenting the new content as a recommended content to the user.

When the presentation means presents the recommended content to the user, the presentation means may also present a reason for the recommendation based on the reference vector.

The similarity calculation means may calculate the similarity by before the comparative vector is produced, further acquiring an information set including N pieces of individual information associated with a content being currently used by the user, assigning weight values to the respective N pieces of individual information, producing a feature vector whose elements are given by the weight values assigned to the respective N pieces of individual information for the content being currently used by the user, converting the produced feature vector and one or more reference vectors into vectors whose dimension is reduced to K by multiplying the feature vector and the one or more reference vectors by the transpose of the fourth component matrix from left, calculating similarity between the feature vector with dimensions reduced to K and the one or more reference vectors with dimensions reduced to K, and producing a new K-dimensional reference vector based on a reference vector with reduced dimensions having similarity equal to or higher than a threshold value, after the comparative vector is produced, converting the comparative vector into a vector whose dimension is reduced to K by multiplying the comparative vector by the transpose of the fourth component matrix from left, and calculating similarity between the new K-dimensional reference vector and the comparative vector with dimensions reduced to K.

The similarity calculation means calculates the similarity by before the comparative vector is produced, further acquiring one or more pieces of context information indicating a current context in which the user is, assigning weight values to the respective pieces of context information, producing a current context feature vector whose elements corresponding to the respective pieces of context information are given by the assigned weight values and the other elements are given by 0, converting the current context feature vector and one or more reference vectors produced by the generation means into vectors whose dimension is reduced to K by multiplying the current context feature vector and the one or more reference vectors by the transpose of the fourth component matrix from left, calculating similarity between the current context feature vector with dimensions reduced to K and the one or more reference vectors with dimensions reduced to K, and producing a new K-dimensional reference vector based on a reference vector with reduced dimensions having similarity equal to or higher than a threshold value, after the comparative vector is produced, converting the comparative vector into a vector whose dimension is reduced to K by multiplying the comparative vector by the transpose of the fourth component matrix from left, and calculating similarity between the new K-dimensional reference vector and the comparative vector with dimensions reduced to K.

Each time a feature vector is produced, the vectorization means may classify the produced feature vector as either a positive-preference feature vector indicating a positive preference factor of the user or a negative-preference feature vector indicating a negative preference factor of the user.

The matrix generation means may produce the second matrix using the M positive-preference feature vectors produced by the vectorization means.

The information processing apparatus may further comprise learning means for producing a classifier by learning classification using, as training data, columns of the second matrix produced by the matrix generation means, and classification means for making classification by acquiring an information set including N pieces of individual information associated with a new content, producing a feature vector whose elements are given by the weight values assigned to the respective N pieces of individual information for the new content, and classifying, using the classifier produced by the learning means, the feature vector associated with the new content as either a positive-preference feature vector or a negative-preference feature vector.

The similarity calculation means may employ as the comparative vector the feature vector classified by the classification means as the positive-preference feature vector, and calculate similarity between the comparative vector and the reference vector.

The information processing apparatus may further comprise registration means for selecting one or more particular elements of columns of the second matrix produced by the matrix generation means, and registers a word identifying each selected element as a word of interest to the user or a word of non-interest to the user in a personal dictionary of the user.

When M negative-preference feature vectors are produced by the vectorization means, the matrix generation means may further produce a second matrix using the M negative-preference feature vectors, the generation means may produce a first reference vector from the second matrix produced by the matrix generation means based on the M positive-preference feature vectors produced by the matrix generation means, and further produce a second reference vector from the second matrix produced by the matrix generation means based on the negative-preference feature vectors, and the similarity calculation means may calculate first similarity between the comparative vector and the first reference vector and also calculate second similarity between the comparative vector and the second reference vector.

The similarity calculation means may acquire, as the comparative information, an information set including N pieces of individual information associated with a new content, assign a weight value to each of the N pieces of individual information, produce a comparative vector whose elements are given by the weight values assigned to the N pieces of individual information, and calculate the first similarity and the second similarity, and the information processing apparatus may further comprise presentation means for determining whether the new content is suitable as a content to be recommended based on the first similarity and the second similarity calculated by the similarity calculation means, and, if the new content is determined to be suitable, presenting the new content as the recommended content to the user.

When the presentation means presents the recommended content to the user, the presentation means may also present a reason for the recommendation based on the reference vector.

If the first similarity is equal to or higher than a first threshold value and the second similarity is lower than a second threshold value, the presentation means may determine that the new content is suitable as the content to be recommended and present the new content as the recommended content to the user.

If the first similarity is equal to or higher than the second similarity and the second similarity is lower than a threshold value, the presentation means may determine that the new content is suitable as the content to be recommended and presents the new content as the recommended content to the user.

In an aspect, the present invention provides an information processing method comprising a modification step of acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1, a generation step of generating a reference information set including N pieces of individual information for use as a reference in a calculation of similarity, from the M information sets each including N pieces of individual information modified in the modification step; and a similarity calculation step of acquiring, as a comparative information set, a new information set including N individual information elements and calculating the similarity of the comparative information set with respect to the reference information set produced in the generation step.

In an aspect, the present invention provides a program executed by a computer, comprising a modification step of acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1, a generation step of generating a reference information set including N pieces of individual information for use as a reference in a calculation of similarity, from the M information sets each including N pieces of individual information modified in the modification step, and a similarity calculation step of acquiring, as a comparative information set, a new information set including N individual information elements and calculating the similarity of the comparative information set with respect to the reference information set produced in the generation step.

In the information processing apparatus, the information processing method, and the program described above, when $M (\geqq 1)$ information set including $N (\geqq 2)$ pieces of individual information is acquired, the N pieces of individual information of each of the M information set are modified, at least partially, such that correlations among the N pieces of individual information are emphasized. A reference information set including N pieces of individual information for use as a reference in a calculation of similarity is then produced from the M information sets each including modified N pieces of individual information. Thereafter, if a new information set including N pieces of individual information is given, the similarity of this new information set with respect to the reference information set is calculated.

In an aspect, the present invention provides an information processing apparatus comprising vectorization means for, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, reference vector generation means for producing a reference vector including N elements for use as a reference in calculation of similarity, from the M columns of the second matrix produced by the matrix generation means, candidate acquisition means for, each time a reference vector is produced by the reference vector generation means, acquiring a candidate for a content to be recommended to a user, based on the reference vector, similarity calculation means for acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced by the reference vector generation means, and presentation means for selecting, from candidate contents acquired by the candidate acquisition means, a candidate content corresponding to a reference vector whose similarity calculated by the similarity calculation means is equal to or higher than a threshold value and presenting the selected candidate content as a recommended content to the user.

In an aspect, the present invention provides an information processing method comprising a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, a reference vector generation step of producing a reference vector including N elements for use as a reference in calculation of similarity, from the M columns of the second matrix produced in the matrix generation step, a similarity calculation step of acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced in the reference vector generation step, and a presentation step of selecting, from candidate contents acquired in the candidate acquisition step, a candidate content corresponding to a reference vector whose similarity calculated by the similarity calculation means is equal to or higher than a threshold value and presenting the selected candidate content as a recommended content to the user.

In an aspect, the present invention provides a program executed by a computer, comprising a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, a reference vector generation step of producing a reference vector including N elements for use as a reference in calculation of similarity, from the M columns of the second matrix produced in the matrix generation step, a similarity calculation step of acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced in the reference vector generation step, and a presentation step of selecting, from candidate contents acquired in the candidate acquisition step, a candidate content corresponding to a reference vector whose similarity calculated by the similarity calculation means is equal to or higher than a threshold value and presenting the selected candidate content as a recommended content to the user.

In the information processing apparatus, the information processing method, and the program described above, each time a content is used by a user, an information set including N pieces of individual information associated with the content is acquired, weight values are assigned to the respective N pieces of individual information, and a feature vector whose elements are given by the weight values assigned to the respective N pieces of individual information is produced for the content. When M feature vectors have been produced in the above-described manner, a first matrix with N rows and M columns is produced such that the columns of the matrix are given by the respective M feature vectors. An operation is then performed on the first matrix so as to convert the first matrix into a second matrix whose N×M elements are at least partially modified such that correlations among N row elements of each of the M columns are emphasized. A reference vector including N elements for use as a reference in calculation of similarity is then produced based on the M columns of the second matrix. Each time a reference vector is produced in the above-described manner, a candidate for a content to be recommended to a user is determined based on the reference vector. When an information set including N pieces of individual information associated with a new content is acquired, weight values are assigned to the respective N pieces of individual information, and a comparative feature vector whose elements are given by the weight values assigned to the respective N pieces of individual information is produced. Furthermore, similarity between the comparative vector and one or more reference vectors is calculated. A content corresponding to a reference vector having similarity equal to or higher than a threshold value is selected and recommended to the user.

In an aspect, the present invention provides an information processing apparatus comprising vectorization means for, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, and genre setting means for calculating similarity among the M columns of the second matrix produced by the matrix generation means, classifying each of the M columns based on the calculated similarity, and setting each class obtained in the classification as a genre.

The genre setting means may produce a classifier by learning classification for each genre by using columns belonging to the genre as training data, and the information processing apparatus may further comprise classification means for making classification by acquiring an information set including N pieces of individual information associated with a new content, assigning weight values to the respective N pieces of individual information, producing a feature vector whose elements are given by the weight values assigned to the respective N pieces of individual information for the new content, and classifying, using the classifier produced by the genre setting means, the feature vector associated with the new content as being one of the genres set by the genre setting means.

Each time the genre setting means sets one genre, the genre setting means may select an element from columns belonging to the genre and assign a name to the genre based on the selected element.

In an aspect, the present invention provides an information processing method comprising a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, and a genre setting step of calculating similarity among the M columns of the second matrix produced in the matrix generation step, classifying each of the M columns based on the calculated similarity, and setting each class obtained in the classification as a genre.

In an aspect, the present invention provides a program comprising a vectorization step of, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, and a genre setting step of calculating similarity among the M columns of the second matrix produced in the matrix generation step, classifying each of the M columns based on the calculated similarity, and setting each class obtained in the classification as a genre.

In the information processing apparatus, the information processing method, and the program described above, each time a content is used by a user, an information set including N pieces of individual information associated with the content is acquired, weight values are assigned to the respective N pieces of individual information, and a feature vector whose elements are given by the weight values assigned to the respective N pieces of individual information is produced for the content. When M feature vectors have been produced in the above-described manner, a first matrix with N rows and M columns is produced such that the columns of the matrix are given by the respective M feature vectors. An operation is then performed on the first matrix so as to convert the first matrix into a second matrix whose N×M elements are at least partially modified such that correlations among N row elements of each of the M columns are emphasized. Similarity among the M columns of the second matrix is then calculated, and each of the M columns is classified based on the calculated similarity. Each class obtained in the classification is set as a genre.

In an aspect, the present invention provides an information processing system including a server and a client used by a user, comprising vectorization means for, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, reference vector generation means for producing a reference vector including N elements for use as a reference in calculation of similarity, from the M columns of the second matrix produced by the matrix generation means, and similarity calculation means for calculating similarity by acquiring a new information set including N pieces of individual information, assigning weight values to the respective N pieces of individual information, producing a comparative feature vector whose elements are given by the weight values assigned to the respective N pieces of individual information, and calculating similarity between the comparative vector and the reference vector produced by the reference vector generation means, wherein of the vectorization means, the matrix generation means, the reference vector generation means, and the similarity calculation means, at least the matrix generation means is included in the server.

In an aspect, the present invention provides an information processing method for an information processing system including a server and a client used by a user, comprising a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, a reference vector generation step of producing a reference vector including N elements for use as a reference in calculation of similarity, from the M columns of the second matrix produced in the matrix generation step, a similarity calculation step of calculating similarity comprising the substeps of acquiring a new information set including N pieces of individual information, assigning weight values to the respective N pieces of individual information, producing a comparative feature vector whose elements are given by the weight values assigned to the respective N pieces of individual information, and calculating similarity between the comparative vector and the reference vector produced in the reference vector generation step, wherein of the vectorization step, the matrix generation step, the reference vector generation step, and the similarity calculation step, at least the matrix generation step is performed by the server.

In the information processing system and the method therefor described above, at least first to fourth processes described below by the server and/or the client. The first process includes the step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information. The second process includes the step of, when M feature vectors are produced in the first process, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized. The third process includes the step of producing a reference vector including N elements for use as a reference in calculation of similarity, from the M columns of the second matrix produced in the second process. The fourth process includes the step of calculating similarity comprising the substeps of acquiring a new information set including N pieces of individual information, assigning weight values to the respective N pieces of individual information, producing a comparative feature vector whose elements are given by the weight values assigned to the respective N pieces of individual information, and calculating similarity between the comparative vector and the reference vector produced in the third process. Of these first to fourth processes, the second process including the calculation of matrices is performed by the server.

As described above, the present invention allows a correct content to be recommended to a user by using information correctly indicating preference of the user in calculation of similarity to select the content.

BRIEF DESCRIPTION OF THE DRAWINGS

FIG. 2 is a diagram showing an example of a screen for use to input context information;

FIG. 5 is a diagram showing an example of a feature vector whose elements are given by content meta information and context information;

FIG. 7 is a diagram showing a matrix whose columns are given by respective feature vectors shown in FIG. 5;

FIG. 10 is a diagram showing one of component matrices obtained by singular value decomposition of the matrix shown in FIG. 7;

FIG. 11 is a diagram showing a matrix (an approximate matrix of the matrix shown in FIG. 5) obtained from the matrix shown in FIG. 5 by means of singular value decomposition and reduction in dimension;

FIG. 15 is a figure showing an example of a current context feature vector produced from current context information;

FIG. 16 is a diagram showing an example of a result of a calculation of similarity of the current context feature vector shown in FIG. 15 with respect to each of feature vectors (columns of the approximate matrix) shown in FIG. 11;

DESCRIPTION OF THE PREFERRED EMBODIMENTS

Figure 1:
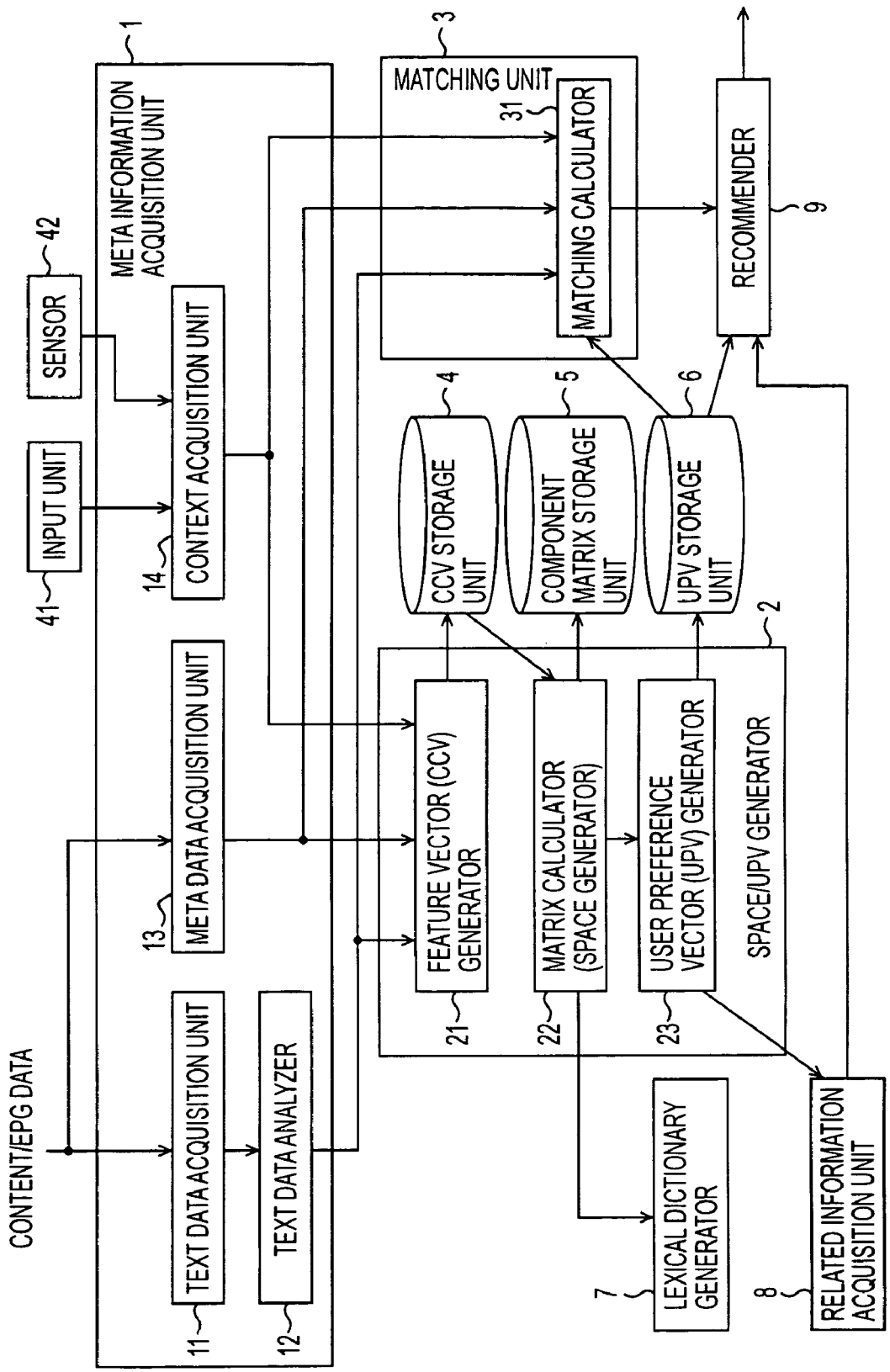
FIG. 1 is a functional block diagram of an information processing apparatus according to an embodiment of the present invention.

Before preferred embodiments of the present invention are described, correspondence between specific examples of parts/steps in the preferred embodiments and those in the respective claims is described. Note that the purpose of the following description is to indicate that specific examples corresponding to the respective claims are described in the preferred embodiments, and thus the purpose of the following description is not to limit specific examples of the respective claims to those given below in the description of the correspondence. That is, a part/step, which is described in the preferred embodiments but which is not described in the following description of the correspondence, can be a part/step corresponding to a part/step of a particular claim. Conversely, a specific example of a part/step that is described in the following description of the correspondence can correspond to a part/step of a claim different from the part/step described in the following description of the correspondence.

Also note that it should not be understood, from the following description of correspondence, that all specific examples described in the preferred embodiments are described in claims. In other words, the following description of correspondence does not deny the possibility that there can be a claim that correspond to a specific example described in the preferred embodiments but that is not included in the current claims, that is, the following description of correspondence does not deny the possibility that there can be a future claim presented by means of division or amendment of application.

Now the correspondence is described below. In an aspect, the present invention provides an information processing apparatus (for example, an information processing apparatus shown in FIG. 1, 18 or 26 (in the following description of correspondence, it is assumed that the information processing apparatus shown in FIG. 1 corresponds to the information processing apparatus in this aspect, unless otherwise described), comprising modification means (for example, a feature vector (CCV) generator 21 and a matrix calculator (space generator) 22 shown in FIG. 1) for acquiring M information sets each including N pieces of individual information (for example, a total of 16 pieces of content meta information, context information A and context information B shown in FIG. 5) and modifying at least partially the N pieces of individual information of each of the M information sets (for example, a matrix D (CCM) (FIG. 7) produced based on information shown in FIG. 5 is converted into a matrix $D_k$ (CCM*) shown in FIG. 11) such that correlations among the N pieces of individual information are emphasized (for example, a correlation between a word "kindergarten" and a word "child" or a correlation between content meta information and context information A in FIG. 5 is emphasized) where N is an integer equal to or greater than 2 and M is an integer equal to or greater than 1, generation means (for example, a user preference vector (UPV) generator 23 shown in FIG. 1) for generating a reference information set (for example, a user preference vector UPV*) for use as a reference in a calculation of similarity, the reference information set including N pieces of individual information produced based on the M information sets (for example, columns (feature vectors) CCV*1 to CCV*7 of a matrix $D_k$ (CCM*) shown in FIG. 11) each including N pieces of individual information modified by the modification means; and similarity calculation means (for example, a matching unit 3 or a matching calculator 31 shown in FIG. 1) for acquiring, as a comparative information set, a new information set including N individual information elements and calculating the similarity of the comparative information set with respect to the reference information set produced by the generation means.

In this information processing apparatus, the N pieces of individual information of each of the M information sets acquired via the modification means may include at least one or more pieces of content meta information (an example is shown in FIG. 5 in which content meta information is a word such as a "kindergarten" that appears in an e-mail message given as a content) indicating a particular content or a part of the particular content or indicating an attribute of the content and also include at least one or more pieces of context information indicating an internal or external state in which the content was used by the user (in the example in which the e-mail message is given as the content, an example of the external state is a spatial position where the e-mail was read by the user (context information A in FIG. 5) and an example of the internal state is an emotional state in which the e-mail was read by the user (context information B in FIG. 5))

In this information processing apparatus, the context information may include a value acquired by the user or by a sensor (for example, sensor 42 shown in FIG. 1) disposed in the vicinity of the user or a normalized value thereof.

In this information processing apparatus, the modification means may include vectorization means (for example, a feature vector (CCV) generator 21 shown in FIG. 1) for, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information (for example, vectors CCV1 to CCV7 shown in FIG. 5), and matrix generation means (for example, a matrix calculator (space generator) 22 shown in FIG. 1) for, when M feature vectors are produced by the vectorization means, producing a first matrix having N rows and M columns (for example, a matrix D (CCM) shown in FIG. 7) such that the elements thereof are given by the M feature vectors, performing an operation (for example, singular value decomposition and dimension reduction) on the first matrix so as to convert the first matrix into a second matrix (for example, a matrix $D_k$ (CCM*) shown in FIG. 11) whose N×M elements are at least partially modified such that correlations among N row elements of each of the M columns are emphasized, wherein the generation means produces a reference vector including N elements (for example, a user preference vector UPV*) as the reference information set, based on the M columns of the second matrix produced by the matrix generation means, and the similarity calculation means produces a comparative vector including N elements (for example, a feature vector CCV associated with a new content) from the comparative information set and calculates the similarity between the comparative vector and the reference vector produced by the generation means.

In this information processing apparatus, the similarity calculation means may calculate the similarity by acquiring, as the comparative information, an information set including N pieces of individual information associated with a new content, assigning a weight value to each of the N pieces of individual information, producing a comparative vector (for example, a feature vector CCV associated with a new content) whose elements are given by the weight values assigned to the N pieces of individual information, and calculating the similarity between the comparative vector and the reference vector, and the image processing apparatus may further comprise presentation means (for example, a recommender 9 shown in FIG. 1) for, if the similarity calculated by the similarity calculation means is equal to or higher than a threshold value, presenting the new content as a recommended content to the user.

In this information processing apparatus, the matrix generation means may produce the second matrix by decomposing the first matrix (for example, according to equation (1)) into the product of a first component matrix with N rows and N columns (for example, a component matrix U shown in FIG. 8), a second component matrix with N rows and M columns (for example, a component matrix Σ shown in FIG. 9), and a transpose of a third component matrix with M rows and M columns (for example, a component matrix V shown in FIG. 10), producing a fourth component matrix with N rows and K columns (for example, a component matrix $U_k$ shown in FIG. 8) from the first component matrix (where K is an integer less than the rank of the first matrix), producing a fifth component matrix with K rows and K columns (for example, a component matrix $Σ_k$ shown in FIG. 9) from the second component matrix, producing a sixth component matrix with M rows and K columns (for example, a component matrix $V_k$ shown in FIG. 10) from the third component matrix, and producing the second matrix (for example, a matrix $D_k$ (CCM*) shown in FIG. 11) given by the product (for example, the right-hand side of equation (2)) of the fourth component matrix, the fifth component matrix, and the transpose of the sixth component matrix.

In the information processing apparatus (for example, information processing apparatus shown in FIG. 18), the similarity calculation means (for example, a projection matching unit 101 shown in FIG. 18) calculates the similarity by acquiring, as the comparative information, an information set including N pieces of individual information associated with a new content, assigning a weight value to each of the N pieces of individual information, producing the comparative feature vector whose elements are given by the weight values assigned to the respective N pieces of individual information, converting the comparative vector and the reference vector into vectors whose dimension is reduced to K by multiplying the comparative vector and the reference vector by the transpose of the fourth component matrix from left, and calculating similarity between the comparative vector with dimensions reduced to K and the reference vector with dimensions reduced to K, wherein the image processing apparatus may further comprise presentation means (for example, a recommender 9 shown in FIG. 18) for, if the similarity calculated by the similarity calculation means is equal to or higher than a threshold value, presenting the new content as a recommended content to the user.

Figure 26:
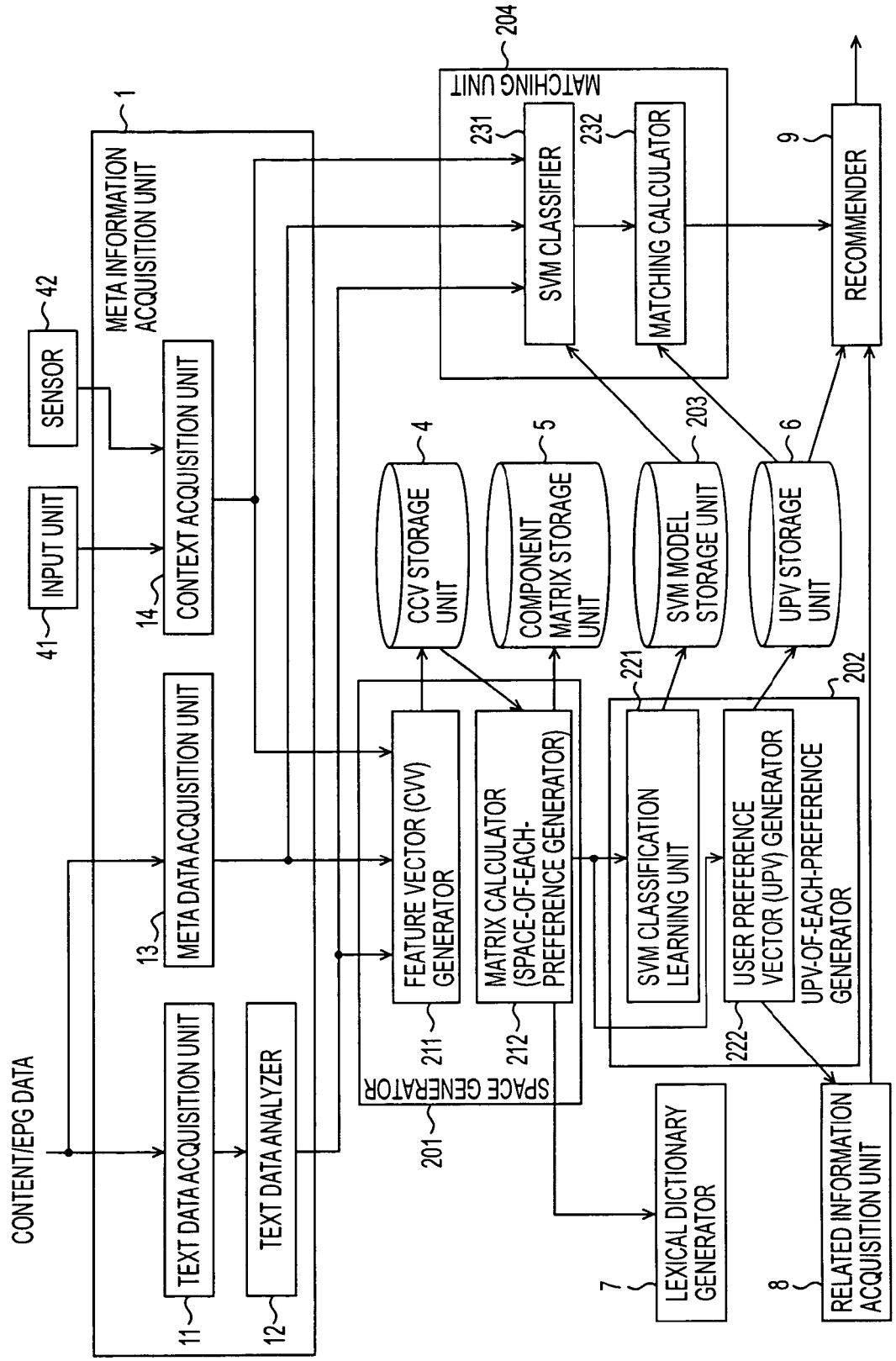
FIG. 26 is a functional block diagram of an information processing apparatus according to another embodiment of the present invention.

In the present information processing apparatus (for example, information processing apparatus shown in FIG. 26), each time a feature vector is produced, the vectorization means (for example, a feature vector (CCV) generator 211 shown in FIG. 26) classifies the produced feature vector as either a positive-preference feature vector indicating a positive preference factor of the user or a negative-preference feature vector indicating a negative preference factor of the user.

In the present information processing apparatus (for example, information processing apparatus shown in FIG. 26), the matrix generation means (for example, a matrix calculator (preference-specific space generator) shown in FIG. 26) may produce the second matrix using the M positive-preference feature vectors produced by the vectorization means.

Figure 28:
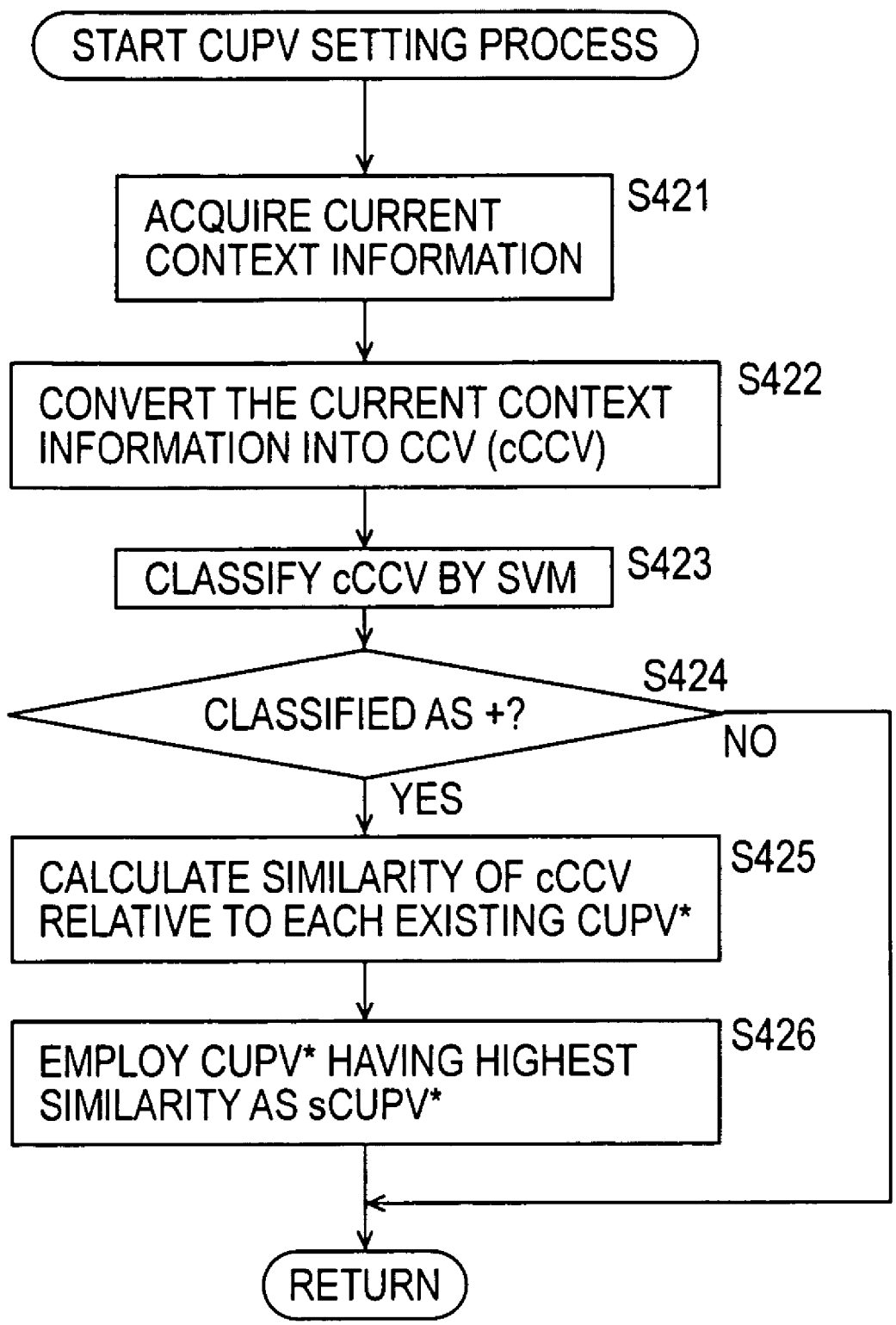
FIG. 28 is a flow chart showing an example of a CUPV setting process in the content recommendation process shown in FIG. 13 performed by the information processing apparatus shown in FIG. 2-6.

The present information processing apparatus (for example, information processing apparatus shown in FIG. 26) may further comprise learning means (for example, SVM classification learning unit 221 shown in FIG. 26) for producing a classifier (for example, SVM model storage unit 203 shown in FIG. 26) by learning classification using, as training data, columns of the second matrix produced by the matrix generation means, and classification means (for example, SVM classifier 231 shown in FIG. 26) for making classification by acquiring an information set including N pieces of individual information associated with a new content, assigning a weight value to each of the N pieces of individual information, producing a feature vector whose elements are given by the weight values assigned to the respective N pieces of individual information for the new content, and classifying, using the classifier produced by the learning means, the feature vector associated with the new content as either a positive-preference feature vector (in the present description, also denoted as "classified positively" as in FIG. 28) or a negative-preference feature vector (in the present description, also denoted as "classified negatively").

The present information processing apparatus (for example, information processing apparatus shown in FIG. 26) may further comprise registration means (for example, lexical dictionary generator 7 shown in FIG. 26) for selecting one or more particular elements of columns of the second matrix produced by the matrix-generation means, and registers a word identifying each selected element as a word of interest to the user or a word of non-interest to the user in a personal dictionary of the user.

In the present information processing apparatus (for example, information processing apparatus shown in FIG. 26), the similarity calculation means (for example, matching unit 204 shown in FIG. 26) may calculate similarity by acquiring, as the comparative information, an information set including N pieces of individual information associated with a new content, assigning a weight value to each of the N pieces of individual information, producing a comparative vector whose elements are given by the weight values assigned to the N pieces of individual information, and calculating first similarity between the comparative vector and the first reference vector and second similarity between the comparative vector and the second reference vector, wherein the information processing apparatus may further comprise presentation means (for example, recommender 9 shown in FIG. 26) for determining whether the new content is suitable as a content to be recommended based on the first similarity and the second similarity calculated by the similarity calculation means, and, if the new content is determined to be suitable, presenting the new content as the recommended content to the user.

Figure 3:
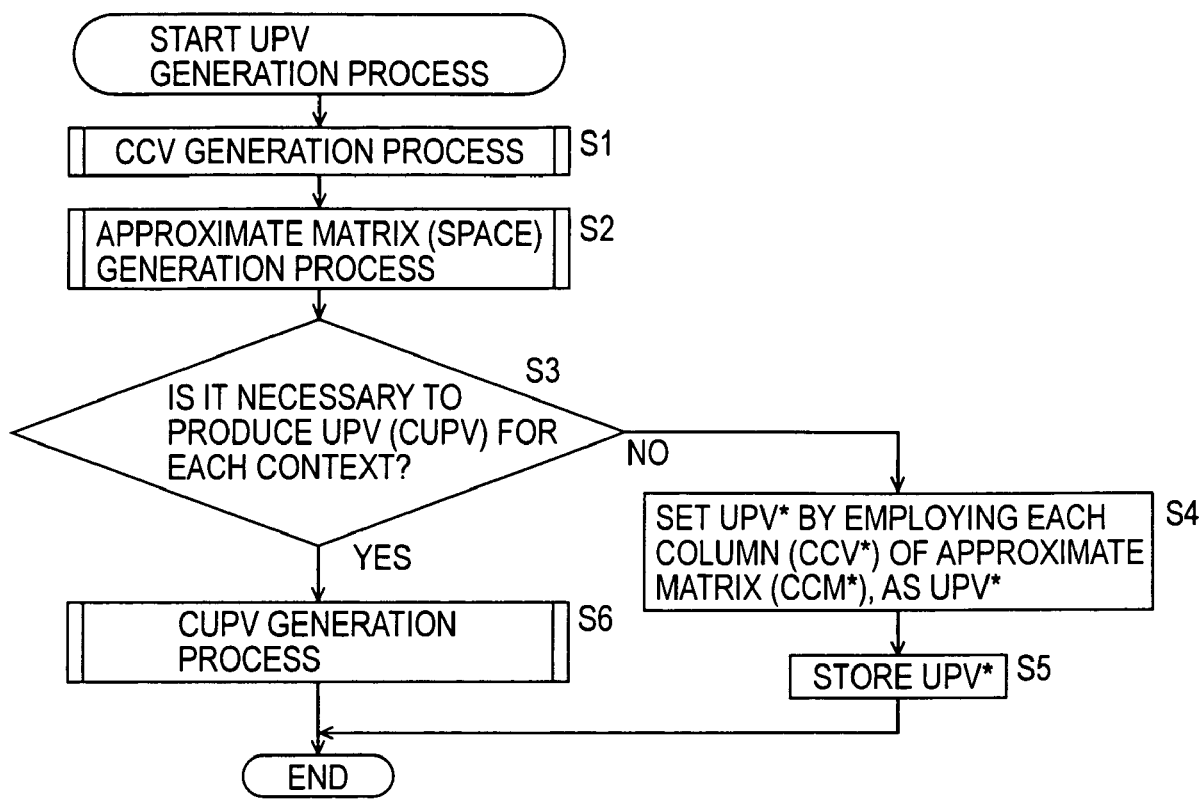
FIG. 3 is a flow chart illustrating an example of a UPV generation process performed by the information processing apparatus shown in FIG. 1.
Figure 4:
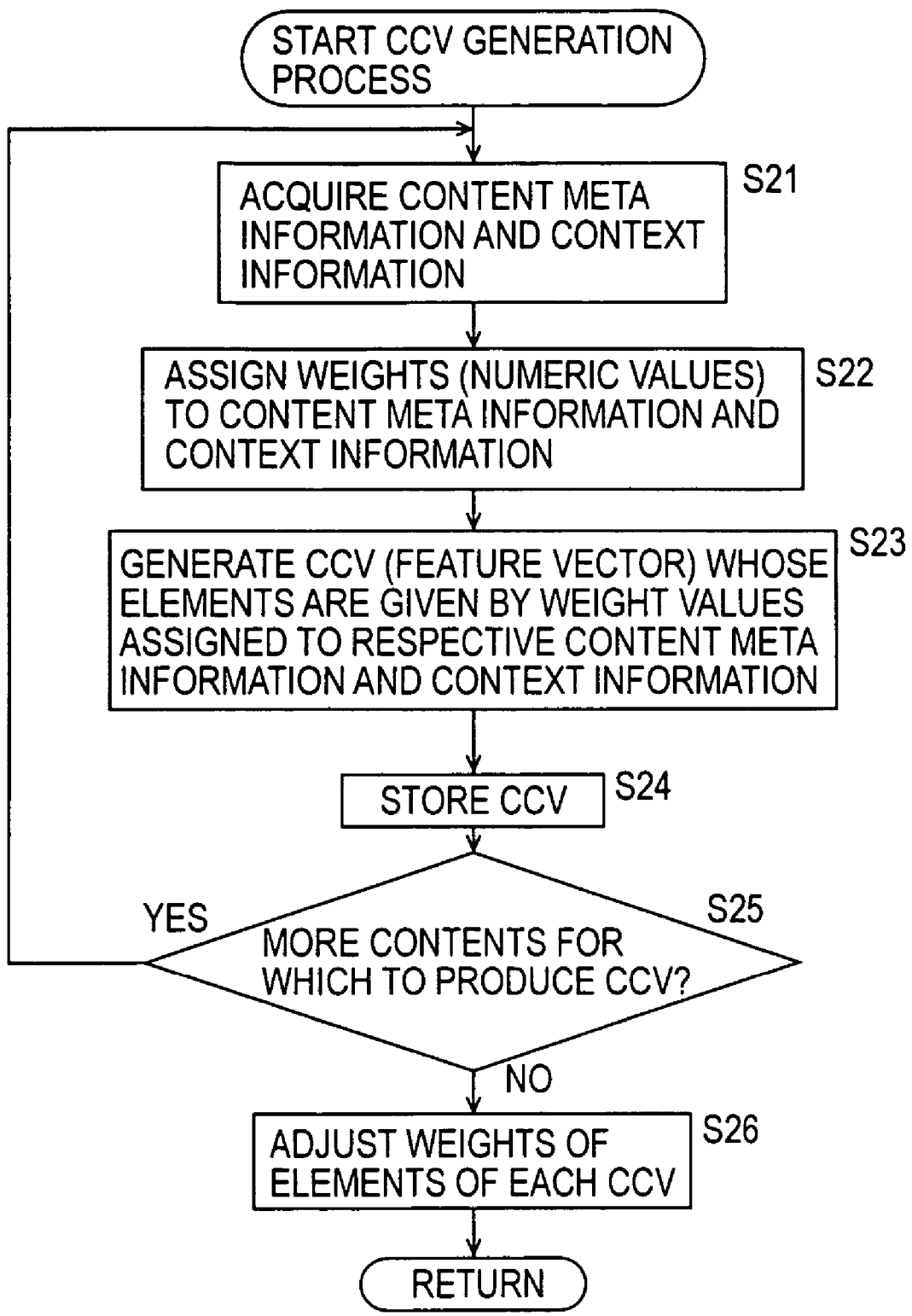
FIG. 4 is a flow chart illustrating an example of a detailed flow of a CCV generation process in the UPV generation process shown in FIG. 3.
Figure 6:
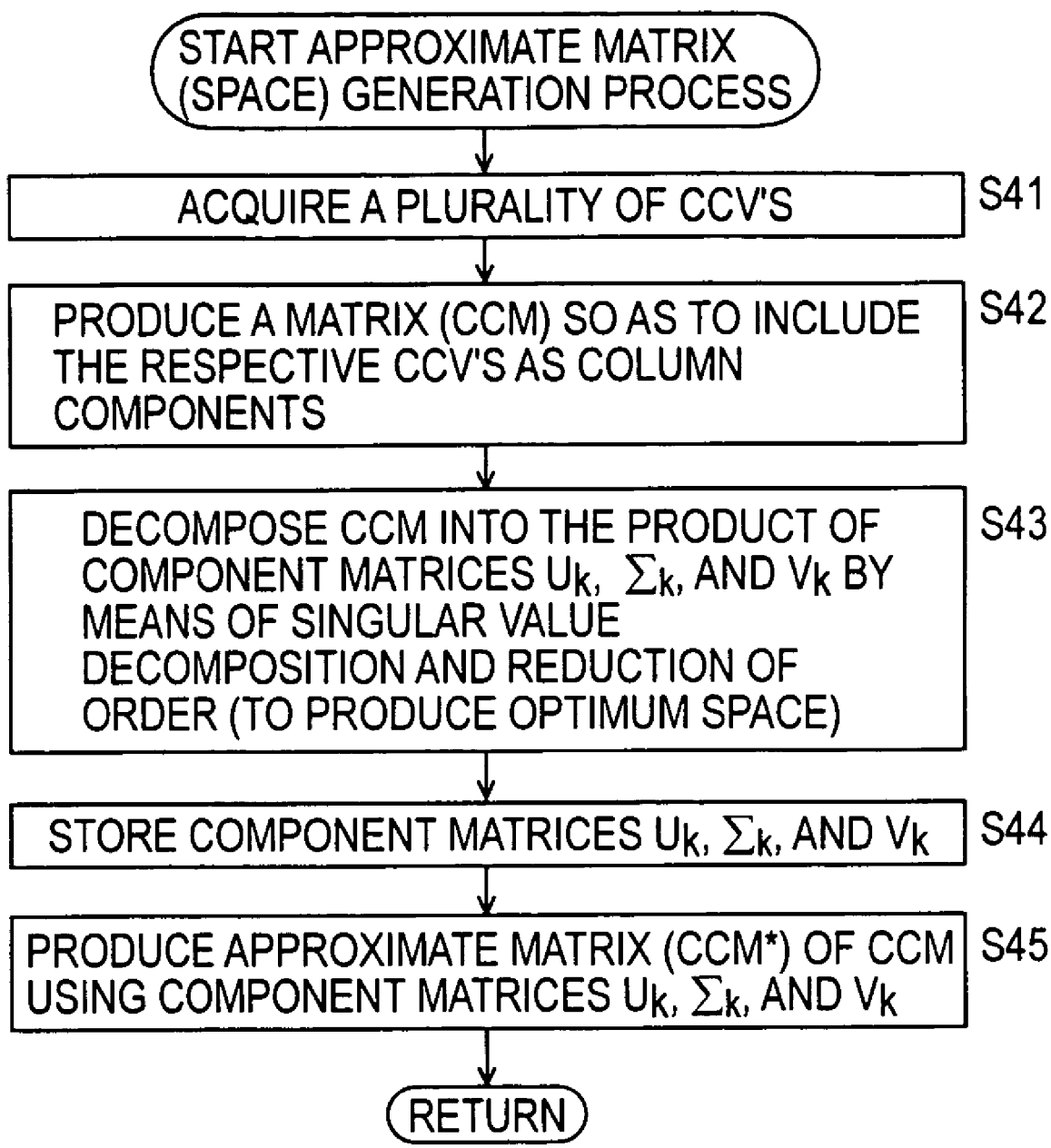
FIG. 6 is a flow chart illustrating an example of a detailed flow of an approximate matrix (space) generation process in the UPV generation process shown in FIG. 3.
Figure 12:
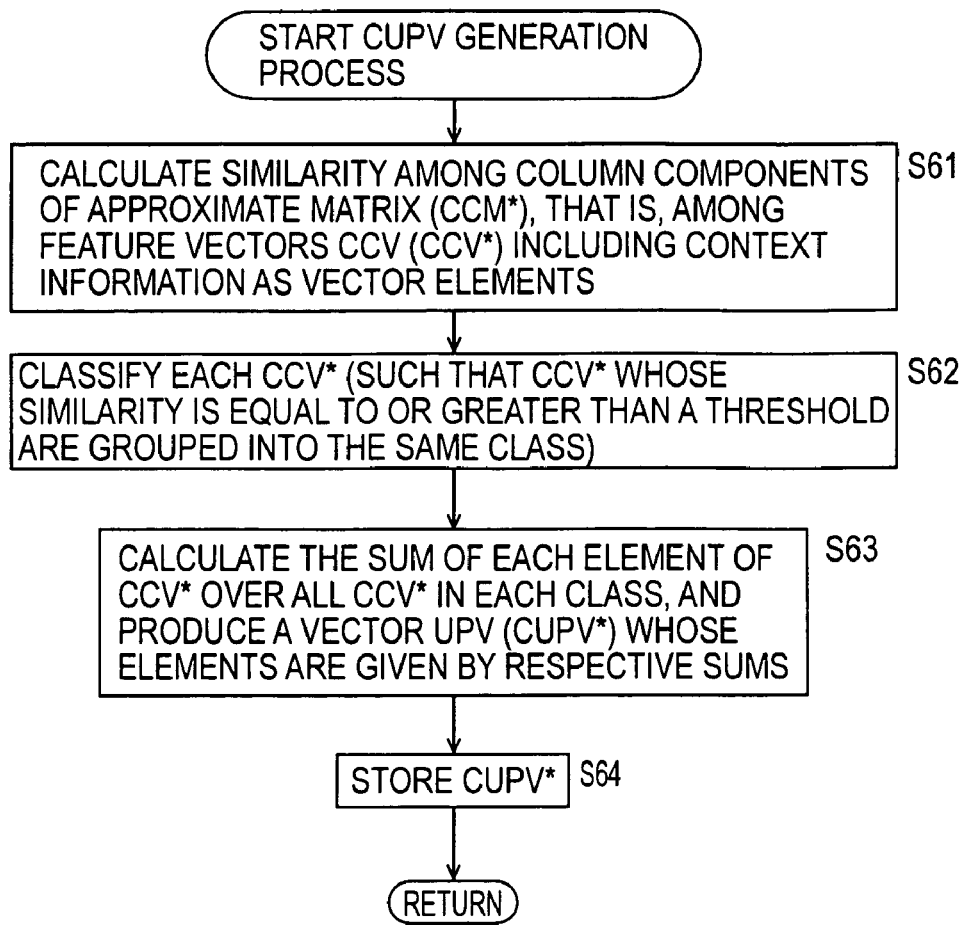
FIG. 12 is a flow chart illustrating an example of a detailed flow of a CUPV generation process in the UPV generation process shown in FIG. 3.
Figure 13:
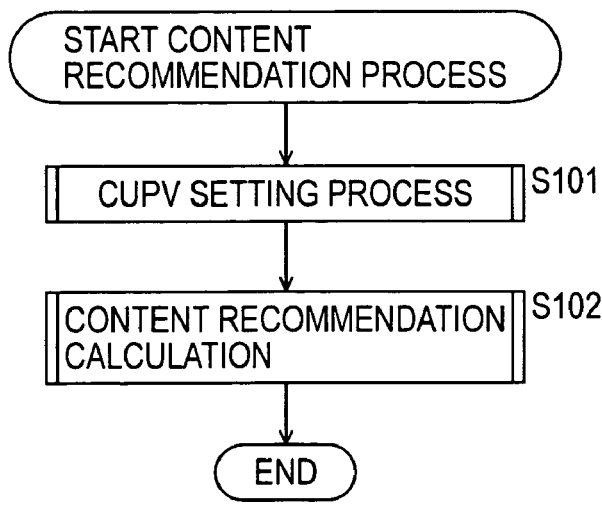
FIG. 13 is a flow chart showing an example of a content recommendation process performed by the information processing apparatus shown in FIG. 1.
Figure 14:
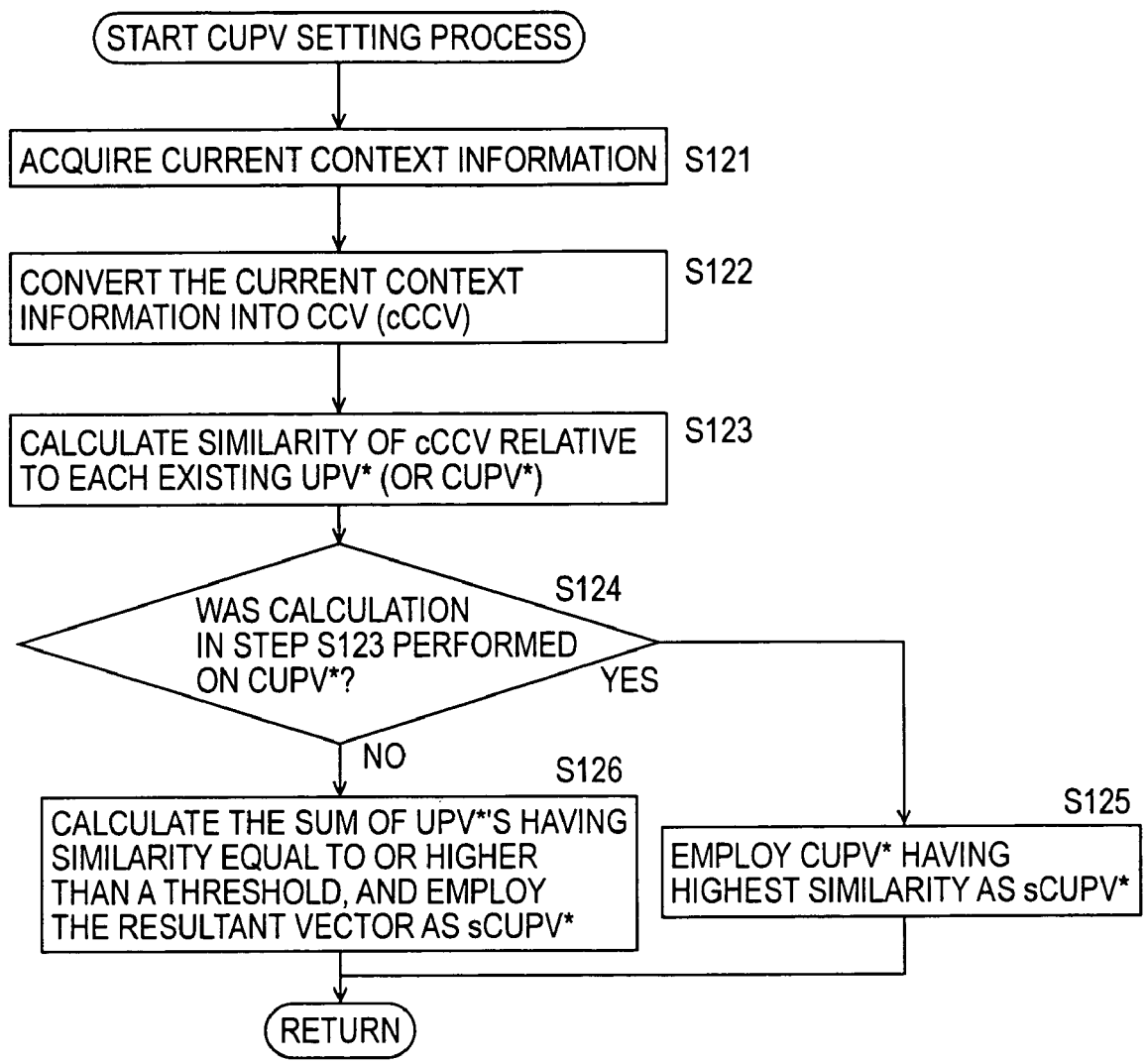
FIG. 14 is a flow chart illustrating an example of a detailed flow of a CUPV setting process in the content recommendation process shown in FIG. 13.
Figure 17:
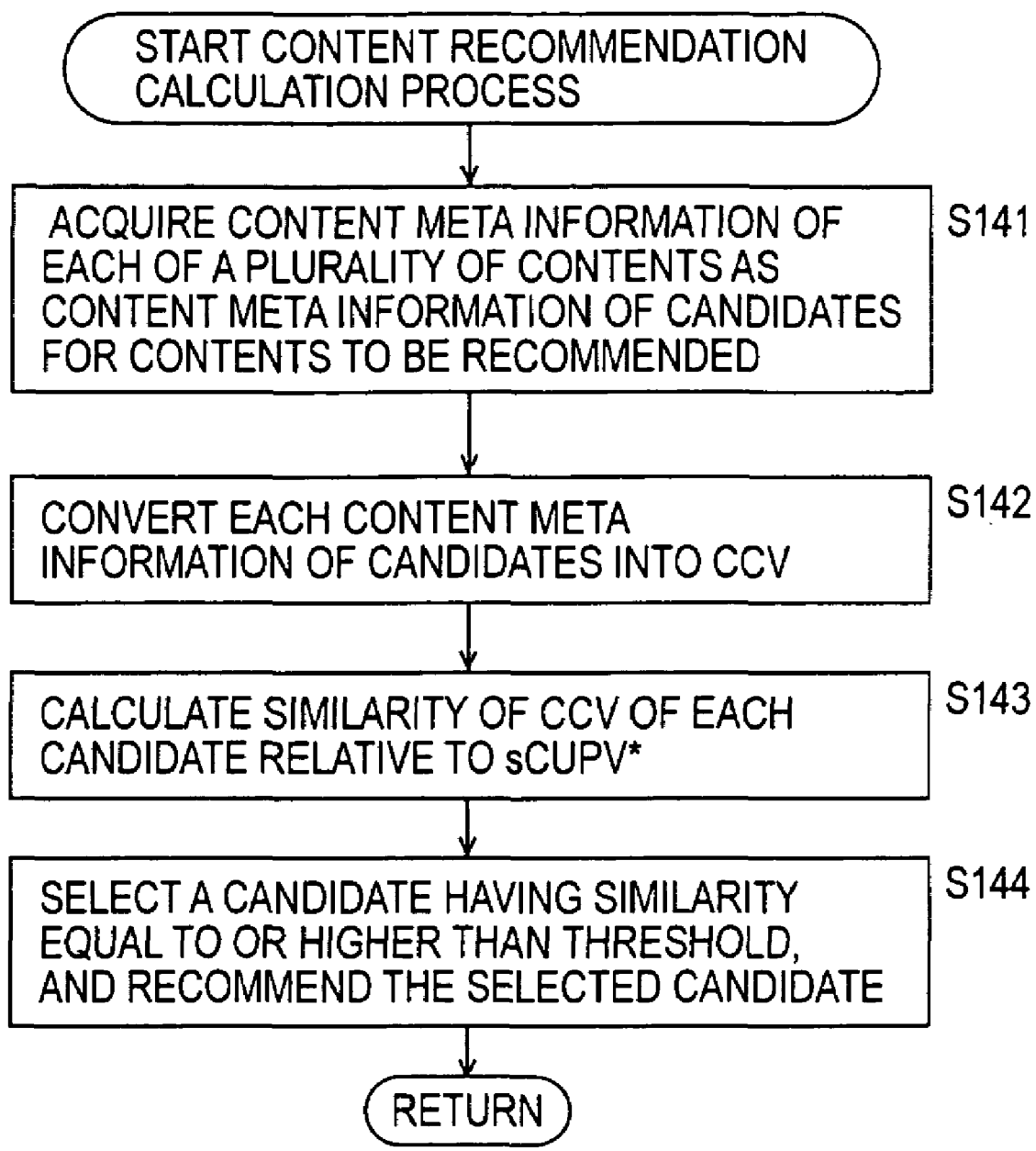
FIG. 17 is a flow chart illustrating an example of a detailed flow of a content recommendation calculation process in the content recommendation process shown in FIG. 13.

In an aspect, the present invention provides an information processing method (for example, an information processing method for the information processing apparatus shown in FIG. 1, 18, or 26 (hereinafter in the description of correspondence, it is assumed that the information processing method is for the information processing apparatus shown in FIG. 1 unless otherwise described), comprising a modification step (for example, a CCV generation process (step S1 shown in FIG. 3 (details thereof are shown in FIG. 4)) of acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1, an approximate matrix (space) generation step (for example, step S2 shown in FIG. 3 (details thereof are shown in FIG. 6)), a generation step (for example, a CUPV generation process (step S6 shown in FIG. 3 (details thereof are shown in FIG. 12)) of generating a reference information set for use as a reference in a calculation of similarity, the reference information set including N pieces of individual information produced based on the M information sets each including N pieces of individual information modified in the modification step, and a similarity calculation step (for example, a content recommendation process shown in FIG. 13 (details thereof are shown in FIG. 14 or 17)) of acquiring, as a comparative information set, a new information set including N individual information elements and calculating the similarity of the comparative information set with respect to the reference information set produced in the generation step.

In an aspect, the present invention provides a program executed by a computer, comprising: a modification step (for example, a CCV generation process (step S1 shown in FIG. 3 (details thereof are shown in FIG. 4)) of acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1, an approximate matrix (space) generation step (for example, step S2 shown in FIG. 3 (details thereof are shown in FIG. 6)), a generation step (for example, a CUPV generation process (step S6 shown in FIG. 3 (details thereof are shown in FIG. 12)) of generating a reference information set including N pieces of elements for use as a reference in a calculation of similarity, from the M information sets each including N pieces of individual information modified in the modification step, and a similarity calculation step (for example, a content recommendation process shown in FIG. 13 (details thereof are shown in FIG. 14 or 17)) of acquiring, as a comparative information set, a new information set including N individual information elements and calculating the similarity of the comparative information set with respect to the reference information set produced in the generation step.

Figure 23:
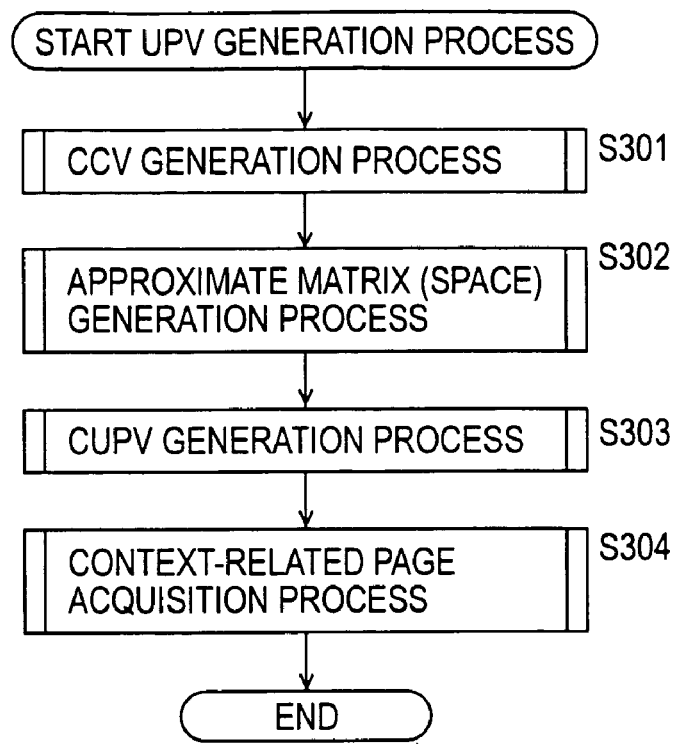
FIG. 23 is a flow chart showing another example of a UPV generation process performed by the information processing apparatus shown in FIG. 1.
Figure 24:
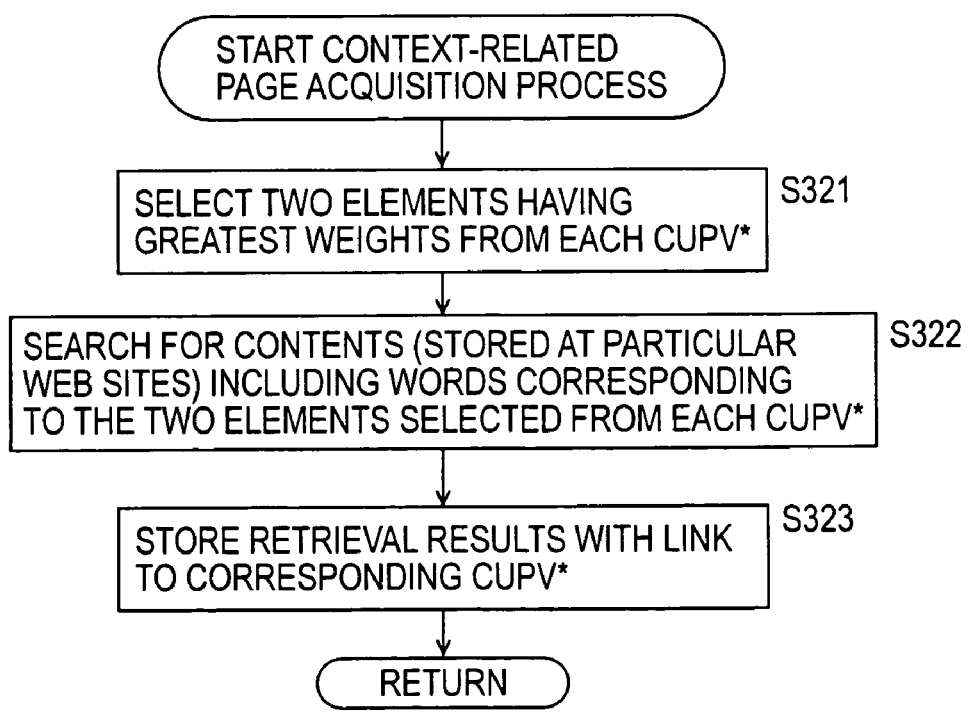
FIG. 24 is a flow chart showing an example of a context-related page acquisition process in the UPV generation process shown in FIG. 23.
Figure 25:
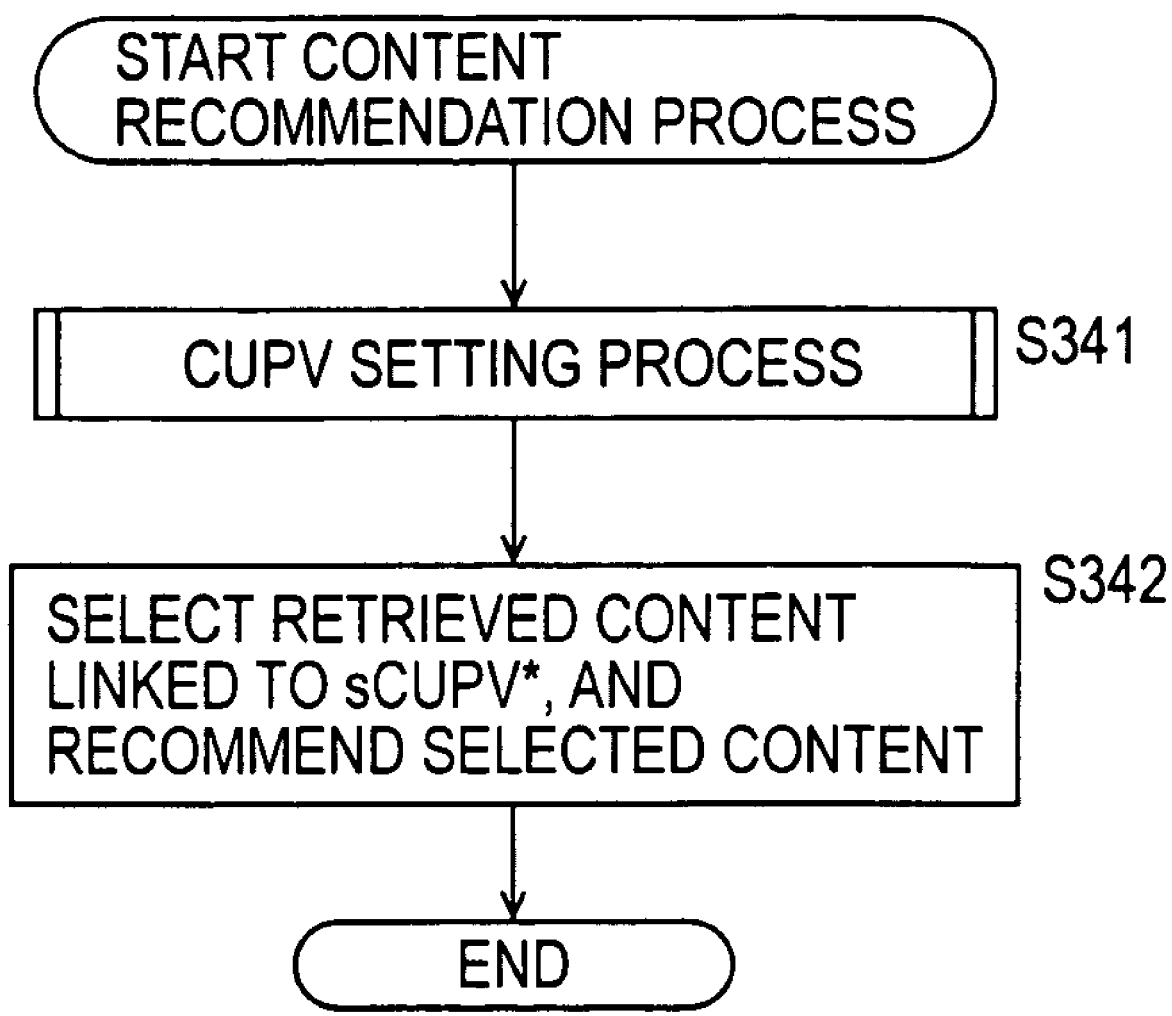
FIG. 25 is a flow chart showing an example of a content recommendation process performed after the UPV generation process shown in FIG. 23.

In an aspect, the present invention provides an information processing apparatus (for example, an information processing apparatus according to a third embodiment having a structure, for example, shown in FIG. 1, that is, an information processing apparatus that performs processes shown in FIGS. 23 to 25) comprising vectorization means (for example, a feature vector (CCV) generator 21 shown in FIG. 1) for, each time a content is used by a user, acquiring an information set including N pieces of individual information associated with the content, assigning a weight values to each of the N pieces of individual information, and producing as a feature vector for the content a vector whose elements are given by the weight values assigned to the respective N pieces of individual information, matrix generation means (for example, a matrix calculator (space generator) 22 shown in FIG. 1) for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, reference vector generation means (for example, user preference vector (UPV) generator 23 shown in FIG. 1) for producing a reference vector including N elements for use as a reference in calculation of similarity, from the M columns of the second matrix produced by the matrix generation means, candidate acquisition means (for example, related information acquisition unit 8 shown in FIG. 1) for, each time a reference vector is produced by the reference vector generation means, acquiring a candidate for a content to be recommended to a user, based on the reference vector, similarity calculation means (matching unit 3 or matching calculator 31 shown in FIG. 1) for acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced by the reference vector generation means, and presentation means (for example, recommender 9 shown in FIG. 1) for selecting, from candidate contents acquired by the candidate acquisition means, a candidate content corresponding to a reference vector whose similarity calculated by the similarity calculation means is equal to or higher than a threshold value and presenting the selected candidate content as a recommended content to the user.

In an aspect, the present invention provides an information processing method (for example, an information processing method corresponding to processes shown in FIG. 23 to 25), comprising a vectorization step (for example, a process in step S301 shown in FIG. 23) of, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information; a matrix generation step (for example, a process in step S302 shown in FIG. 23) of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, a reference vector generation step (for example, step S303 shown in FIG. 23) of producing a reference vector including N elements for use as a reference in calculation of similarity, from the M columns of the second matrix produced in the matrix generation step, a candidate acquisition step (for example, step S304 shown in FIG. 23 (details thereof are shown in FIG. 24)) of, each time a reference vector is produced in the reference vector generation step, acquiring a candidate for a content to be recommended to a user, based on the reference vector, a similarity calculation step (for example, step S341 shown in FIG. 25) of acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced in the reference vector generation step, and a presentation step (for example, step S342 shown in FIG. 25) of selecting, from candidate contents acquired in the candidate acquisition step, a candidate content corresponding to a reference vector whose similarity calculated by the similarity calculation means is equal to or higher than a threshold value and presenting the selected candidate content as a recommended content to the user.

In an aspect, the present invention provides a program executed by a computer (for example, CPU 501 shown in FIG. 35), comprising a vectorization step (for example, a process in step S301 shown in FIG. 23) of, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step (for example, a process in step S302 shown in FIG. 23) of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, a reference vector generation step (for example, step S303 shown in FIG. 23) of producing a reference vector including N elements for use as a reference in calculation of similarity, from the M columns of the second matrix produced in the matrix generation step, a candidate acquisition step (for example, step S304 shown in FIG. 23 (details thereof are shown in FIG. 24)) of, each time a reference vector is produced in the reference vector generation step, acquiring a candidate for a content to be recommended to a user, based on the reference vector, a similarity calculation step (for example, step S341 shown in FIG. 25) of acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced in the reference vector generation step, and a presentation step (for example, step S342 shown in FIG. 25) of selecting, from candidate contents acquired in the candidate acquisition step, a candidate content corresponding to a reference vector whose similarity calculated by the similarity calculation means is equal to or higher than a threshold value and presenting the selected candidate content as a recommended content to the user.

Figure 30:
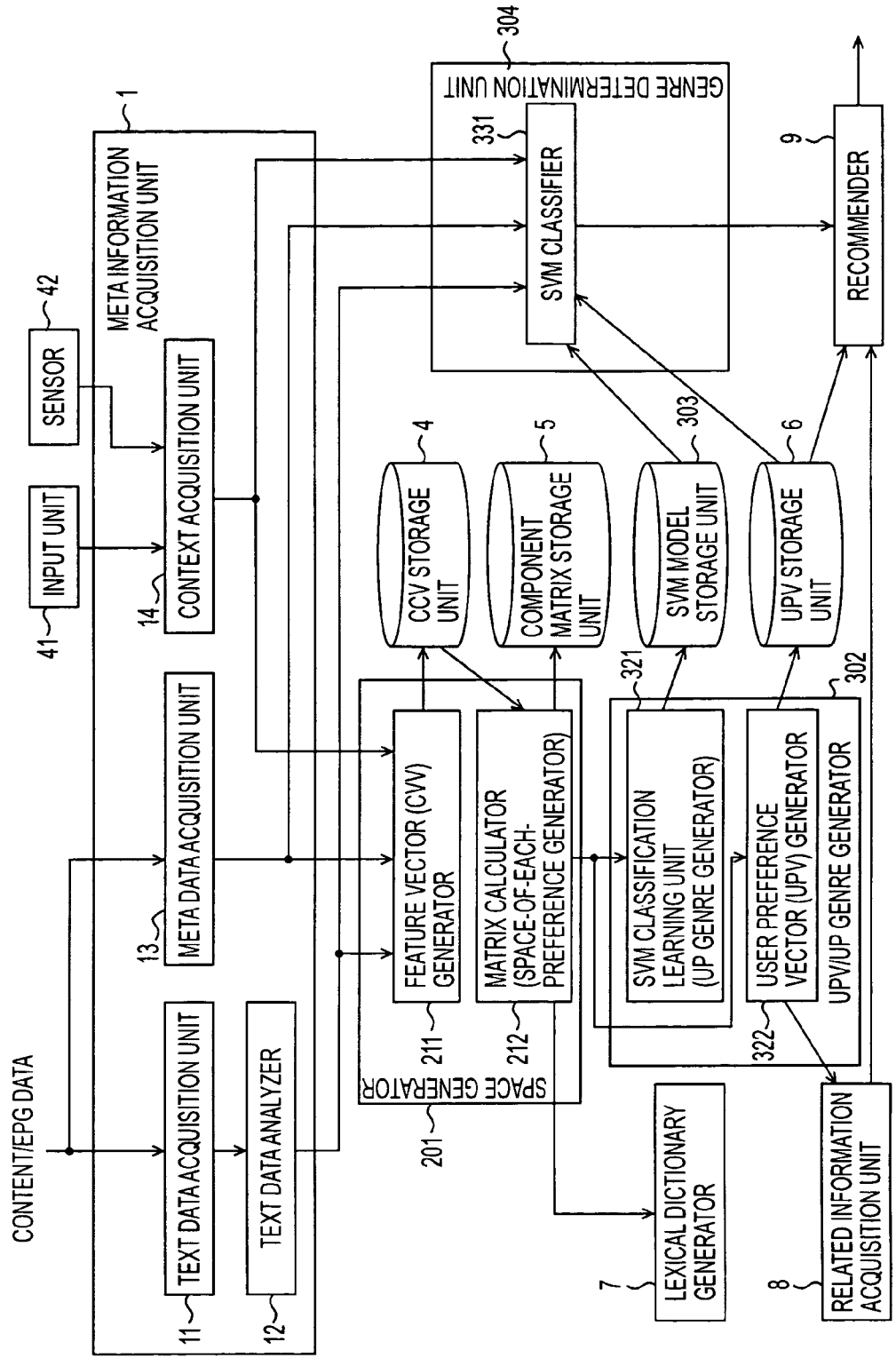
FIG. 30 is a functional block diagram of an information processing apparatus according to another embodiment of the present invention.

In an aspect, the present invention provides an information processing apparatus (for example, an information processing apparatus shown in FIG. 30) comprising vectorization means (for example, a feature vector (CCV) generator 211 shown in FIG. 30) for, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, matrix generation means (for example, a matrix calculator (preference-specific space generator) 212 shown in FIG. 30) for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, and genre setting means (for example, SVM classification learning unit (UP genre generator) 321 shown in FIG. 30) for calculating similarity among the M columns of the second matrix produced by the matrix generation means, classifying each of the M columns based on the calculated similarity, and setting each class obtained in the classification as a genre.

In the present information processing apparatus, the genre setting means may produce a classifier by learning classification for each genre by using columns belonging to the genre as training data. The present information processing apparatus may further comprise classification means (for example, genre determination unit 304 or SVM classifier 331 shown in FIG. 30) for making classification by acquiring an information set including N pieces of individual information associated with a new content, assigning a weight value to each of the N pieces of individual information, producing a feature vector whose elements are given by the weight values assigned to the respective N pieces of individual information for the new content, and classifying, using the classifier produced by the learning means, the feature vector associated with the new content as being one of the genres set by the genre setting means.

Figure 31:
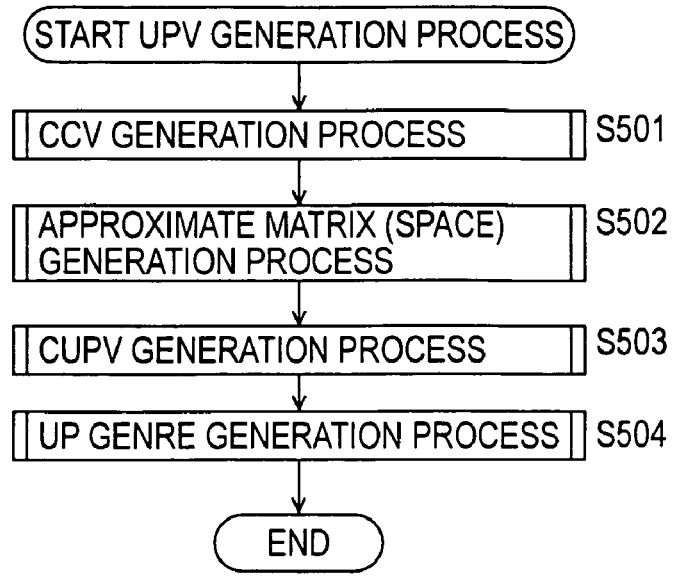
FIG. 31 is a flow chart showing an example of a UPV generation process performed by the information processing apparatus shown in FIG. 30.
Figure 32:
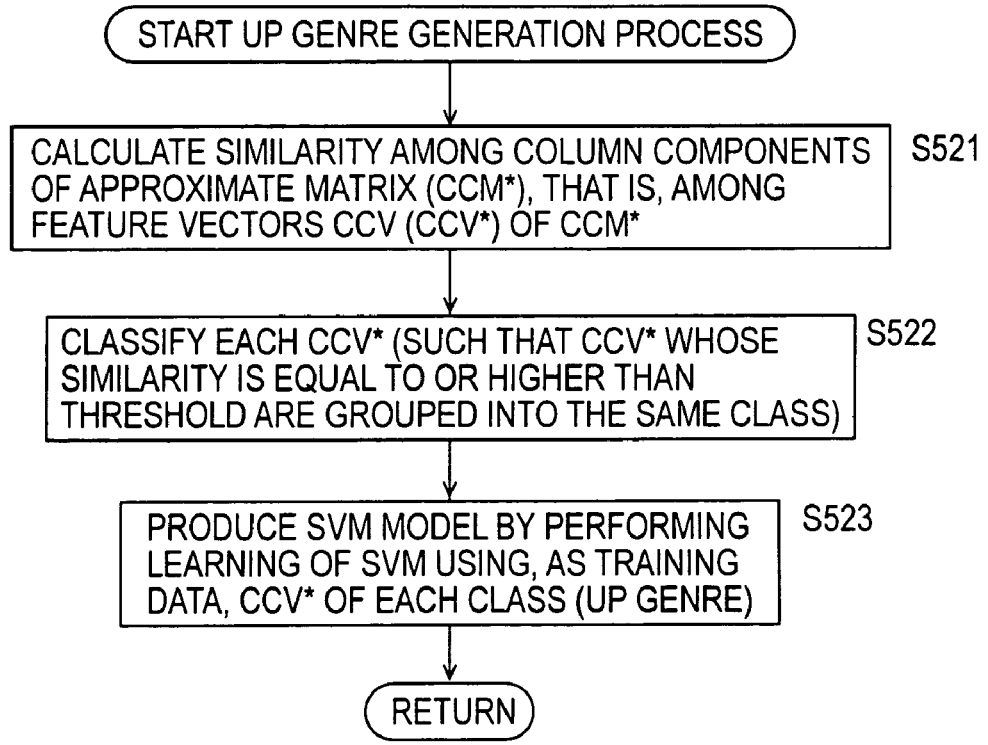
FIG. 32 is a flow chart illustrating an example of a detailed flow of a UP genre generation process in the UPV generation process shown in FIG. 31.
Figure 33:
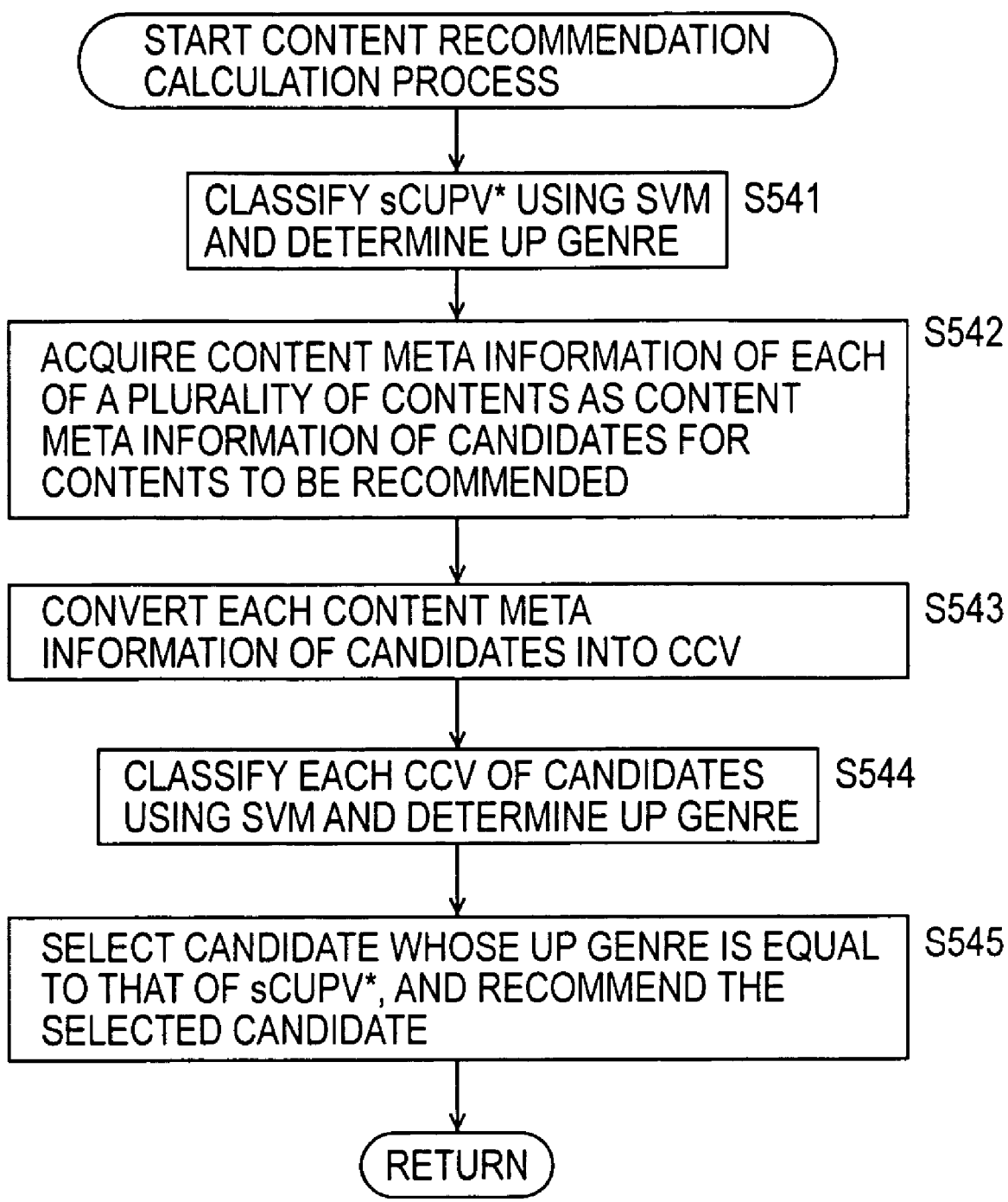
FIG. 33 is a flow chart showing an example of a content recommendation calculation process in the content recommendation process shown in FIG. 13, performed by the information processing apparatus shown in FIG. 30.

In an aspect, the present invention provides an information processing method (for example, an information processing method corresponding to processes shown in FIG. 31 to 33), comprising a vectorization step (for example, a process in step S501 shown in FIG. 31) of, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step (for example, a process in step S502 shown in FIG. 31) of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, and a genre setting step (for example, step S504 shown in FIG. 31 (details thereof are shown in FIG. 32)) of calculating similarity among the M columns of the second matrix produced in the matrix generation step, classifying each of the M columns based on the calculated similarity, and setting each class obtained in the classification as a genre.

In an aspect, the present invention provides a program executed by a computer (for example, CPU 501 shown in FIG. 35), comprising a vectorization step (for example, a process in step S501 shown in FIG. 31) of, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information a matrix generation step (for example, a process in step S502 shown in FIG. 31) of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, a genre setting step (for example, step S504 shown in FIG. 31 (details thereof are shown in FIG. 32)) of calculating similarity among the M columns of the second matrix produced in the matrix generation step, classifying each of the M columns based on the calculated similarity, and setting each class obtained in the classification as a genre.

Figure 34:
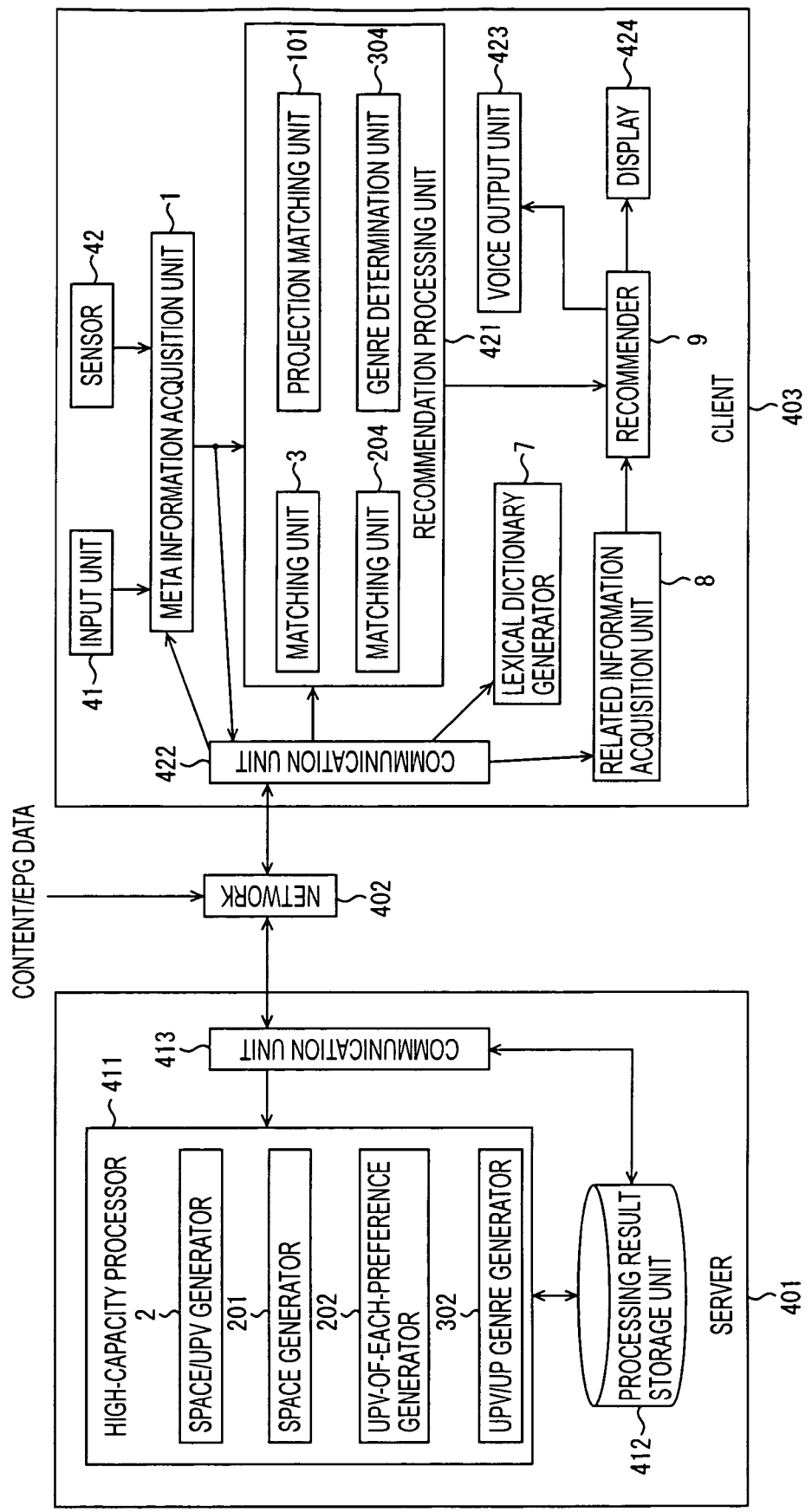
FIG. 34 is a block diagram of an information processing system according to an embodiment of the present invention.

In an aspect, the present invention provides an information processing system (for example, an information processing system shown in FIG. 34) including a server (for example, a server 401 shown in FIG. 34) and a client (for example, a client 403 shown in FIG. 34) used by a user, comprising vectorization means (for example, a part of a space/UPV generator 2 of a server 401 shown in FIG. 34, the part corresponding to a feature vector (CCV) generator 21 shown in FIG. 1) for, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information, matrix generation means (for example, a part of the space/UPV generator 2 of the server 401 shown in FIG. 34, the part corresponding to a matrix calculator (space generator) 22 shown in FIG. 1) for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, reference vector generation means (a part of space/UPV generator 2 of the server 401 shown in FIG. 34, corresponding to a user preference vector (UPV) generator 23 shown in FIG. 1) for producing a reference vector including N elements for use as a reference in calculation of similarity, from the M columns of the second matrix produced by the matrix generation means, and similarity calculation means (for example, a matching unit 3 of the client 403 shown in FIG. 34) for calculating similarity by acquiring a new information set including N pieces of individual information, assigning weight values to the respective N pieces of individual information, producing a comparative feature vector whose elements are given by the weight values assigned to the respective N pieces of individual information, and calculating similarity between the comparative vector and the reference vector produced by the reference vector generation means, wherein of the vectorization means, the matrix generation means, the reference vector generation means, and the similarity calculation means, at least the matrix generation means is included in the server.

In an aspect, the present invention provides an information processing method for an information processing system including a server (for example, a server 401 shown in FIG. 34) and a client (for example, a client 403 shown in FIG. 34) used by a user, comprising a vectorization step (for example, a process in step S1 shown in FIG. 3) of, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information, a matrix generation step (for example, a process in step S2 shown in FIG. 3) of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, a reference vector generation step (for example, step S6 shown in FIG. 3) of producing a reference vector including N elements for use as a reference in calculation of similarity, from the M columns of the second matrix produced in the matrix generation step, and a similarity calculation step (for example, a content recommendation process shown in FIG. 13) of calculating similarity comprising the substeps of acquiring a new information set including N pieces of individual information, assigning weight values to the respective N pieces of individual information, producing a comparative feature vector whose elements are given by the weight values assigned to the respective N pieces of individual information, and calculating similarity between the comparative vector and the reference vector produced in the reference vector generation step, wherein of the vectorization step, the matrix generation step, the reference vector generation step, and the similarity calculation step, at least the matrix generation step is performed by the server.

The present invention is described in further detail below with reference to specific embodiments in conjunction with the accompanying drawings.

Although the present invention can be embodied in various manners, the invention is described below, by way of example but not limitation, with reference to five specific embodiments. After these five specific embodiments (first to fifth embodiments) are described, possibility of other embodiments will be discussed.

First Embodiment

First, referring to FIGS. 1 to 17, a first embodiment of the present invention is described.

FIG. 1 shows an information processing apparatus according to the first embodiment of the invention.

As shown in FIG. 1, the information processing apparatus according to the first embodiment includes a meta information acquisition unit 1, a space/UPV generator 2 (UPV is another name of the user preference vector), a matching unit 3, a CCV storage unit 4 (CCV is another name of the feature vector), a component matrix storage unit 5, a UPV storage unit 6, a lexical dictionary generator 7, a related information acquisition unit 8, and a recommender 9.

The input unit 41 and the sensor 42 may be components disposed in the inside of the information processing apparatus or may be external devices disposed in the outside and connected to the information processing apparatus.

There are no restrictions on specific forms of the above-described parts (the meta information acquisition unit 1 to the recommender 9). In particular, the meta information acquisition unit 1, the space/UPV generator 2, the matching unit 3, the lexical dictionary generator 7, the related information acquisition unit 8, and the recommender 9 may be implemented by means of software, hardware, or a mixture of software and hardware.

The meta information acquisition unit 1 includes a text acquisition unit 11, a text analyzer 12, a metadata acquisition unit 13, and a context acquisition unit 14.

As shown in FIG. 1, content data and EPG data are input to the meta information acquisition unit 1. There is no particular restriction on the content data input to the meta information acquisition unit 1 as long as the content data was or will be used (viewed or experienced) by a user. Note that the term "content" is used herein to describe a wide variety of contents including not only television programs, movies, photographs, music contents, images (motion images, still images, audio contents, or a combination of those), but also documents, articles (physical objects or products) and conversations, which may be in the form of software or hardware usable by a user. In practice, when a content is given in the form of a physical object (hardware), data indicating a motion/still image of the physical object is produced and the resultant data is used as content data.

The text acquisition unit 11 extracts text data from supplied content data or EPG data. For example, when an e-mail is received via an e-mail browser (not shown), the text acquisition unit 11 extracts text data included in the received e-mail. The text data acquired by the text acquisition unit 11 is supplied to the text analyzer 12.

The text analyzer 12 divides the received text data into a plurality of segments (for example, in units of documents or paragraphs). The text analyzer 12 analyzes the description (text) of each segment and decomposes the text of each segment into words (for example, "kindergarten" or "child" as shown in FIG. 5). The resultant word data is supplied to the space/UPV generator 2 or the matching unit 3.

The metadata acquisition unit 13 analyzes a part, other than text, of the supplied content data or EPG data and discomposes the data into words or produces new word data. The resultant word data is supplied to the space/UPV generator 2 or the matching unit 3. The metadata acquisition unit 13 also extracts word data existing in the EPG data, and directly supplies the extracted word data to the space/UPV generator 2 or the matching unit 3.

Hereinafter, to distinguish from data output from the context acquisition unit 14, word data output from the text analyzer 12 or the metadata acquisition unit 13 will be referred to as content meta information. Note that in the present description, as described earlier, the content may be not only a usual content but also a private document (such as a mail document) or the like. That is, in the present description, the term "content meta information" is used to describe meta information of not only usual contents such as television programs but also a wide variety of contents (broad-sense contents) defined earlier or part of such a broad-sense content or information in the form of words (numerals are also regarded as words) indicating attributes of contents.

The above-described problem with the conventional technique mainly occurs in a situation in which when a content meeting the preference of a user is recommended, the recommended content is refused if the content does not match the current context in which the user is. That is, if a content is recommended simply based on content meta information associated with contents experienced by a user, the recommended content does not necessarily match the current context in which the user is.

Note that in the present description, the term "context" is used to describe a wide variety of inner and external states of a user. Examples of user's inner states include a user's body condition and an emotional state (a feeling or a mental state). Examples of user's external states include a spatial or temporal location of a user ("temporal location" refers to a current time) and a spatial or temporal environment (or spatial and temporal environment) in which the user is located.

In the conventional technique, information indicating the context of a user (hereinafter, referred to simply as context information) is not taken into account when a content is recommended, with rare exceptions in which external context information such as information indicating a time or a location or internal context information such as information indicating a feeling manually input by a user is used. Even in such rare exceptions, only very limited context information is taken into account in the process of selecting a content to be recommended.

That is, in the conventional technique, content meta information and context information are dealt with separately, and it is required that a service provider should have established in advance a rule of linking content meta information (candidate content corresponding to content meta information) and a context (emotional state). In the conventional content recommendation technique in which context information and content meta information are dealt with separately, a content recommended does not always match a varying context, and thus the recommended content is often refused by a user. That is, the conventional content recommendation technique cannot solve the problems described above. Besides, it is required that the service provider have prepared the rule described above, which imposes a great load on the service provider.

In the conventional technique, even in a situation in which a plurality of pieces of context information are obtained from a various kinds of sensors, the plurality of pieces of context information are simply interpreted according to the predetermined rule and classified into one of a very small number of fixed classes (even in a case in which classification has been performed in advance, for example, by means of statistical analysis). Thus, even in the case in which plural pieces of context information are used, the problems described above still remain, and besides another new problem arises as described above.

In the first embodiment of the present invention, to avoid the problems described above, both context information and content meta information are dealt with at the same level. To this end, the meta information acquisition unit 1 includes the context acquisition unit 14 in addition to the blocks for acquiring content meta information (the text acquisition unit 11, the text analyzer 12, and the metadata acquisition unit 13).

If the context acquisition unit 14 receives information via the input unit 41 or the sensor 42, the context acquisition unit 14 converts the received information as required, and supplies the information as context information to the space/UPV generator 2 or the matching unit 3.

The input unit 41 includes a keyboard, a mouse, and an input interface. A user can input various kinds of contexts to the context acquisition unit 14 via the input unit 41.

In response, the context acquisition unit 14 analyzes the context input via the input unit 41 and converts it into words. The resultant word data is supplied as context information to the space/UPV generator 2 or the matching unit 3.

More specifically, for example, the information processing apparatus displays on a display (such as a display 424 shown in FIG. 34, although not shown in FIG. 1) a select-to-input user interface screen such as that shown in FIG. 2. By operating the input unit 41, the user selects a word indicating a current context of the user in each box disposed in a "Context Selection" window shown in FIG. 2. The words selected in the respective boxes are input to the context acquisition unit 14.

More specifically, the user interface screen shown in FIG. 2 allows a user to select (by operating the input unit 41) words indicating the external context of the user in terms of "Place" (where the content is used by the user ("company" is selected in the example shown in FIG. 2)) and Occasion" (in which the content is used by the user ("working" is selected in the example shown in FIG. 2)).

In the example shown in FIG. 2, the user interface screen also allows the user to select (by operating the input unit 41) words indicating the internal context of the user in terms of "Mental" state (in which the user is when the user uses the content ("fresh" is selected in the example shown in FIG. 2)), Emotional" state (in which the user is when the user uses the content ("happy" is selected in the example shown in FIG. 2)), and Rating" (evaluated by the user for the content ("important" is selected in the example shown in FIG. 2)).

In the example shown in FIG. 2, as described above, data is input in the form of a word to the context acquisition unit 14 shown in FIG. 1. The context acquisition unit 14 directly supplies the input word data as context information to the space/UPV generator 2 or the matching unit 3.

The sensor 42 is used to detect an external or internal context of a user. There are no particular restrictions on the type and the number of sensors 42. When a single sensor is used as the sensor 42, the sensor 42 does not necessarily detect only one context but may detect two or more contexts. For example, as a sensor for detecting an external context, a GPS (Global Positioning System) receiver for detecting the current position of a user, a clock for detecting the current time, or a wireless communication device for detecting a person or an object present in the vicinity of the user may be used. As a sensor for detecting an internal context, for example, a sensor for detecting a pulse, a breathing rate, perspiration, or the opening of the pupil of an eye may be used.

In a case in which information input from the sensor 42 to the context acquisition unit 14 is in the form of numeric data, the context acquisition unit 14 supplies the input numeric data (directly or after making a conversion according to a predetermined rule) as context information to the space/UPV generator 2 or the matching unit 3. On the other hand, in a case in which information input from the sensor 42 to the context acquisition unit 14 is not in the form of numeric data, the context acquisition unit 14 analyzes the information and converts it into a word (a numeric value is regarded as a word). The resultant word data is supplied as context information to the space/UPV generator 2 or the matching unit 3.

Now, the space/UPV generator 2 is explained below. The space/UPV generator 2 includes a feature vector (CCV) generator 21, a matrix calculator (space generator) 22, and a user preference vector (UPV) generator 23.

The feature vector (CCV) generator 21 produces, for each content, a vector whose elements are given by one or more pieces of content meta information and one or more pieces of context information supplied from the meta information acquisition unit 1. Such a vector produced by the feature vector (CCV) generator 21 indicates a feature of preference of the user, that is, indicates a feature of a content experienced by the user and a feature of a context in which the content was experienced by the user. Thus, hereinafter, such a vector produced by the feature vector (CCV) generator 21 will be referred to as a feature vector CCV.

Depending on the situation, the feature vector CCV is produced by the matching unit 3, as will be described later.

In the present embodiment, by way of example but not limitation, the feature vector CCV has a predetermined number of dimensions (the number of elements), and each element corresponds to predetermined particular type of information (content meta information or context information). That is, the number of elements of the feature vector CCV is fixed, and items of information described in respective elements and the order of items are fixed. Hereinafter, the feature vector CCV in such a form will be referred to as a feature vector in the standard form. A specific example of the feature vector CCV will be described later with reference to FIG. 5.

More specifically, in the production of the feature vector CCV, the feature vector (CCV) generator 21 assigns a weight to each piece of content meta information and context information (in the form of words or numeric values) supplied from the meta information acquisition unit 1, depending on the frequency of occurrence of words or in accordance with a weighting method such as a tf method. The assigned weights are substituted in corresponding elements of the feature vector CCV, thereby obtaining the feature vector CCV. Note that when the content information and the context information (word data that may be in the form of numeric values) for a particular content, supplied from the meta information acquisition unit 1, does not include information corresponding to a particular element of the feature vector CCV, that is, when there is no weight to be substituted in that element of the feature vector CCV, 0" is substituted in that element.

In the case, weighting is performed based on the frequency of occurrence of words, the frequency of occurrence may be directly used as the value of the weight or a value obtained by converting the frequency of occurrence according to a particular rule, such as normalization, may be used.

In a case in which context information supplied from the sensor 42 (an ambient sensor, a body sensor, or a combination thereof) is in the form of a value (real number), the value may be directly used as the value of the weight or a value obtained by converting the supplied value according to a particular rule such as normalization may be used. In a case in which context information in the form of word data is supplied from the input unit 41, a first value obtained by weighting the word data in accordance with a first rule may be used as the value of the weight or a second value obtained by converting the first value according to a second rule such as normalization may be used.

The weight value assigned to the content meta information and the weight value assigned to the context information may be multiplied by variable coefficients, and the resultant values may be used as final weight values. In this case, the weight values can be adjusted simply by modifying one or more variable coefficients corresponding to weight values that should be adjusted (as in step S26 in FIG. 4, which will be described later).

As described above, each time a content is used by the user, an information set including N pieces of individual information (content meta information or context information) is supplied from the meta information acquisition unit 1 to the feature vector (CCV) generator 21, wherein N is an integer equal to or greater than 2 preset for that content). However, for a particular content, if some of the N pieces of individual information is null (because the individual information was not acquired by the meta information acquisition unit 1), that individual information is regarded as "0". In response to receiving the information set, the feature vector (CCV) generator 21 assigns weights (values) to respective N pieces of individual information of the supplied information set and produces a feature vector CCV whose elements are given by the weights (values) assigned to the respective N pieces of individual information).

As described above, a feature vector CCV is produced depending on a particular content and depending on a context in which the content is used, and the resultant feature vector CCV is stored in the CCV storage unit 4. That is, each time a content is used by the user, a feature vector CCV for the content is produced by the feature vector (CCV) generator 21 and stored in the CCV storage unit 4.

Note that in feature vectors CCV produced in the above described manner and stored in the CCV storage unit 4, each of all context information and all content meta information are dealt with as an element at the same level. The number of pieces of context information of the feature vector CCV (more strictly, of the elements of the feature vector CCV, the number of elements corresponding to the context information) is not limited to one but may be two or greater. As will be described later, contents recommended based on the feature vectors CCV produced in the above-described manner have a less probability that the content is refused by the user than contents recommended based on the conventional recommendation method.

If the number of feature vectors CCV produced in the above-described manner and accumulated in the CCV storage unit 4 becomes equal to M (integer equal to or greater than 2), the matrix calculator (space generator) 22 produces an N×M matrix whose columns are given by the M feature vectors CCV. The matrix produced in this way can be regarded as a set of feature vectors CCV, that is, a set of content meta information indicating contents preferred (experienced) by the user and/or indicating attributes of the contents and context information indicating contexts in which the contents were experienced by the user. To distinguish from other matrices, the matrix produced in this way by the matrix calculator (space generator) 22 is referred to as a content-and-context matrix, which will also be referred to simply as a matrix CCM.

The matrix calculator (space generator) 22 projects the respective elements (content meta information indicating contents experienced by the user or attributes of the contents and context information in which the contents were experienced by the user) of the matrix CCM onto a principal component axis by means of singular value decomposition and dimension reduction, that is, by means of LSI method described above.

The matrix obtained as a result of the above process (by reducing the dimensions of the matrix CCM) is referred to as an approximate matrix of the matrix CCM. For convenience, the approximate matrix of the matrix CCM is also referred to simply as an approximate matrix CCM*. The space to which the elements are projected is referred to as an optimum space UPS.

More specifically, in the above process, the matrix calculator (space generator) 22 decomposes the N×M matrix CCM into the product of matrices U, Σ, and V by means of the singular value decomposition such that the following equation (1) is satisfied.

$$D(=CCM)=U\Sigma V^{-} \quad (1)$$

where D denotes the matrix CCM, U denotes a N×N component matrix given by left-hand singular vectors, V denotes M×M component matrix given by right-hand singular vectors, Σ denotes an N×M singular matrix, and $V^{-}$ denotes the transpose of the matrix V.

Let r denote the rank of the matrix CCM (wherein r is an integer equal to or less than N and M). The component matrix Σ has r singular values on its main diagonal and has 0 for any other element. The r columns (left singular vectors) in the leftmost region of the component matrix U form an orthonormal base, and these r columns are arranged in the order of decreasing importance from left to right (such that the leftmost column is of most importance). Thus, a representation of feature vectors CCV using k (integer less than r) left singular value vectors gives a best approximation.

Thus, the matrix calculator (space generator) 22 produces a matrix $U_k$ with N rows and k columns (such as that shown in FIG. 8) using k columns in the leftmost region (left singular vectors) of the component matrix U.

As will be described in further detail later, when a (N-dimensional) feature vector CCV is given, if the feature vector CCV is multiplied by the transpose of the matrix $U_k$ from left, an approximate feature vector with dimension reduced to k is obtained. That is, by multiplication of the transpose of the matrix $U_k$, the feature vector CCV is projected to a k-dimensional optimum space UPS. That is, the matrix calculator (space generator) 22 produces the optimum space UPS by producing the matrix $U_k$.

Similarly, the matrix calculator (space generator) 22 produces an approximate matrix of the component matrix V (as shown in FIG. 10) by using k columns in the leftmost region (right singular vectors) of the component matrix V. That is, the approximate matrix has M rows and k columns, and its k columns are given by the k columns in the leftmost region (right singular vectors) of the component matrix V. Hereinafter, such an approximate matrix will be denoted by $V_k$.

The matrix calculator (space generator) 22 also produces a k×k matrix $\Sigma_k$ (such as that shown in FIG. 9) by extracting 1st to kth elements of each of k columns of the leftmost region of the component matrix ρ and using these k columns each having extracted k elements as columns of the matrix $\Sigma_k$ (that is, the matrix $\Sigma_k$ is given by k×k elements in the upper left region of the component matrix Σ).

The matrix calculator (space generator) 22 calculates the right-hand side of equation (2) to obtain a matrix $D_k$ whose rank is reduced to k.

$$D_k(=CCM^*)=U_k\Sigma_k V_k^- \quad (2)$$

where $V_k^-$ denotes the transpose of the component matrix $V_k$.

The resultant matrix $D_k$ is supplied as the approximate matrix CCM* of matrix CCM to the user preference vector (UPV) generator 23.

The component matrix $U_k$ (and also matrix $V_k$ and/or $\Sigma_k$ as required) of the approximate matrix CCM* ($=D_k$) is supplied to the lexical dictionary generator 7 and stored in the component matrix storage unit 5.

In this first embodiment, as will be described later, the component matrix $U_k$ is not used by the matching unit 3 and thus the component matrix storage unit 5 is not an essential part for the information processing apparatus according to the first embodiment. In contrast, in a second embodiment that will be described later, the component matrix $U_k$ is used by a projection matching unit 101 (FIG. 18) and thus the component matrix storage unit 5 is an essential part of the information processing apparatus according to the second embodiment.

The user preference vector (UPV) generator 23 produces a vector including N elements in the standard form from M columns of the approximate matrix CCM* supplied from the matrix calculator (space generator) 22, that is, from the M feature vectors CCV* (note that the feature vectors given by the columns of the approximate matrix CCM* are denoted by the feature vectors CCV* to distinguish from the feature vectors CCV). The vector in the standard form produced by the user preference vector (UPV) generator 23 is used as a reference vector indicating the preference of the user when a content recommendation process is performed by the matching unit 3 or the recommender 9. Thus, the vector produced by the user preference vector (UPV) generator 23 is referred to as the user preference vector UPV*.

In the present embodiment (first embodiment), the user preference vector UPV* is produced based on the approximate matrix CCM* supplied from the matrix calculator (space generator) 22, and thus a suffix * is added after UPV. Note that there is no particular restriction on the method of producing the user preference vector UPV* as long as the user preference vector UPV* is produced based on the approximate matrix CCM* supplied from the matrix calculator (space generator) 22.

For example, columns of an approximate matrix CCM*, that is, feature vectors CCV* may be directly as user preference vectors UPV*.

Alternatively, the sum may be calculated for each element over all columns or selected columns (feature vectors CCV*) of an approximate matrix CCM*, and a vector in the standard from whose elements are given by the calculated sums may be used as a user preference vector UPV*. That is, a sum vector obtained by adding together all columns or selected columns (feature vectors CCV*) of an approximate matrix CCM* may be used as a user preference vector UPV*.

When the sum vector is calculated by adding together columns selected from the columns (feature vectors CCV*) of the approximate matrix CCM*, there is no particular restriction on which columns should be selected.

More specifically, the correlation of a particular element indicating context information (weight value assigned to context information) among feature vectors CCV* is calculated, and feature vectors CCV* having high correlation are selected. The sum vector (each element is given by the sum of corresponding elements over feature vectors) of the feature vectors selected in the above-described manner is calculated, and the resultant sum vector is used as a user preference vector UPV*.

Alternatively, the correlation of an element indicating context information (the correlation of weight value of context information) among columns of an original matrix CCM, that is, among original feature vectors CCV is calculated, and feature vectors CCV (columns of the original matrix CCM) having high correlation are selected. Furthermore, feature vectors CCV* (columns of an approximate matrix CCM*) corresponding to the selected feature vectors (the columns of the original matrix CCM) are selected and the sum vector of the selected feature vectors CCV* (the vectors whose elements are respectively given by the sums of corresponding elements over the selected feature vectors CCV*) is used as a user preference vector UPV*.

In the case in which the sum vector of feature vectors CCV* having high similarity in context is used as a user preference vector UPV*, the resultant user preference vector UPV* is a user preference vector UPV* for a particular context (or a combination of two or more contexts). Hereinafter, such a user preference vector UPV* for a particular context will be referred to as a context user preference vector CUPV* to distinguish from other user preference vectors UPV*. That is, in the present description, a context user preference vector CUPV* is definitely distinguished from a user preference vector UPV* produced by directly using a column (feature vector CCV*) of an approximate matrix CCM*.

The user preference vectors UPV* (or the context user preference vectors CUPV*) produced in the above-described manner are supplied to the related information acquisition unit 8. The user preference vectors UPV* (or the context user preference vectors CUPV*) are also supplied to the UPV storage unit 6 and stored therein.

Now, the matching unit 3 is explained. The matching unit 3 includes a matching calculator 31. The matching calculator 31 produces a feature vector CCV in the standard form by employing, as its elements, weight values assigned to each piece of information supplied from the meta information acquisition unit 1. The matching calculator 31 then calculates the similarity of this feature vector CCV with respect to each user preference vector UPV* stored in the UPV storage unit 6 and supplies the calculation result to the recommender 9.

More specifically, when the recommender 9 recommends a content well matching a present context in which a user is, the matching calculator 31 first acquires context information indicating the present context of the user from the meta information acquisition unit 1, and produces a feature vector CCV in the standard form whose elements are given by respective weight values of the context information and whose elements corresponding to content meta information are all 0. The matching calculator 31 calculates the similarity of this feature vector CCV with respect to each of the plurality of context user preference vectors CUPV* stored in the UPV storage unit 6, and employs a context user preference vector CUPV* with highest similarity as a context user preference vector CUPV* that best matches the current context in which the user is.

Such a context user preference vector UPV* selected by the matching calculator 31 as a context user preference vector UPV* matching the current context in which the a user is referred to as a specific context user preference vector sCUPV* to distinguish from other context user preference vectors UPV*.

In the case in which not context user preference vectors CUPV* but columns (feature vectors CCV*) of an approximate matrix CCM* are directly stored as user preference vectors UPV* in the UPV storage unit 6, the matching calculator 31 calculates the similarity of the feature vector CCV indicating the current context in which the user is with respect to each of the user preference vectors UPV* stored in the UPV storage unit 6. The matching calculator 31 selects some user preference vectors UPV* having similarity equal to or higher than a threshold value, produces a vector in the standard form whose elements are each given by the sums of corresponding elements of the selected user preference vectors UPV* (that is, the sum vector of the selected user preference vector UPV* is produced), and employs the produced vector as a context user preference vector CUPV* for the current context in which the user is, that is, as the specific context user preference vector sCUPV*.

Each time the matching calculator 31 receives content meta information associated with a candidate content to be recommended from the meta information acquisition unit 1, the matching calculator 31 produces a feature vector CCV in the standard form whose elements are given by respective weight values of the context information and whose elements corresponding to context information are all 0. The matching calculator 31 calculates the similarity of the feature vector CCV with respect to the specific context user preference vector sCUPV* and supplies the calculation result to the recommender 9.

In response to receiving the calculation result, the recommender 9 selects a content corresponding to a feature vector CCV with highest similarity to the specific context user preference vector sCUPV* and recommends the selected content to the user. The recommender 9 may select one or more contents corresponding to feature vectors CCV whose similarity is equal to or higher than the threshold value, based on the calculation result (in terms of similarity) supplied from the matching calculator 31, and may recommend the selected contents to the user.

As described above, contents that are recommended to the user are those corresponding to feature vectors CCV having high similarity with respect to the specific context user preference vector sCUPV* (context user preference vector CUPV* that matches the current context in which the user is). That is, of various contents preferred by the user, a content that best matches the current context of the user is recommended to the user. This results in a reduction in probability that the recommended content is refused by the user.

In the example described above, in the feature vector CCV corresponding to a candidate content to be recommended, elements associated with context information are all 0. However, those elements do not necessarily need to be zero, but values other than 0 may be substituted in those elements. There is not particular restriction on the values of those elements. For example, weight values used in a particular context in which the content was used by another user may be employed, or the user may assign particular weight values to the context in which the content is predicted to be used by the user.

The lexical dictionary generator 7 produces a lexical dictionary for the user, for example, by using the optimum space UPS produced by the space/UPV generator 2, that is, by using the component matrix $U_k$ of the approximate matrix CCM* $(=D_k)$ in equation (2). More specifically, the lexical dictionary generator 7 detects an element having a value equal to or greater than a threshold value from those of the approximate matrix CCM* $(=D_k)$ produced using the component matrix $U_k$ (according to equation (2), and registers a word corresponding to the detected element as a word being of interest to the user (for example, "kindergarten" in FIG. 11 is registered) in the lexical dictionary. The lexical dictionary generator 7 may detect, from the elements of the approximate matrix CCM* $(=D_k)$, an element whose maximum value or average value is less than a threshold value, and may register a word corresponding to the detected element as a word being not of interest to the user (for example, "party" or "beer" in FIG. 11 may be registered) in the lexical dictionary.

The related information acquisition unit 8 selects important words related to the preference of the user for each user preference vector UPV* supplied from the space/UPV generator 2, and the related information acquisition unit 8 acquired information related to the selected important words by means of Web searching or the like. The acquired related information is supplied to the recommender 9 as required. Upon receiving the related information from the related information acquisition unit 8, the recommender 9 presents the related information together with a recommended content to indicate the reason for the recommendation of the content, or the recommender 9 determines whether or not a content should be recommended taking into account the supplied related information.

Now, referring to a flow chart shown in FIG. 3, a process performed by the information processing apparatus (shown in FIG. 1) to produce a user preference vector UPV* (based on an approximate matrix CCM*) is described below (hereinafter, this process will be referred to as a UPV generation process).

By way of example, it is assumed herein that documents of seven mails (denoted as DOC1 to DOC7) received (read) by a user are dealt with as contents, and places (home or company) at which the documents DOC1 to DOC7 were read by the user and emotional states (relaxed, tense, happy, or sad state) in which the documents were read are dealt with as contexts.

More specifically, in this example, the text acquisition unit 11 of the meta information acquisition unit 1 acquires documents DOC1 to DOC7, and the text analyzer 12 decomposes each of these documents DOC1 to DOC7 words (of noun) such as those listed blow from (I) to (VII). Furthermore, the context acquisition unit 14 acquires words enclosed in parentheses in (I) to (VII) as contexts for the respective documents DOC1 to DOC7.

(I) kindergarten, child, kindergarten, child, early leaving (company, happy), (II) urgent, call (company, tense), (III) child, sea, child (home, happy), (IV) party, beer (company, relaxed), (V) urgent, patent (company, tense), (VI) kindergarten, kindergarten, child, cold (home, sad), and (VII) cold, early leaving (company, sad)

Data indicating those words listed above from (I) to (VII) are supplied from the meta information acquisition unit 1 to the space/UPV generator 2.

In step S1, the feature vector (CCV) generator 21 of the space/UPV generator 2 produces feature vectors CCV corresponding to (I) to (VII) (hereinafter, respectively referred to as feature vectors $CCV_1$ to $CCV_7$) and stores them in the CCV storage unit 4.

Hereinafter, this process (in step S1) performed by the feature vector (CCV) generator 21 will be referred to as a CCV generation process. FIG. 4 shows an example of a detailed flow of the CCV generation process according to the first embodiment. Referring to FIG. 4, the details of the CCV generation process according to the first embodiment is described below.

First, in step S21, the feature vector (CCV) generator 21 acquires content meta information and context information. More specifically, in the present example, the feature vector (CCV) generator 21 acquires data of kindergarten", "child", "kindergarten", "child", and "early leaving" in (I) as content meta information of the document (content) DOC1, and acquires data of "company" and "happy" in (I) as content information of the document DOC1.

In step S22, the feature vector (CCV) generator 21 assigns weights (numeric values) to content meta information and context information. In the present embodiment, the weighting is performed according to the numbers of occurrences of words, although there is no particular restriction on the method of weighting. For example, in the document DOC1, kindergarten" occurs twice in the content meta information of the document DOC1, and thus "2" is assigned as a weight to "kindergarten". Similarly, "2" is assigned to "child" and "1" is assigned to "early leaving" in the content meta information of the document DOC1. The context information of the document DOC1 is also given in the form of words, and weights are assigned in a similar manner to the content meta information. More specifically, in the present example, "1" is assigned to both "company" and "happy".

In step S23, the feature vector (CCV) generator 21 generates a feature vector CCV whose elements are given by weight values assigned to content meta information and context information.

In the present embodiment, the feature vector is expressed in a standard vector form shown in FIG. 5, although there is no particular restriction on the dimension and elements of the feature vector CCV. In the specific example shown in FIG. 5, the feature vector CCV is given as a 16-dimensional vector ("kindergarten", "child", "early leaving", "urgent", "call", "sea", "party", "beer", "patent", "cold" "home", "company", relaxed", "tense", "happy", "sad"). Note that actually not a word but a corresponding weight is substituted in each of the 16 elements of the feature vector CCV.

More specifically, in the present example (the document DOC1), the feature vector (CCV) generator 21 generates a feature vector $CCV_1$ for the document DOC1 such that 2" is substituted in a 1st element corresponding to "kindergarten", 2" in a 2nd element corresponding to "child", 1" in a 3rd element corresponding to "early leaving", 1" in a 12th element corresponding to "company", 1" in a 16th element corresponding to "sad", and 0" in the other elements (4th to 11th elements and 13th to 15th elements). That is, as shown in FIG. 5, the feature vector $CCV_1$ for the document DOC1 is given by (2, 2, 1, 0, 0, 0, 0, 0, 0, 0, 0, 1, 0, 0, 0, 1).

In step S24, the feature vector (CCV) generator 21 stores the feature vector CCV (in this specific example, the feature vector CCV 1 associated with the document DOC1) produced in immediately previous step S23 into the CCV storage unit 4.

In step S25, the feature vector (CCV) generator 21 determines whether to produce more feature vectors CCV of other contents.

In this specific case, more feature vectors CCV should be produced for the remaining documents DOC2 to DOC7, steps S21 to S25 are performed repeatedly to produce feature vectors $CCV_2$ to $CCV_7$ for the documents DOC2 to DOC7 as shown in FIG. 5. The resultant feature vectors CCV are stored in the CCV storage unit 4.

If the feature vectors CCV (the feature vectors $CCV_1$ to $CCV_7$ in this specific example) for all contents have been stored in the CCV storage unit in the above-described manner, then the result of the decision step S25 becomes No, and the process proceeds to step S26. In step S26, the feature vector (CCV) generator 21 adjusts the weights assigned to the respective elements of the feature vectors CCV.

In the case in which each of element values (weight values of content meta information and context information) of each feature vector CCV is multiplied by a variable coefficient as described earlier, the element values can be adjusted in step S26 simply by modifying one or more variable coefficients corresponding to weight values that should be adjusted.

When the adjustment of the weights is completed, the CCV generation process is ended.

Referring again to FIG. 3, in step S2, after completion of the CCV generation process (step S1), the matrix calculator (space generator) 22 produces a matrix CCM based on the plurality of feature vectors CCV stored in the CCV storage unit 4, further generates an approximate matrix CCM* of the matrix CCM, and supplies the resultant approximate matrix CCM* to the user preference vector (UPV) generator 23.

Hereinafter, the above-described process (step S2) performed by the matrix calculator (space generator) 22 is referred to as an approximate matrix (space) generation process. FIG. 6 shows an example of a detailed flow of the approximate matrix (space) generation process according to the first embodiment. Referring to FIG. 6, the details of the approximate matrix (space) generation process according to the first embodiment are described below.

First, in step S41, the matrix calculator (space generator) 22 acquires a plurality of feature vectors CCV from the CCV storage unit 4. More specifically, in the present example, the matrix calculator (space generator) 22 acquires feature vectors $CCV_1$ to $CCV_7$.

In step S42, the matrix calculator (space generator) 22 produces a matrix CCM including, as column components, the plurality of feature vectors CCV. More specifically, in the present example, the matrix calculator (space generator) 22 produces a matrix D such as that shown in FIG. 7 as the matrix CCM.

In step S43, the matrix calculator (space generator) 22 decomposes the matrix CCM into the product of component matrices $U_k$, $\Sigma_k$, and $V_k$ as shown on the right-hand side of equation (2) by means of singular value decomposition and reduction of order (thereby producing an optimum space UPS). In step S44, these component matrices $U_k$, $\Sigma_k$, and $V_k$ are stored in the component matrix storage unit 5.

In step S45, the matrix calculator (space generator) 22 produces an approximate matrix CCM* of matrix CCM using component matrices $U_k$, $\Sigma_k$, and $V_k$ (by calculating the expression on the right-hand side of equation (2)), and supplies the resultant approximate matrix CCM* to the user preference vector (UPV) generator 23.

More specifically, in the present example, steps S43 to S45 are performed as follows. The matrix calculator (space generator) 22 decomposes the matrix D (matrix CCM) shown in FIG. 7 into the product of component matrices U, Σ, and V by means of singular value decomposition so as to satisfy equation (1). The component matrices U, Σ, and V obtained (from the matrix D shown in FIG. 7) via the above process are respectively shown in FIG. 8 to 10.

Figure 9:
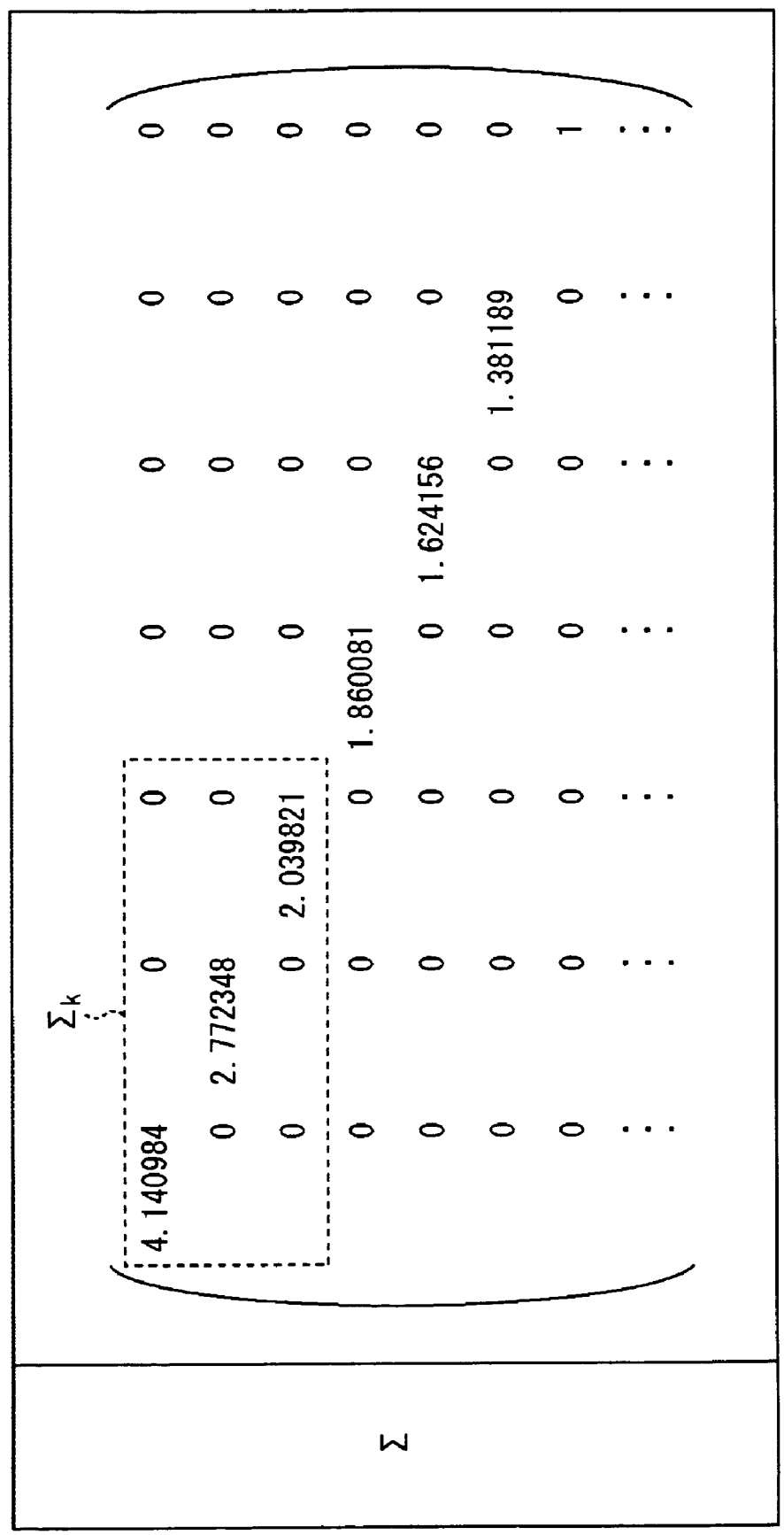
FIG. 9 is a diagram showing one of component matrices obtained by singular value decomposition of the matrix shown in FIG. 7.

Although the component matrix Z actually has 16 rows and 7 columns, only 1st to 7th rows (in the upper region of the matrix Σ) are shown in FIG. 9 because 7×7 elements in the upper left region of the matrix Σ form a diagonal matrix as shown in FIG. 9, and all the other elements are 0.

Figure 8:
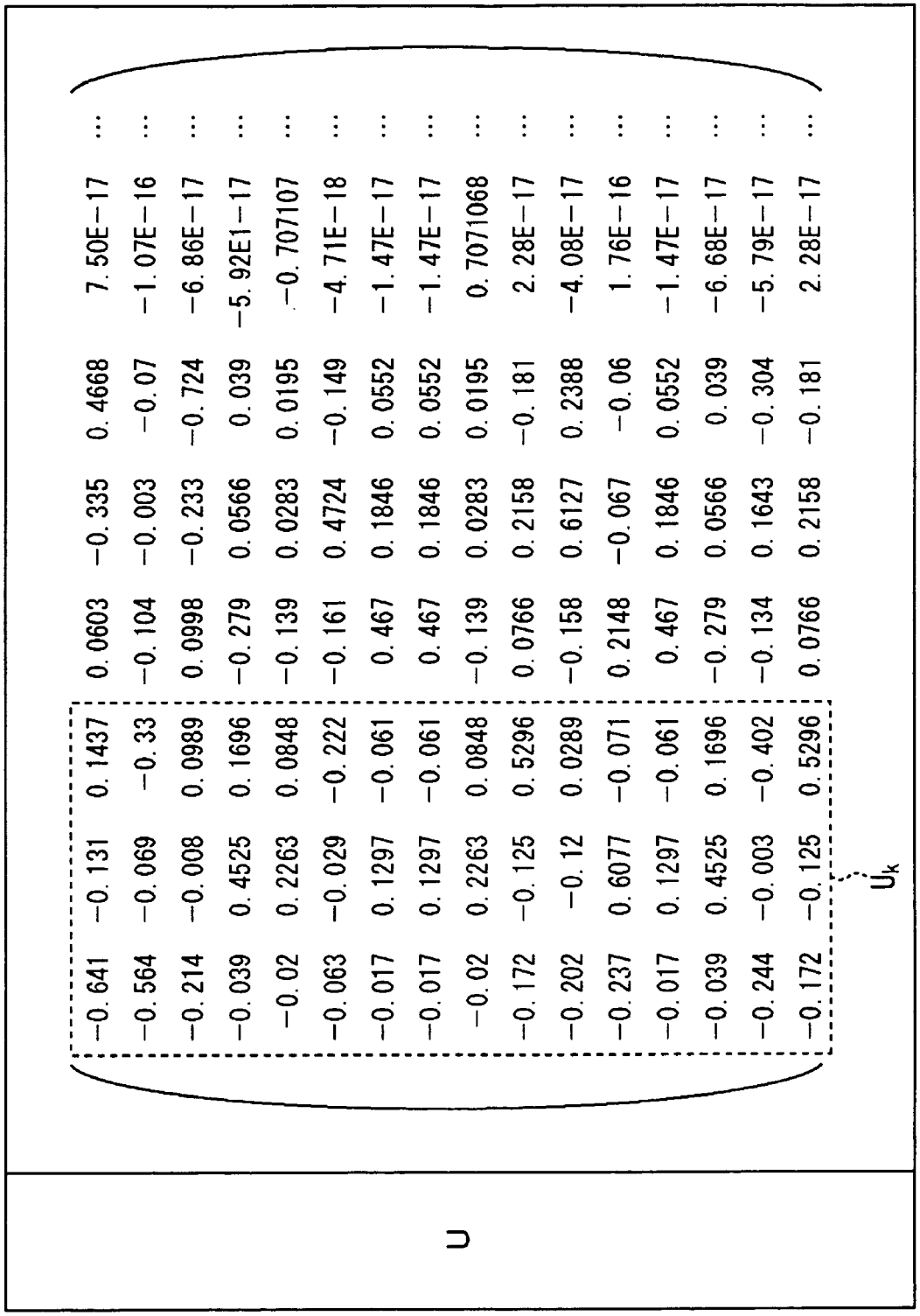
FIG. 8 is a diagram showing one of component matrices obtained by singular value decomposition of the matrix shown in FIG. 7.

The component matrix U actually has 16 rows and 16 columns, only 1st to 7th columns are shown in FIG. 8. Note that in the calculation of U×Σ, even if columns (8th to 16th columns) that are not shown in FIG. 8 have any value, when these columns are multiplied by corresponding rows of the matrix Σ, the result becomes 0 because the corresponding rows of the matrix Σ are 0 in all elements.

As described above, the matrix calculator (space generator) 22 produces a 16×3 matrix $U_k$ by extracting 1st to 3rd columns (left singular vectors, enclosed in a dotted-line frame shown in FIG. 8) from the component matrix U shown in FIG. 8.

Furthermore, the matrix calculator (space generator) 22 produces a 7×3 matrix $V_k$ by extracting 1st to 3rd columns (right singular vectors, enclosed in a dotted-line frame shown in FIG. 10) from the component matrix V shown in FIG. 10, and the matrix calculator (space generator) 22 produces a 3×3 matrix $\Sigma_k$ by extracting 3×3 elements in the upper left region (enclosed in a dotted-line frame shown in FIG. 9) of the matrix Σ shown in FIG. 9.

After the matrix calculator (space generator) 22 stores the obtained component matrices $U_k$, $\Sigma_k$, and $V_k$ in the component matrix storage unit 5, the matrix calculator (space generator) 22 substitutes these component matrices $U_k$, $\Sigma_k$, and $V_k$ into the right-hand side of equation (2) thereby producing a matrix $D_k$ whose rank is reduced to 3 such as that shown in FIG. 11. The resultant matrix $D_k$ is supplied as an approximate matrix CCM* of matrix CCM to the user preference vector (UPV) generator 23.

Thus, the approximate matrix (space) generation process is completed.

Referring again to FIG. 3, in step S3, after completion of the approximate matrix (space) generation process (step S2), the user preference vector (UPV) generator 23 determines the type of a user preference vector UPV* to be produced, that is, the user preference vector (UPV) generator 23 determines whether to produce a user preference vector UPV* for each context, that is, a context user preference vector CUPV*.

If the user preference vector (UPV) generator 23 determines in step S3 that the user preference vector to be produced is not of the type of context user preference vector CUPV*, the user preference vector (UPV) generator 23 performs steps S4 and S5.

In step S4, the user preference vector (UPV) generator 23 produces user preference vectors UPV* by employing respective columns of the approximate matrix CCM*, that is, respective feature vectors CCV* in the approximate matrix CCM* as preference vectors UPV*. In step S5, the user preference vector (UPV) generator 23 stores these user preference vectors UPV* in the UPV storage unit 6. More specifically, in the present example, the matrix $D_k$ shown in FIG. 11 is produced as the approximate matrix CCM* in the approximate matrix (space) generation process (step S2), and each row of the approximate matrix CCM*, that is, each of the feature vectors $CCV^*_1$ to $CCV^*_7$ shown in FIG. 11 is employed as a user preference vector UPV* and stored in the UPV storage unit 6.

Thus, the UPV generation process is completed.

On the other hand, if it is determined in step S3 that the user preference vector to be produced is of the type of context user preference vector CUPV*, then the process proceeds to step S6, in which the user preference vector (UPV) generator 23 produces a context user preference vector CUPV*.

Hereinafter, the process performed (in step S6) by the user preference vector (UPV) generator 23 to produce a context user preference vector CUPV* is referred to as a CUPV generation process. FIG. 12 shows an example of a detailed flow of the CUPV generation process according to the first embodiment. Referring to FIG. 12, the details of the CUPV generation process according to the first embodiment is described below.

First, in step S61, the user preference vector (UPV) generator 23 calculates the similarity of terms among columns of the approximate matrix CCM*, that is, the similarity among the feature vectors CCV* of the approximate matrix CCM* in terms of context information described in respective elements. More specifically, in the present example, after the matrix $D_k$ shown in FIG. 11 is produced as the approximate matrix CCM* in the approximate matrix (space) generation process (step S2), similarity among the columns of the approximate matrix CCM*, that is, among the feature vectors $CCV^*_1$ to $CCV^*_7$ in terms of elements associated with context information ("home", "company", "relaxed", "tense", "happy", "sad") is calculated.

In step S62, the user preference vector (UPV) generator 23 classifies each of the feature vectors CCV* (in this specific example, feature vectors $CCV^*_1$ to $CCV^*_7$ shown in FIG. 11). More specifically, based on the result of the calculation in step S61, the user preference vector (UPV) generator 23 classify feature vectors CCV* having similarity equal to or greater than a threshold value into the same class.

Hereinafter, in step S63, the user preference vector (UPV) generator 23 calculates the sum of the values of each element (for example, the sum of the values of element "kindergarten") for the feature vectors CCV* belonging to each class, and the user preference vector (UPV) generator 23 produces a vector whose elements are given by the calculated sums of values of the respective elements for each class. The resultant vector for each class is employed as a context user preference vector CUPV* of the class.

In step S64, the user preference vector (UPV) generator 23 stores the context user preference vectors CUPV* produced for the respective classes in the UPV storage unit 6.

Thus, the CUPV generation process (in step S6 in FIG. 3) in FIG. 12 is completed, and the UPV generation process in FIG. 3 is completed.

Now, referring to a flow chart shown in FIG. 13, a description is provided as to a process performed by the information processing apparatus according to the first embodiment (FIG. 1) to recommend a content that well matches a current context in which a user is, based on user preference vectors UPV* that have already been prepared.

In step S101, based on the user preference vectors UPV* (or the context user preference vectors CUPV*) stored in the UPV storage unit 6, the matching calculator 31 of the matching unit 3 produces a specific context user preference vector sCUPV* that well matches the current context in which the user is.

Hereinafter, the process performed (in step S101) by the matching calculator 31 to set the specific context user preference vector sCUPV* will be referred to as a CUPV setting process. FIG. 14 shows an example of a detailed flow of the CUPV setting process according to the first embodiment. Referring to FIG. 14, the CUPV setting process according to the first embodiment is described in detail below.

First, in step S121, the matching calculator 31 acquires the current context information from the meta information acquisition unit 1 (the context acquisition unit 14).

Herein, let us assume that in step S121, the matching calculator 31 acquires, for example, "home" and "happy" from the meta information acquisition unit 1 as the current context information. That is, a user is currently in the context in which the user is at home and feels happy.

In this case, in step S122, the matching calculator 31 produces a feature vector CCV from the current context information. That is, as shown in FIG. 15, the matching calculator 31 produces a feature vector CCV such that 1" is set to an element (11th element) corresponding to "home", 1" is set to an element (15th element) corresponding to "happy", and "0" is set to the other elements (1st to 10th elements, 12th to 14th elements, and 16th element). Hereinafter, the feature vector CCV produces by the matching calculator 31 in the above-described manner, that is, the feature vector CCV indicating the current context in which the user is, will be referred to as the current context feature vector cCCV to distinguish from the other feature vectors CCV. In this specific example, in step S122, the matching calculator 31 produces the current context feature vector cCCV as shown in FIG. 15.

In step S123, the matching calculator 31 calculates the similarity of the current context feature vector cCCV with respect to each of the user preference vectors UPV* (or context user preference vectors CUPV*) stored in the UPV storage unit 6.

In step S124, the matching calculator 31 determines whether the calculation of the similarity performed in step S123 is with respect to context user preference vectors CUPV*.

If it is determined in step S124 that the calculation of the similarity is with respect to context user preference vectors CUPV*, then the process proceeds to step S125. In step S125, the matching calculator 31 selects a context user preference vector CUPV* having highest similarity and employs it as the specific context user preference vector sCUPV*.

On the other hand, if it is determined in step S124 that the calculation of the similarity is not with respect to context user preference vectors CUPV*, the process proceeds to step S126. In step S126, the matching calculator 31 determines the sum vector given by the sum of user preference vectors UPV* having similarity equal to or higher than a threshold value, and the matching calculator 31 employs it as the specific context user preference vector sCUPV*.

More specifically, in the present example, the similarity of the current context feature vector cCCV shown in FIG. 15 with respect to each of the feature vectors $CCV^*_1$ to $CCV^*_7$ shown in FIG. 11 (user preference vectors UPV* stored in the UPV storage unit 6) is calculated as shown in FIG. 16.

If the threshold value is set to be, for example, 0.8, then, in the above-described step S126, the matching calculator 31 calculates the sum of the feature vector $CCV^*_1$ and the feature vector $CCV^*_3$ and employs the resultant sum vector as the specific context user preference vector sCUPV*.

Note that in a case in which the user preference vectors UPV* are given by the columns of the original matrix CCM shown in FIG. 7, that is, by the feature vectors $CCV_1$ to $CCV_7$ shown in FIG. 5, only the feature vector having the same elements associated with context information as elements of the current context feature vector cCCV (FIG. 15), that is, $CCV_3$ whose elements associated with "home" and "happy" are equal to "1" and the other elements are equal to "0" is reflected in the generation of the specific context user preference vector sCUPV*. In contrast, in this example, the user preference vectors UPV* are given by columns of the approximate matrix CCM* shown in FIG. 11, that is, by the feature vectors $CCV^*_1$ to $CCV^*_7$ shown in FIG. 11, not only the feature vector $CCV^*_3$ corresponding to the feature vector $CCV_3$ but also the feature vector $CCV^*_1$ corresponding to the feature vector $CCV_1$ is reflected in the generation of the specific context user preference vector sCUPV*.

Note that in the approximate matrix CCM* produced from the original matrix CCM shown in FIG. 7 by the space/UPV generator 2 by means of the LSI method (by performing the approximate matrix (space) generation process shown in FIG. 6), correlations among the elements (among content meta information and context information) clearly appears in feature vectors $CCV^*_1$ to $CCV^*_7$, although correlations are not clear in the feature vectors $CCV_1$ to $CCV_7$ shown in FIG. 5. Furthermore, it is clearly seen that the context of the content (DOC1) corresponding to the feature vector $CCV^*_1$ is similar to the current context.

That is, in the case in which the feature vectors $CCV_1$ to $CCV_7$ shown in FIG. 5 are directly used as user preference vectors UPV*, the feature vector $CCV_6$ is similar to the current context feature vector cCCV shown in FIG. 15 in that the element of "home" has a value "1", and the feature vector $CCV_1$ is similar to the current context feature vector cCCV shown in FIG. 15 in that the element of "happy" has a value "1". In this case, therefore, the similarity of the feature vector $CCV_6$ and the similarity of the feature vector $CCV_1$ with respect to the current context feature vector cCCV shown in FIG. 15 are equal. In contrast, in the case in which correlations among elements (among content meta information and context information) of each content (DOC1 to DCO7) are emphasized by means of the LSI method (weight values of the elements are modified by means of the LSI method), the element of "home" of the feature vector $CCV^*_1$ is modified to about 0.6 that is similar to that of the feature vector $CCV^*_6$, and the element of "happy" of the feature vector $CCV^*_1$ is modified to about 1.06 that is much greater than about 0.16 of the element of "happy" of the feature vector $CCV^*_6$. Thus, in this case, the feature vector $CCV^*_1$ has higher similarity to the current context feature vector cCCV shown in FIG. 15 than the feature vector $CCV^*_6$. That is, the conversion into the feature vectors $CCV^*_1$ to $CCV^*_7$ reveals that the document DOC1 used by the user in the "company" in a "happy" emotional state is better matches the current context (in which the user is at "home" in a "happy" emotional state) than the document DOC6 used at "home" in a "sad" emotional state.

In the present invention, the conversion of feature vectors using the LSI method provides not only a first advantage that the number of dimension is reduced, but also a second advantage that correlations among elements of each vector become more clear in a feature vector CCV* than in an original feature vector CCV. This second advantage is more important in the present invention, and the main object of the present invention is to achieve this second advantage. That is, the conversion of an original feature vector CCV into a feature vector CCV* makes it possible to easily point out which words (weight values) have a close relation to each other. More specifically, by converting an original feature vector CCV with a large number of dimensions into a low-dimensional feature vector CCV* by means of the LSI method, words that have a close relation to each other but that are scattered over different dimensions in the original feature vector CCV fall onto the same dimension of the feature vector CCV* with reduced dimensions.

As described above, the most significant object of the present invention is to provide the second advantage described above (in addition to the first advantage of less significance), and there is no particular restriction on the method of producing an original feature vector CCV into a feature vector CCV* as long as the second advantage is achieved. That is, the method is not limited to the LSI method but other methods may be used if the original feature vector CCV can be converted into the feature vector CCV* in which correlations among elements become more clear than in the original feature vector CCV.

That is, the structure space/UPV generator 2 is not limited to that shown in FIG. 1, but the space/UPV generator 2 may be constructed in many ways as long as it includes a modifying unit and a generation unit which function as follows. That is, the modifying unit acquires M (integer equal to or greater than 1 (7 sets corresponding to documents DOC1 to DOC7, in the present example)) information sets each including N (inter equal to or greater than 2 (16 in the present example)) pieces of individual information (in the present example, content meta information including "kindergarten", "child", etc., and context information including "home", "happy", etc. shown in FIG. 5) and modifies at least partially the N pieces of the individual information for each of the M information sets such that correlations among the N pieces of individual information are emphasized. The generation unit produces a reference information set (context user preference vector CUPV*, in the present example) including N pieces of individual information, based on the M information sets (approximate matrix CCM*, in the present example) including N pieces of individual information modified by the modification unit.

If the specific context user preference vector sCUPV* is set in the above-described manner in step S125 or S126 in FIG. 14, the CUPV setting process is completed.

Referring again to FIG. 13, if the CUPV setting process (step S101) is completed, the process proceeds to step S102, in which the matching calculator 31 selects a content that best matches the current context of the user from contents preferred by the user, based on the specific context user preference vector sCUPV*, and the recommender 9 presents the selected content as a recommended content to the user.

Hereinafter, the process (step S102) performed by the matching calculator 31 and the recommender 9 to present a recommended content to the user will be referred to as a content recommendation calculation process. FIG. 17 is a flow chart showing an example of a detailed flow of the content recommendation calculation process according to the first embodiment. Referring to FIG. 17, the content recommendation calculation process according to the first embodiment is described in detail below.

First, in step S141, the matching calculator 31 acquires content meta information associated with a plurality of contents that are candidates for contents to be recommended, from the meta information acquisition unit 1 (the text analyzer 12 or the metadata acquisition unit 13).

In step S142, the matching calculator 31 produces a feature vector CCV from each content meta information associated with each candidate content to be recommended. That is, the matching calculator 31 produces a feature vector CCV for each of candidates for contents to be recommended. More specifically, in the present example, a feature vector CCV in the standard form whose elements corresponding to context information, that is, the 11th to 16th elements, are equal to "0" such as that shown in FIG. 11 or 15 is produced.

In step S143, the matching calculator 31 calculates the similarity of each of feature vectors CCV, produced in step S142, corresponding to the respective candidates for contents to be recommended, with respect to the specific context user preference vector sCUPV set in the CUPV setting process in step S101 (FIG. 13 (details thereof are shown in FIG. 14)) and supplies the calculation result to the recommender 9.

In step S144, the recommender 9 selects contents corresponding to feature vectors CCV having similarity higher than a threshold value (or a content corresponding to a feature vector CCV having highest similarity) and recommends the selected content(s) to the user. Thus, the content recommendation calculation process (step S102 shown in FIG. 13) is completed, and the content recommendation process shown in FIG. 13 is also completed.

The feature vector CCV corresponding to the content recommended to the user in the above-described manner has high similarity to the specific context user preference vector sCUPV* (the context user preference vector CUPV* for the current context in which the user is) set in the CUPV setting process in step S101 (shown in FIG. 13 (details thereof are shown in FIG. 14). Thus, of contents preferred by the user, a content that best matches the current context of the user is recommended to the user. This results in a reduction in probability that the recommended content is refused by the user.

That is, as described above, to select a content that well matches the current context in which the user is, a matrix CCM is produced based on feature vectors CCV including content meta information associated with contents experienced by the user and context information, an approximate matrix CCM* of the matrix CCM is produced using the LSI (Latent Semantic Indexing) method or the like, and the matching process is performed based on the approximate matrix CCM* thereby making it possible to discover (reveal) important latent correlations among contents and contexts and thus making it possible to properly recommend a content that well matches the current context in which the user is.

One reason why the above-described advantage can be achieved is that context information and content meta information are dealt with not separately but together, as described above. That is, dealing with context information and content meta information together at the same level makes it possible to select a content not simply based on matching between contents and limited contexts but based on close correlations between contents and contexts revealed via the matching process (using the approximate matrix CCM*) according to the present embodiment.

Although in the example described above, a content that best matches the current context in which the user is (that is, a content having highest similarity in terms of context) is recommended to the user, a content having highest similarity in terms of content may be presented to the user.

Furthermore, another content that best matches a content being currently used by the user may be recommended.

In this case, the matching unit 3 performs the following process. That is, the matching unit 3 acquires content meta information for the content being currently used by the user from the meta information acquisition unit 1, and assigns a weight value to each piece of the acquired content meta information. The weight values assigned to the respective pieces of content meta information are substituted in corresponding elements of the vector in the standard form thereby producing a feature vector CCV for the content being currently used by the user. The matching unit 3 then calculates the similarity of each of the user preference vectors UPV* existing in the UPV storage unit 6 with respect to the produced feature vector CCV. A new user preference vector UPV* (corresponding to the specific context user preference vector sCUPV* described above) is then produced based on user preference vectors UPV* having similarity equal to or greater than a threshold value. The matching unit 3 calculates the similarity of a feature vector CCV of another content with respect to the new user preference vector UPV* and supplies the calculation result to the recommender 9.

Second Embodiment

Referring to FIGS. 18 to FIG. 22, an information processing apparatus according to a second embodiment is described below.

Figure 18:
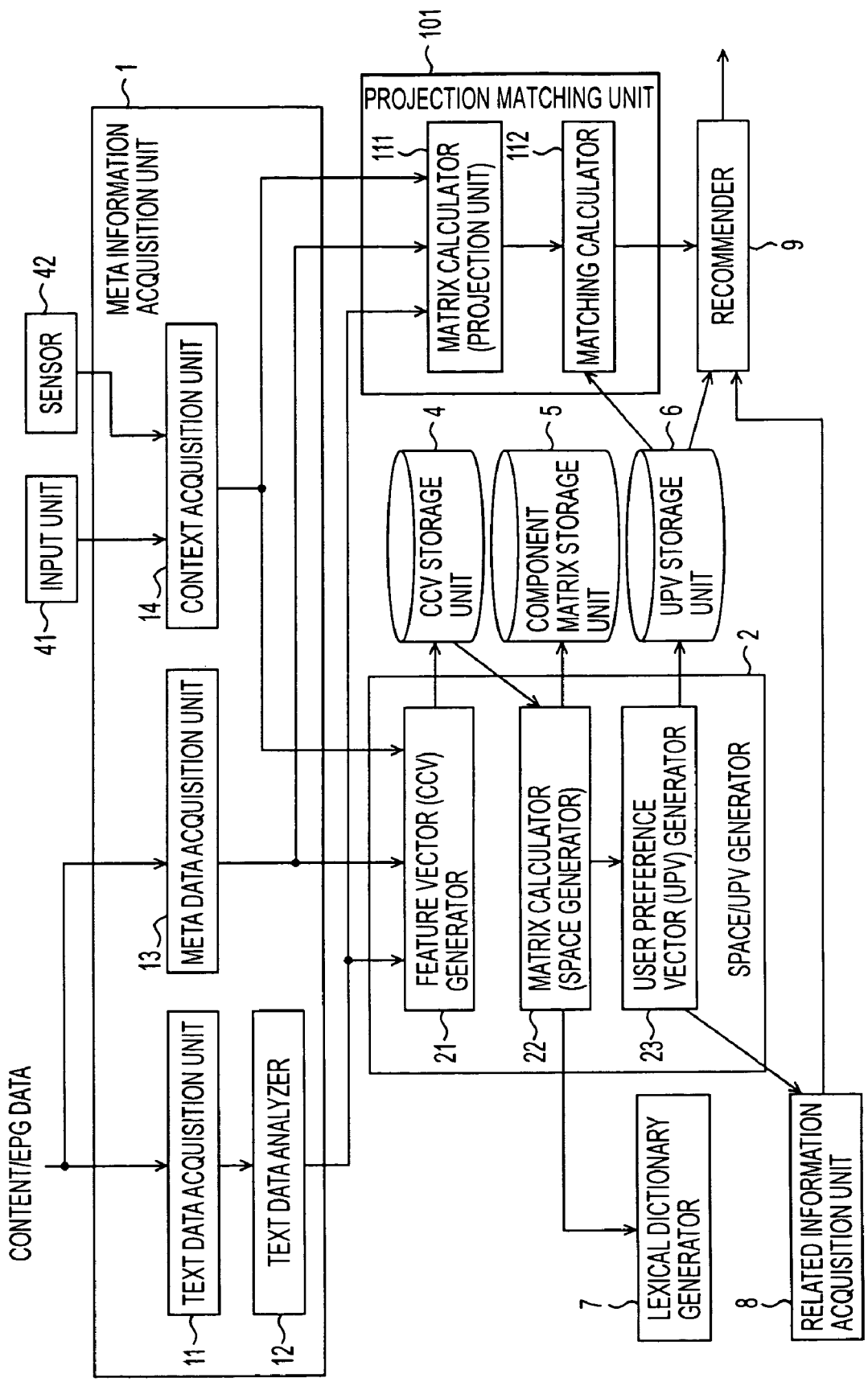
FIG. 18 is a functional block diagram of an information processing apparatus according to another embodiment of the present invention.

FIG. 18 shows an information processing apparatus according to the second embodiment of the invention. In FIG. 18, similar parts to those of the information processing apparatus according to the first embodiment (FIG. 1) are denoted by similar reference numerals.

In the information processing apparatus according to the second embodiment, the matching unit 3 (FIG. 1) according to the first embodiment is replaced with a projection matching unit 101.

As described above, the matching unit 3 according to the first embodiment sets the 16-dimensional specific context user preference vector sCUPV* by calculating the similarity of the 16-dimensional current context feature vector cCCV with respect to each 16-dimensional context user preference vector CUPV* stored in the UPV storage unit 6. The matching unit 3 further calculates the similarity of each of 16-dimensional feature vectors CCV corresponding to candidates for contents to be recommended with respect to the 16-dimensional specific context user preference vector sCUPV* and supplies the calculation result to the recommender 9.

As described above, the matching unit 3 deals with vectors having the same number of dimension (16 dimensions, in the example described above) as the number of dimension of feature vectors CCV produced by the feature vector (CCV) generator 21. Thus, in the first embodiment, as the number of types of contents used by the user increases, the number of pieces of content meta information increases. As a result, the number of dimensions (the number of elements) of feature vectors CCV produced by the feature vector (CCV) generator 21 increases, and thus the number of dimensions of user preference vectors UPV* produced by the user preference vector (UPV) generator 23 increases. This results in an increase in complexity of calculation performed by the matching unit 3.

In the second embodiment, to solve the above problem, the projection matching unit 101 projects elements of vectors to be dealt with in the similarity calculation, that is, the current context feature vector cCCV and feature vector CCV corresponding to candidates for contents to be recommended, into an optimum space UPS produced by the matrix calculator (space generator) 22, thereby reducing the number of dimensions. The projection matching unit 101 then calculates the similarity of each feature vector CCV with reduced dimensions with respect to the user preference vector UPV* with reduced dimensions stored in the UPV storage unit 6. The user preference vector UPV* with reduced dimensions will be described in further detail later.

The projection matching unit 101 includes a matrix calculator (projection unit) 111 and a matching calculator 112.

If the matrix calculator (projection unit) 111 receives a feature vector CCV (context feature vector cCCV or a feature vector CCV of a candidate content to be recommended) from the meta information acquisition unit 1, the matrix calculator (projection unit) 111 reduces the number of dimension of the received feature vector CCV by projecting elements of the feature vector CCV to the optimum space UPS produced by the matrix calculator (space generator) 22. More specifically, the matrix calculator (projection unit) 111 multiplies the received feature vector CCV by the transpose of the component matrix $U_k$ (equation (2)) stored in the component matrix storage unit 5 such that the transpose of the component matrix $U_k$ is multiplied from left, thereby projecting the received feature vector CCV to the optimum space UPS and thus obtaining a feature vector CCV with reduced dimensions. Hereinafter, such a feature vector CCV with reduced dimensions will be referred to as a feature vector CCV#.

As with the matrix calculator (a projection unit) 111, the user preference vector (UPV) generator 23 also projects a produced user preference vector UPV* (a user preference vector UPV* having the same number of dimensions (16 dimensions, in the present example) as that of feature vectors CCV produced by the feature vector (CCV) generator 21) onto the optimum space UPS produced by the matrix calculator (space generator) 22, thereby reducing the number of dimensions. The resultant user preference vectors UPV* with reduced dimensions is stored in the UPV storage unit 6. More specifically, the user preference vector (UPV) generator 23 multiplies the produced user preference vector UPV* by the transpose of the component matrix $U_k$ produced by the matrix calculator (space generator) 22 such that the transpose of the component matrix $U_k$ is multiplied from left, thereby projecting the user preference vector UPV* onto the optimum space UPS and thus obtaining a user preference vectors UPV* with reduced dimensions. Hereinafter, such a user preference vector UPV* with reduced dimensions will be referred to as a user preference vector UPV*#.

As a matter of course, a user preference vector UPV*# with reduced dimensions may be produced by the matrix calculator (projection unit) 111.

The matching calculator 112 calculates the similarity of the feature vector CCV# with reduced dimensions output from the matrix calculator (projection unit) 111 with respect to the user preference vector UPV*# with reduced dimensions existing in the UPV storage unit 6, and supplies the calculation result to the recommender 9 as required.

In the second embodiment, as described above, because the projection matching unit 101 deals with vectors with reduced dimensions, the complexity of calculation processing is lower than the complexity of processing performed by the matching unit 3 (FIG. 1) according to the first embodiment in which original vectors with non-reduced dimensions are dealt with.

There is no restriction on the specific form of the projection matching unit 101, and it may be implemented by means of software, hardware, or a mixture of software and hardware.

In this second embodiment, parts of the information processing apparatus other than the projection matching unit 101 are basically similar to those according to the first embodiment shown in FIG. 1. That is, in FIG. 18, the meta information acquisition unit 1, the space/UPV generator 2, and other parts from the CCV storage unit 4 to the recommender 9 are similar in structure and function to corresponding blocks in FIG. 1, and thus a duplicated description thereof is not given herein.

Now, referring to a flow chart shown in FIG. 19, the UPV generation process performed by the information processing apparatus (FIG. 18) according to the second embodiment is described below.

The flow of the UPV generation process according to the second embodiment is similar in many parts to that according to the first embodiment (FIG. 3). Similar parts to those of the first embodiment are not described again herein, and the following discussion made below with reference to the flow chart shown in FIG. 19 will be focused on parts different from those according to the first embodiment.

Figure 19:
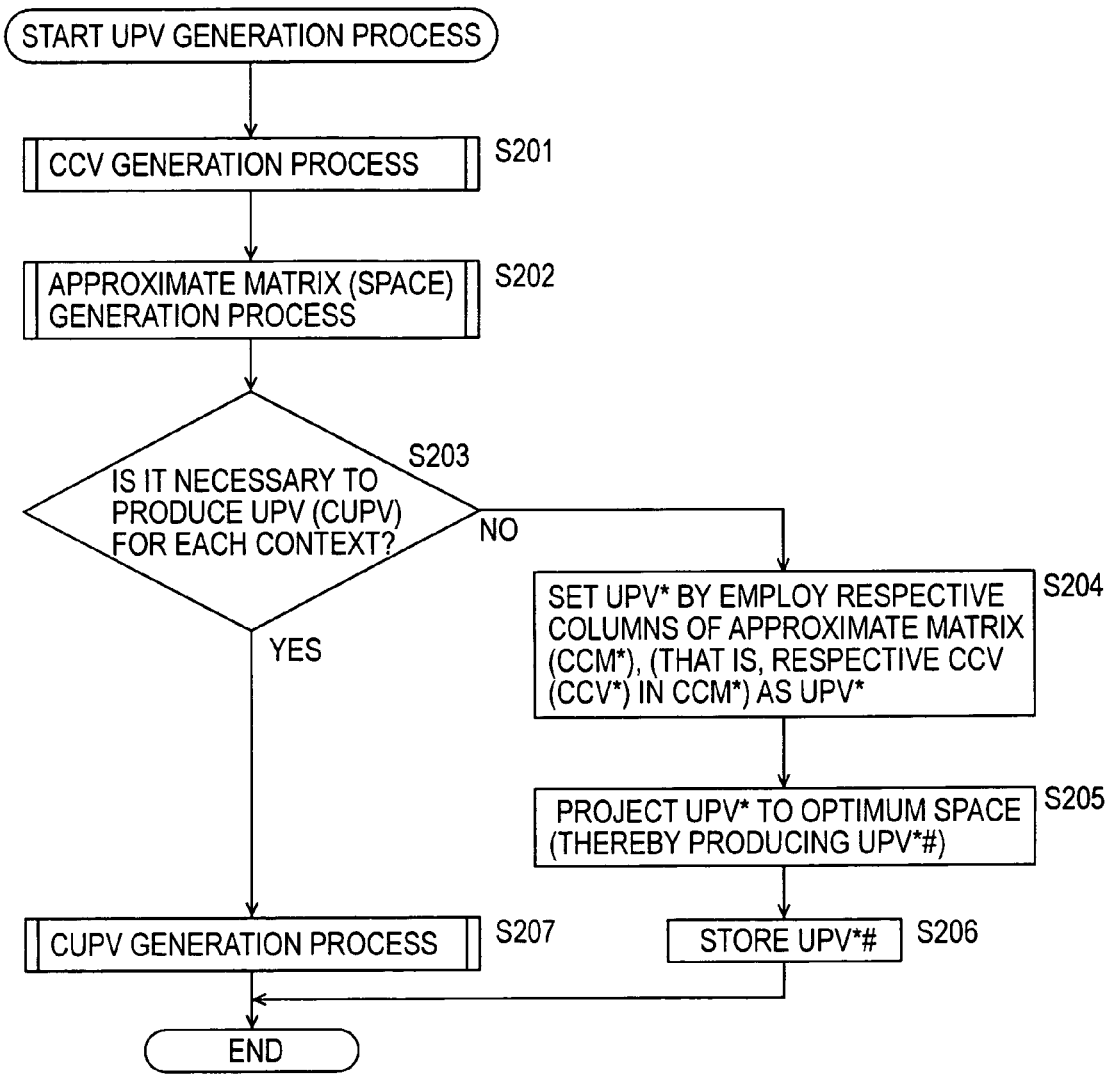
FIG. 19 is a flow chart showing an example of a UPV generation process performed by the information processing apparatus shown in FIG. 18.

The CCV generation process in step S201 in FIG. 19 is performed in basically the same manner as the CCV generation process in step S1 in FIG. 3, and the approximate matrix (space) generation process in step S202 in FIG. 19 is performed in basically the same manner as the approximate matrix (space) generation process in step S2 in FIG. 3.

After the approximate matrix (space) generation process (step S202) is completed, then in step S203, the user preference vector (UPV) generator 23 determines whether the type of the user preference vector UPV* to be produced is the user preference vector CUPV* for each context.

If the user preference vector (UPV) generator 23 determines in step S203 that the type of the user preference vector UPV* to be produced is not the user preference vector CUPV*, the user preference vector (UPV) generator 23 performs steps S204 to S206.

In this case, first, in step S204, the user preference vector (UPV) generator 23 sets user preference vectors UPV* such that the columns of the approximate matrix CCM*, that is, the feature vectors CCV* in the approximate matrix CCM* are respectively employed as the user preference vectors UPV*.

In step S205, the user preference vector (UPV) generator 23 projects each user preference vector UPV* onto the optimum space UPS (thereby producing user preference vectors UPV*# with reduced dimensions).

In step S206, the user preference vector (UPV) generator 23 stores these user preference vectors UPV*# with reduced dimensions in the UPV storage unit 6.

Thus, the UPV generation process according to the second embodiment is completed.

On the other hand in the case in which the user preference vector (UPV) generator 23 determines in step S203 that the type of the user preference vector UPV* to be produced is the user preference vector CUPV*, the user preference vector (UPV) generator 23 performs the CUPV generation process in step S207. That is, in step S207, the user preference vector (UPV) generator 23 produces a context user preference vector CUPV*# with reduced dimensions.

Figure 20:
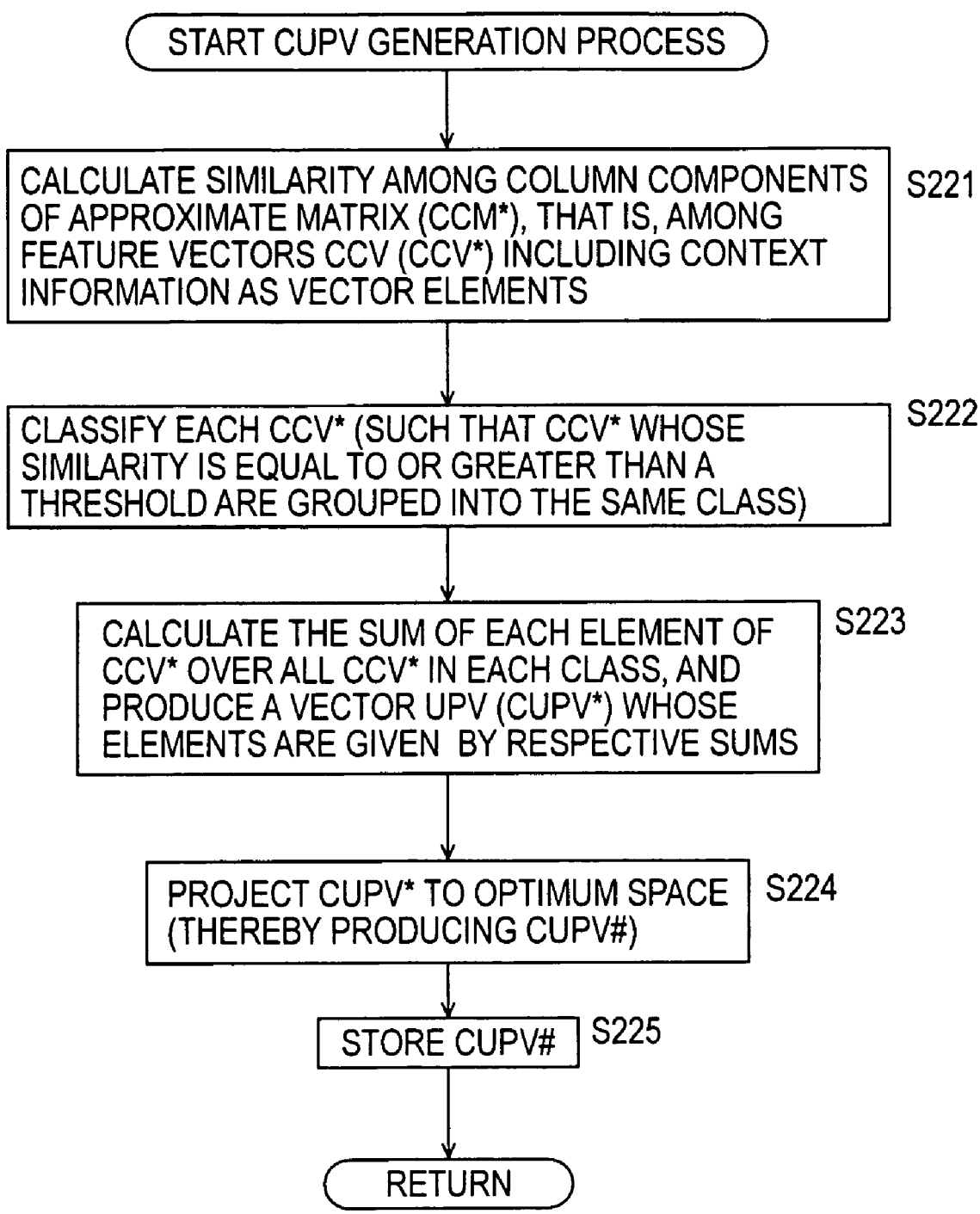
FIG. 20 is a flow chart illustrating an example of a detailed flow of a CUPV generation process in the UPV generation process shown in FIG. 19.

FIG. 20 shows an example of a detailed flow of the CUPV generation process according to the second embodiment. The flow of the CUPV generation process according to the second embodiment is similar in many parts to that according to the first embodiment (FIG. 12). Similar parts to those of the first embodiment are not described again herein, and the following discussion made below with reference to the flow chart shown in FIG. 20 will be focused on parts different from those according to the first embodiment.

Steps S221 to S223 in FIG. 20 are performed in basically the same manner as steps S61 to S63 in FIG. 12. After steps S221 to S223 are completed, the process is performed as follows.

That is, after the context user preference vector CUPV* is set for each class in step S223, the process proceeds to step S224, in which the user preference vector (UPV) generator 23 projects the context user preference vector CUPV* of each class onto the optimum space UPS (thereby producing a context user preference vector CUPV*# with reduced dimensions for each class).

In step S225, the user preference vector (UPV) generator 23 stores the context user preference vectors CUPV*#, with reduced dimensions produced for the respective classes in the UPV storage unit 6.

Thus, the CUPV generation process (in step S207 in FIG. 19) according to the second embodiment is completed, and the UPV generation process according to the second embodiment is completed.

The content recommendation process performed by the information processing apparatus according to the second embodiment is described below.

The flow of the content recommendation process according to the second embodiment is similar to the flow according to the first embodiment shown in FIG. 13.

However, the CUPV setting process (step S101) according to the second embodiment is slightly different from that according to the first embodiment (FIG. 14), and the content recommendation calculation process (step S102) according to the second embodiment is slightly different from that according to the first embodiment (FIG. 17).

Figure 21:
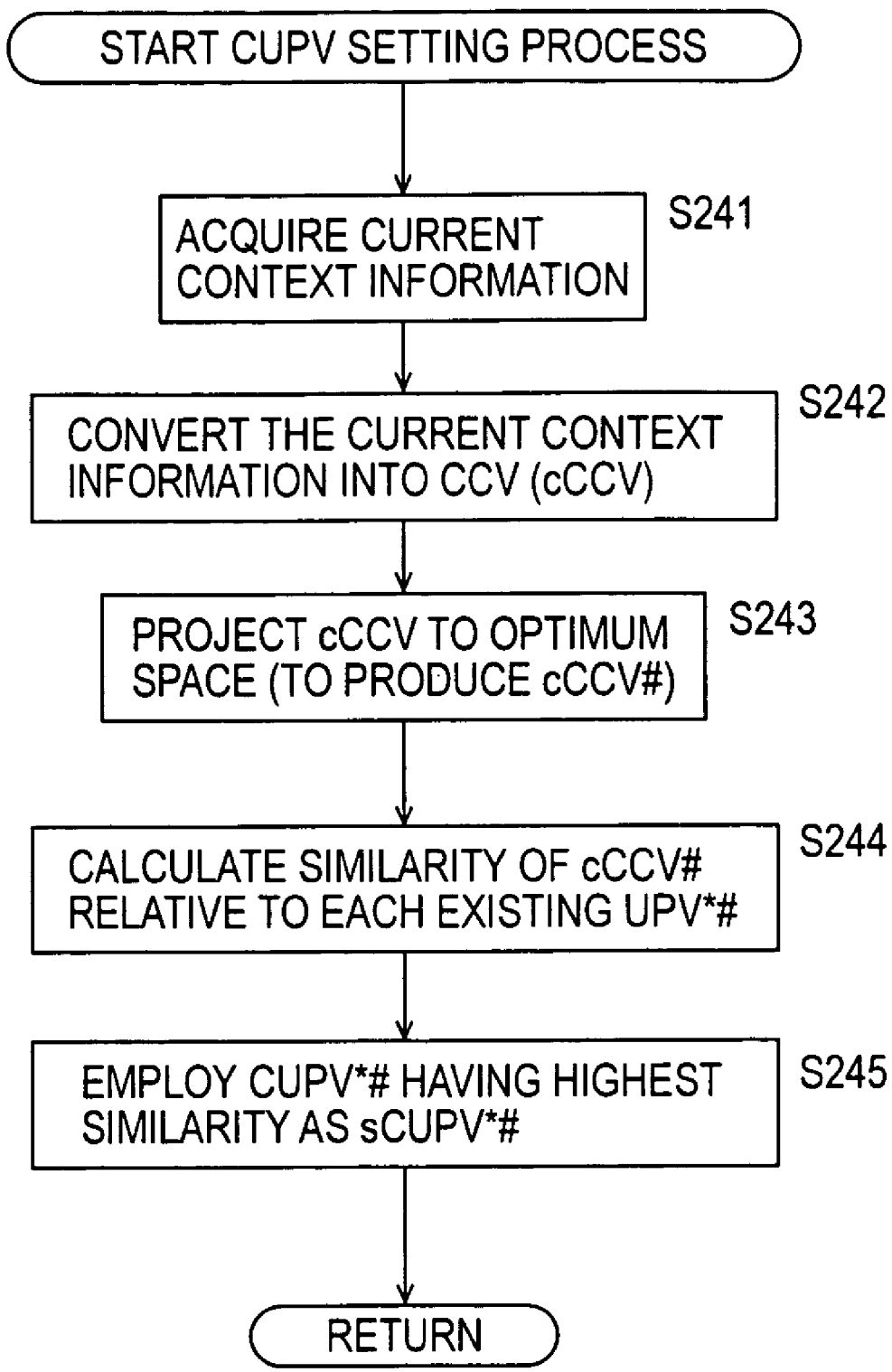
FIG. 21 is a flow chart showing an example of a CUPV setting process in a content recommendation process shown in FIG. 13 performed by the information processing apparatus shown in FIG. 18.
Figure 22:
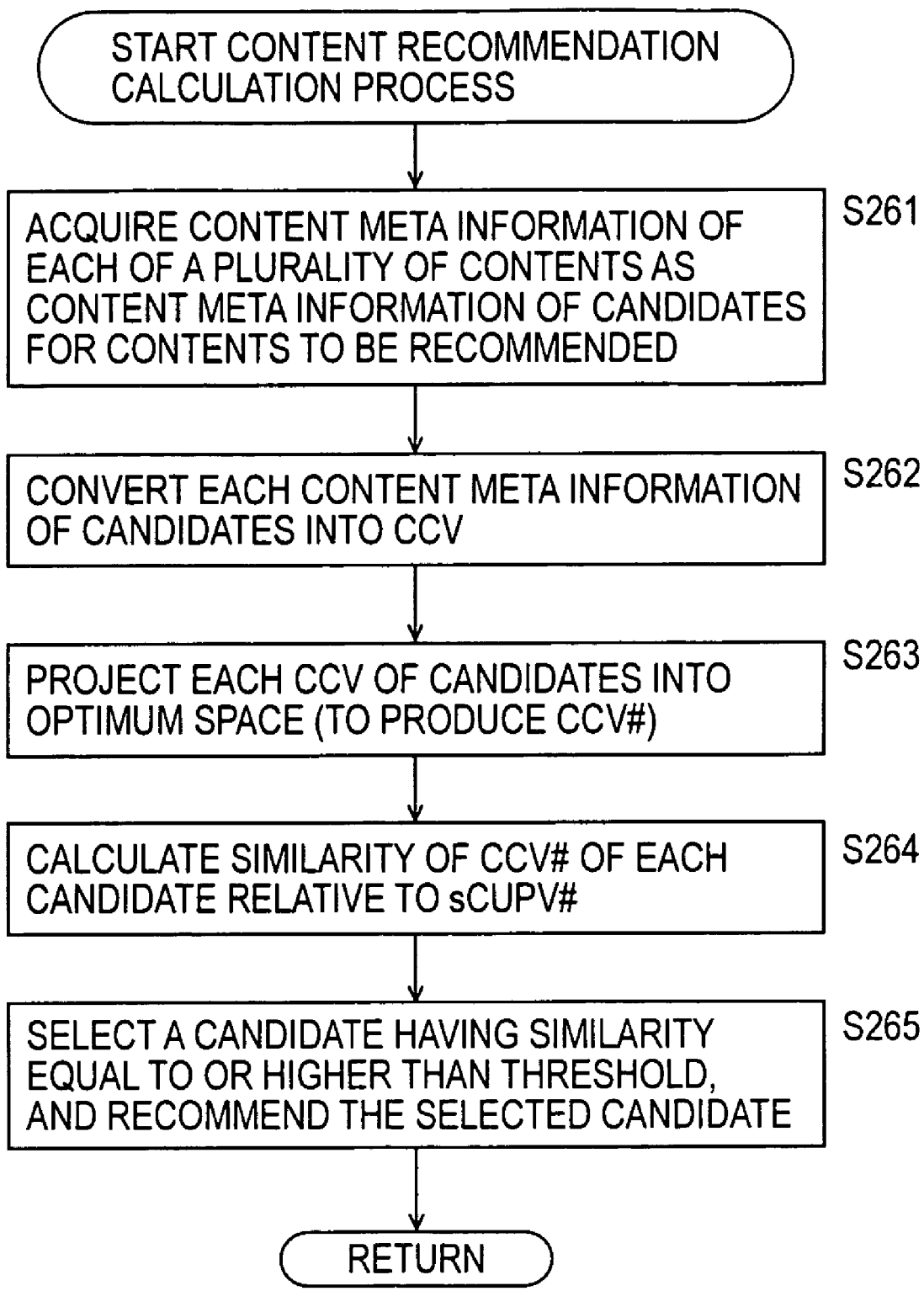
FIG. 22 is a flow chart showing an example of a content recommendation calculation process in the content recommendation process shown in FIG. 13 performed by the information processing apparatus shown in FIG. 18.

FIG. 21 is a flow chart showing the details of the CUPV setting process (step S101) according to the second embodiment, and FIG. 22 is a flow chart showing the details of the content recommendation calculation process (step S102) according to the second embodiment. First, referring to FIG. 21, the details of the CUPV setting process (step S101) according to the second embodiment are described. Hereinafter, referring to FIG. 22, the details of the content recommendation calculation process (step S102) according to the second embodiment are described.

First, in step S241 in FIG. 21, the matrix calculator (projection unit) 111 acquires the current context information from the meta information acquisition unit 1 (the context acquisition unit 14).

In step S242, the matrix calculator (projection unit) 111 produces a feature vector CCV from the current context information (that is, produces a current context feature vector cCCV).

In step S243, the matrix calculator (projection unit) 111 projects the current context feature vector cCCV to a optimum space UPS (that is, the matrix calculator (projection unit) ill produces a current context feature vector cCCV# with reduced dimensions).

In step S244, the matching calculator 112 calculates the similarity of the current context feature vector cCCV# with reduced dimensions with respect to each of the context user preference vectors CUPV*# with reduced dimensions stored in the UPV storage unit 6.

In step S245, the matching calculator 112 selects a context user preference vector CUPV*# with reduced dimensions having highest similarity and employs it as the specific context user preference vector sCUPV*# with reduced dimensions.

Thus, the CUPV setting process according to the second embodiment is completed.

Although not shown in FIG. 21, in the case in which the user preference vector stored in the UPV storage unit 6 is not the context user preference vector CUPV*# but the user preference vector UPV*#, the matching calculator 112 sets the specific context user preference vector sCUPV*# by performing a similar process to that according to the first embodiment (step S124).

After the CUPV setting process (step S101 in FIG. 13) according to the second embodiment is completed, the content recommendation calculation process (step S102 in FIG. 13) according to the second embodiment is performed.

That is, in step S261 in FIG. 22, the matrix calculator (projection unit) 111 acquires, as content meta information of each candidate content to be recommended, content meta information for each of a plurality of contents from the meta information acquisition unit 1 (text analyzer 12 or the metadata acquisition unit 13).

In step S262, the matrix calculator (projection unit) 111 produces a feature vector CCV from the content meta information of each candidate content to be recommended. That is, the matrix calculator (projection unit) 111 produces a feature vector CCV corresponding to each content.

In step S263, the matrix calculator (projection unit) 111 projects the feature vector CCV of each candidate content onto the optimum space UPS (that is, produces a feature vector CCV# with reduced dimensions for each candidate content).

In step S264, the matching calculator 112 calculates the similarity of the feature vector CCV# with reduced dimensions (produced in step S263) of each candidate content with respect to the specific context user preference vector sCUPV*# with reduced dimensions set in the CUPV setting process in step S101 (shown in FIG. 13 (details thereof are shown in FIG. 21)), and the matching calculator 112 supplies the calculation result to the recommender 9.

In step S265, the recommender 9 selects contents corresponding to feature vectors CCV having similarity higher than a threshold value (or a content corresponding to a feature vector CCV having highest similarity) and recommends the selected content(s) to the user.

Thus, the content recommendation calculation process (step S102 shown in FIG. 13) according to the second embodiment is completed, and the content recommendation process shown in FIG. 13 is also completed.

In the content recommendation process according to the second embodiment, as described above, vectors with reduced dimensions are dealt with, and thus the complexity of calculation processing is lower than the complexity of the content recommendation process according to the first embodiment in which vectors with non-reduced dimensions are dealt with.

In the second embodiment, as in the first embodiment described earlier, a content that best matches the current context of the user is recommended to the user. Note that when a content is being used by the user, another content that best matches the content being currently used by the user may be recommended.

In this case, the projection matching unit 101 performs the following process. That is, the projection matching unit 101 acquires content meta information for the content being currently used by the user from the meta information acquisition unit 1, and assigns a weight value to each piece of the acquired content meta information. The weight values assigned to the respective pieces of content meta information are substituted in corresponding elements of the vector in the standard form thereby producing a feature vector CCV for the content being currently used by the user.

The projection matching unit 101 then multiplies the produced feature vector CCV and one or more user preference vectors UPV* existing in the UPV storage unit 6 by the transpose of the component matrix $U_k$ in equation (4) from left thereby producing a feature vector CCV# with reduced dimensions (K dimensions) for the content being currently used by the user and one or more user preference vectors UPV*# with reduced dimensions (K dimensions). Note that instead of the projection matching unit 101, the user preference vector (UPV) generator 23 may produce one or more user preference vectors UPV*# with reduced dimensions (K dimensions).

The projection matching unit 101 then calculates the similarity of each of the one or more user preference vectors UPV*# with reduced dimensions (K dimensions) with respect to the feature vector CCV# with reduced dimensions (K dimensions) associated with the content being currently used by the user. A new K-dimensional user preference vector UPV* (corresponding to the specific context user preference vector sCUPV*# with reduced dimensions described above) is then produced based on user preference vectors UPV* with reduced dimensions (K-dimensions) having similarity equal to or greater than a threshold value. Hereinafter, such a new K-dimensional user preference vector UPV* will be denoted as UPV*#. The matching unit 3 then calculates the similarity of the feature vector with reduced dimensions of another content with respect to the new K-dimensional user preference vector UPV*# and supplies the calculation result to the recommender 9.

Third Embodiment

Referring now to FIGS. 23 to FIG. 25, an information processing apparatus according to a third embodiment is described below.

Either the information processing apparatus according to the first embodiment (FIG. 1) or that according to the second embodiment (FIG. 18) can be directly used as the information processing apparatus according to the third embodiment, and thus a duplicated description of the structure of the information processing apparatus according to the third embodiment is not given herein. In the following description, by way of example, it is assumed that the information processing apparatus used herein in the third embodiment is similar to that according to the first embodiment shown in FIG. 1.

A UPV generation process performed by the information processing apparatus (similar to that shown in FIG. 1) according to the third embodiment is described below.

In the UPV generation process according to the third embodiment, candidate contents are set in advance for respective user preference vectors UPV* defined for respective contents that is, for respective content-specific user preference vector CUPV*.

FIG. 23 is a flow chart showing an example of the UPV generation process according to the third embodiment. Referring to FIG. 23, the UPV generation process according to the third embodiment is described in detail.

As shown in FIG. 23, in step S301, a CCV generation process is performed, and an approximate matrix (space) generation process is performed in step S302. Hereinafter, in step S303, a CUPV generation process is performed. In step S304, the related information acquisition unit 8 shown in FIG. 1 searches for a candidate content to be recommended for each of user preference vectors CUPV*.

In this third embodiment, the CCV generation process, the approximate matrix (space) generation process, and the CUPV generation process are performed in the same manners as corresponding processes according to the first embodiment. That is, in this third embodiment, the CCV generation process is performed in accordance with the flow chart shown in FIG. 4, and the approximate matrix (space) generation process is performed in accordance with the flow chart shown in FIG. 6. The CUPV generation process is performed in accordance with the flowchart shown in FIG. 12.

Hereinafter, the above-described process (step S304) performed by the related information acquisition unit 8 will be referred to simply as a context-related page acquisition process. The details of the context-related page acquisition process (step S304) according to the third embodiment are shown in a flow chart of FIG. 24. Referring to FIG. 24, the context-related page acquisition process (step S304) according to the third embodiment is described in detail below.

First, in step S321, the related information acquisition unit 8 selects two elements (associated with content meta information) having highest weight values from each of content-specific user preference vectors CUPV* produced by the user preference vector (UPV) generator 23.

In step S322, the related information acquisition unit 8 accesses the Internet or the like (not shown) and searches for contents (stored in Web sites at particular URLs) by using, as keywords, words (for example, "kindergarten" and "child" described as items of the content meta information in FIG. 5) corresponding to the two elements selected for each content-specific user preference vector CUPV*.

In step S323, although not shown in FIG. 1, the related information acquisition unit 8 stores search results in the UPV storage unit 6 such that the search results are linked to the corresponding content-specific user preference vectors CUPV*.

Thus, the context-related page acquisition process according to the third embodiment is completed.

Now, referring to a flow chart shown in FIG. 25, the content recommendation process according to the third embodiment is described below.

In step S341, the CUPV setting process is performed. In step S343, the recommender 9 shown in FIG. 1 selects a content indicated by a search result linked to a specific context user preference vector sCUPV*, that is, selects the content indicated by the search result that is linked to the specific context user preference vector sCUPV* and stored in the UPV storage unit 6 in step S323 in FIG. 24, and the recommender 9 recommends the selected content to the user.

In this third embodiment, the CUPV setting process is performed in basically the same manner as that according to the first embodiment. That is, also in this third embodiment, the CUPV setting process is performed in accordance with the flow chart shown in FIG. 14, and thus a duplication description of the CUPV setting process is not given herein.

In the third embodiment, as described above, because candidate contents have been specified in advance for respective context user specific vectors sCUPV*, a candidate content can be selected immediately when a specific context user preference vector sCUPV* is set, without having to calculate the similarity between the specific context user preference vector sCUPV* and feature vectors CCV of candidate contents.

In the first and second embodiments described earlier, to recommend a content that matches the preference of the user and that matches the current context or the content being currently used by the user, it is required to perform the content matching process (calculation of similarity) and search for a content for each recommendation. Therefore, for example, to recommend a Web page on the Internet as a content, it is required to perform searching each time a content is recommended. This need a long time that is often unacceptable by the user.

In the third embodiment, the above-described problem is solved by registering in advance data indicating candidate contents (candidate Web pages) for respective context user preference vectors sCUPV*.

Fourth Embodiment

Now, referring to FIGS. 26 to 29, an information processing apparatus according to a fourth embodiment is described below.

In the previous embodiments (first to third embodiments), it is assumed that contents are of interest to the user, such as mail documents received by the user. In other words, in the previous embodiments, contents are selected without concern as to whether or not contents are of interest to the user.

In this fourth embodiment, contents are selected taking into account whether contents are of interest to the user. Candidate contents that are of interest (or that are not of interest) to the user are selected in advance from a plurality of candidate contents, and a candidate content that matches the current context of the user is selected from the preselected candidate contents that are of interest to the user, and the selected candidate content is presented to the user.

In the fourth embodiment, to achieve the above object, the information processing apparatus is constructed in a different manner from that according to the first embodiment (FIG. 1) or the second embodiment (FIG. 8).

FIG. 26 shows an example of a structure of the information processing apparatus according to the fourth embodiment of the invention. In FIG. 26, similar parts to those of the information processing apparatus according to the first embodiment (FIG. 1) or those according to the second embodiment (FIG. 18) are denoted by similar reference numerals.

In the information processing apparatus according to the fourth embodiment, the space/UPV generator 2 (FIG. 1 or FIG. 18) of the first or the second embodiment is replaced with a space generator 201 and a preference-specific UPV generator 202. Furthermore, instead of the matching unit 3 (FIG. 1) according to the first embodiment or the projection matching unit 101 according to the second embodiment, a matching unit 204 is provided. Furthermore, the information processing apparatus according to the fourth embodiment additionally includes an SVM model storage unit 203.

The space generator 201 includes a feature vector (CCV) generator 211 and a matrix calculator (preference-specific space generator) 212.

The feature vector (CCV) generator 211 is similar in function and structure to the feature vector (CCV) generator 21 according to the first or second embodiment (FIG. 1 or FIG. 18) except that when a feature vector CCV associated with a particular content is stored in the CCV storage unit 4, information indicating whether the content corresponding to the feature vector CCV is of interest to the user is also stored in the CCV storage unit 4 such that the information is linked with the feature vector CCV.

The information indicating that a content corresponding to a feature vector CCV is of interest to a user is referred to as positive preference information, and the information indicating that a content corresponding to a feature vector CCV is not of interest to the user is referred to as negative preference information. That is, each feature vector CCV stored in the CCV storage unit 4 is linked to either positive or negative preference information.

In other words, a feature vector CCV linked to positive preference information is a feature vector CCV indicating a positive factor of preference of the user. On the other hand, a feature vector CCV linked to negative preference information is a feature vector CCV indicating a negative factor of preference of the user.

An arbitrary method can be used to link a feature vector CCV to either positive preference information or negative preference information. For example, each time the use uses a content, the user may directly input information indicating whether the content is of interest or not. Alternatively, learning is performed as to all elements or some elements (for example, only elements associated with context information) of each feature vector CCV for example, by means of an SVM (Support Vector Machine), and each feature vector CCV is classified to be either of positive preference or of negative preference (that is, it is determined whether each feature vector CCV is a positive-preference feature vector CCV or a negative-preference feature vector CCV).

The matrix calculator (preference-specific space generator) 212 is similar in function and structure to the matrix calculator (space generator) according to the first or second embodiment 22 (FIG. 1 and FIG. 18), except that a positive-preference feature vector CCV (feature vector CCV linked to positive preference information) and a negative-preference feature vector CCV (feature vector CCV linked to negative preference information) are rigorously distinguished from each other in the process performed by the matrix calculator (preference-specific space generator) 212.

More specifically, the matrix calculator (preference-specific space generator) 212 produces a matrix CCM (with N rows and M columns) whose columns are given by M positive-preference feature vectors CCV stored in the CCV storage unit 4 (wherein M is an integer equal to or greater than 2). Hereinafter the matrix CCM whose columns are given by positive-preference feature vectors CCV will be referred to as a matrix CCM+.

The matrix calculator (preference-specific space generator) 212 projects the respective elements (content meta information indicating attributes of contents preferred (experienced) by the user and context information indicating contexts in which the contents were experienced) of the matrix CCM+ onto principal axes, by means of, for example, singular value decomposition and dimension reduction.

The resultant matrix obtained by reducing the dimensions of the matrix CCM+ is referred to as an approximate matrix CCM+*. The space onto which the elements are projected is referred to as an optimum space UPS+.

More specifically, the matrix calculator (preference-specific space generator) 212 decomposes the N×M matrix CCM+ into the product of component matrices U, $\Sigma$, and V by means of singular value decomposition so as to satisfy equation (1).

The matrix calculator (preference-specific space generator) 212 then extracts k columns in the leftmost region (left singular vectors) of the component matrix U and produces a matrix $U_k$ (with N rows and k columns) whose columns are given by the extracted k columns. Furthermore, the matrix calculator (preference-specific space generator) 212 extracts k columns in the leftmost region (right singular vectors) of the component matrix V and produces a matrix $V_k$ (with M rows and k columns) whose columns are given by the extracted k columns. Furthermore, the matrix calculator (preference-specific space generator) 212 extracts k columns in the leftmost region of the component matrix $\Sigma$ and further extracts 1st to kth elements of respective extracted k columns and produces a matrix $\Sigma_k$ (with k rows and k columns) whose elements are given by the extracted elements (corresponding to k×k elements in the upper left region of the original component matrix $\Sigma$).

The matrix calculator (space generator) 22 then calculates the right-hand side of equation (2) thereby obtaining a matrix $D_k$ with a rank degenerated to k. The resultant matrix $D_k$ is supplied as an approximate matrix CCM* of the matrix CCM+ (hereinafter, such an approximate matrix will be referred to as an approximate matrix CCM+*) to the preference-specific UPV generator 202.

The component matrix $U_k$ (and also $V_k$ and $E_k$ as required) of the approximate matrix CCM+* (=$D_k$) is supplied to the lexical dictionary generator 7 and also supplied to the component matrix storage unit 5 to store it therein.

The matrix calculator (preference-specific space generator) 212 also performs a similar process on M feature vectors CCV of negative preference of the feature vectors CCV stored in the CCV storage unit 4.

More specifically, the matrix calculator (preference-specific space generator) 212 produces an approximate matrix CCM* of an N×M matrix CCM− whose columns are given by M feature vectors CCV of negative preference (hereinafter, such an approximate matrix will be referred to as an approximate matrix CCM−*) by performing the singular value decomposition and dimension reduction on the matrix CCM−, and the matrix calculator (preference-specific space generator) 212 supplies the resultant approximate matrix CCM−* to the preference-specific UPV generator 202.

The component matrix $U_k$ (and also matrix $V_k$ and/or $\Sigma_k$ as required) of the approximate matrix CCM−* (=$D_k$) is supplied to the lexical dictionary generator 7 and also supplied to the component matrix storage unit 5 to store it therein.

Now, the preference-specific UPV generator 202 is explained. The preference-specific UPV generator 202 includes an SVM classification learning unit 221 and a user preference vector (UPV) generator 222.

The SVM classification learning unit 221 produces an SVM model (classifier) by performing learning by using, as training data, columns of the approximate matrix CCM+* or CCM−* supplied from the space generator 201 by using an SVM (Support Vector Machine). The resultant SVM model is stored in the SVM model storage unit 203.

The user preference vector (UPV) generator 222 is similar in function and structure to the user preference vector (UPV) generator 23 according to the first or second embodiment (FIG. 1 or FIG. 18).

However, as described above, to the user preference vector (UPV) generator 222, the approximate matrix CCM+* of the matrix CCM+ and the approximate matrix CCM−* of the matrix CCM− are supplied from the space generator 201 such that these two types of approximate matrices are rigorously distinguished from each other. Thus, the user preference vector (UPV) generator 222 can produce two types of user preference vectors, that is, a user preference vector UPV* (or context user preference vector CUPV*) based on the approximate matrix CCM+* of the matrix CCM+ and a user preference vector UPV* (or context user preference vector CUPV*) based on the approximate matrix CCM−* of the matrix CCM−. Note that these two types of user preference vectors may be produced or one of them may be produced. However, herein, to achieve the final object to select a content from candidate contents of interest to the user, the user preference vector (UPV) generator 222 produces user preference vectors UPV* (or context user preference vectors CUPV*) based on the approximate matrix CCM+* of the matrix CCM+ and stores the produced user preference vectors UPV* in the UPV storage unit 6.

Now, the matching unit 204 is explained. The matching unit 204 includes an SVM classifier 231 and a matching calculator 232.

In order for the recommender 9 to recommend a content that well matches the current context in which the user is, the SVM classifier 231 first acquires context information indicating the present context of the user from the meta information acquisition unit 1, and produces a feature vector CCV in the standard form whose elements are given by respective weight values of the context information, that is, produces a current context feature vector cCCV.

Thereafter, using the SVM model (classifier) stored in the SVM model storage unit 203, the SVM classifier 231 determines whether the current context feature vector cCCV is of interest to the user or not. The classification result and the current context feature vector cCCV are supplied to the matching calculator 232. Herein, classifying a current context feature vector cCCV to be of interest to the user is referred to as positively classifying, and a current context feature vector cCCV classified positively is referred to as a positive-preference current context feature vector cCCV. On the other hand, classifying a current context feature vector cCCV not to be of interest to the user is referred to as negatively classifying, and a current context feature vector cCCV classified negatively is referred to as a negative-preference current context feature vector cCCV.

In a case in which a positive-preference current context feature vector cCCV is output from the SVM classifier 231, the matching calculator 232 calculates the similarity of this current context feature vector cCCV with respect to each of the user preference vectors CUPV* stored in the UPV storage unit 6. The matching calculator 232 employs a context user preference vector CUPV* with highest similarity as a context user preference vector CUPV* that best matches the current context in which the user is, that is, as the specific context user preference vector sCUPV*.

In the case in which not context user preference vectors CUPV* but columns (positive-preference feature vectors CCV*) of an approximate matrix CCM+* are directly stored as user preference vectors UPV* in the UPV storage unit 6, the matching calculator 232 calculates the similarity of the current context feature vector cCCV with respect to each of the user preference vectors UPV* stored in the UPV storage unit 6. The matching calculator 232 selects some user preference vectors UPV* having similarity equal to or higher than a threshold value, and the matching calculator 232 produces a vector in the standard form whose elements are each given by the sums of corresponding elements of the selected user preference vectors UPV* (that is, the sum vector of the selected user preference vector UPV* is produced), and employs the produced vector as a context user preference vector CUPV* for the current context in which the user is, that is, as the specific context user preference vector sCUPV*.

Each time the SVM classifier 231 receives content meta information associated with a candidate content from the meta information acquisition unit 1, the SVM classifier 231 produces a feature vector CCV in the standard form whose elements are given by respective weight values of the context information and whose elements corresponding to context information are all 0.

Thereafter, using the SVM model (classifier) stored in the SVM model storage unit 203, the SVM classifier 231 classifies the feature vector CCV and supplies the feature vector CCV to the matching calculator 232 only when the feature vector CCV is positively classified (hereinafter, such a feature vector CCV will be referred to a feature vector CCV+).

Upon receiving the feature vector CCV+, the matching calculator 232 calculates the similarity of the feature vector CCV+ with respect to the specific context user preference vector sCUPV* and supplies the calculation result to the recommender 9.

Note that there is no restriction on the specific form of the parts from the space generator 201 to the matching unit 204. The space generator 201, the preference-specific UPV generator 202, and the matching unit 204 may be implemented by means of software, hardware, or a mixture of software and hardware.

Parts other than those from space generator 201 to the matching unit 204 are basically the same as corresponding parts according to the first embodiment shown in FIG. 1 or the second embodiment shown in FIG. 18. That is, in FIG. 26, the meta information acquisition unit 1, and parts from the CCV storage unit 4 to the recommender 9 are similar in structure and function to corresponding blocks in FIG. 1 (or FIG. 18), and thus a duplicated description thereof is not given herein.

Now, the UPV generation process performed by the information processing apparatus (FIG. 26) according to the fourth embodiment is described below.

The flow of the UPV generation process according to the fourth embodiment is similar in many parts to the UPV generation process shown in the flow chart of FIG. 3 according to the first embodiment (FIG. 3).

However, the approximate matrix (space) generation process (step S2) according to the fourth embodiment is slightly different from that according to the first embodiment (FIG. 6).

Figure 27:
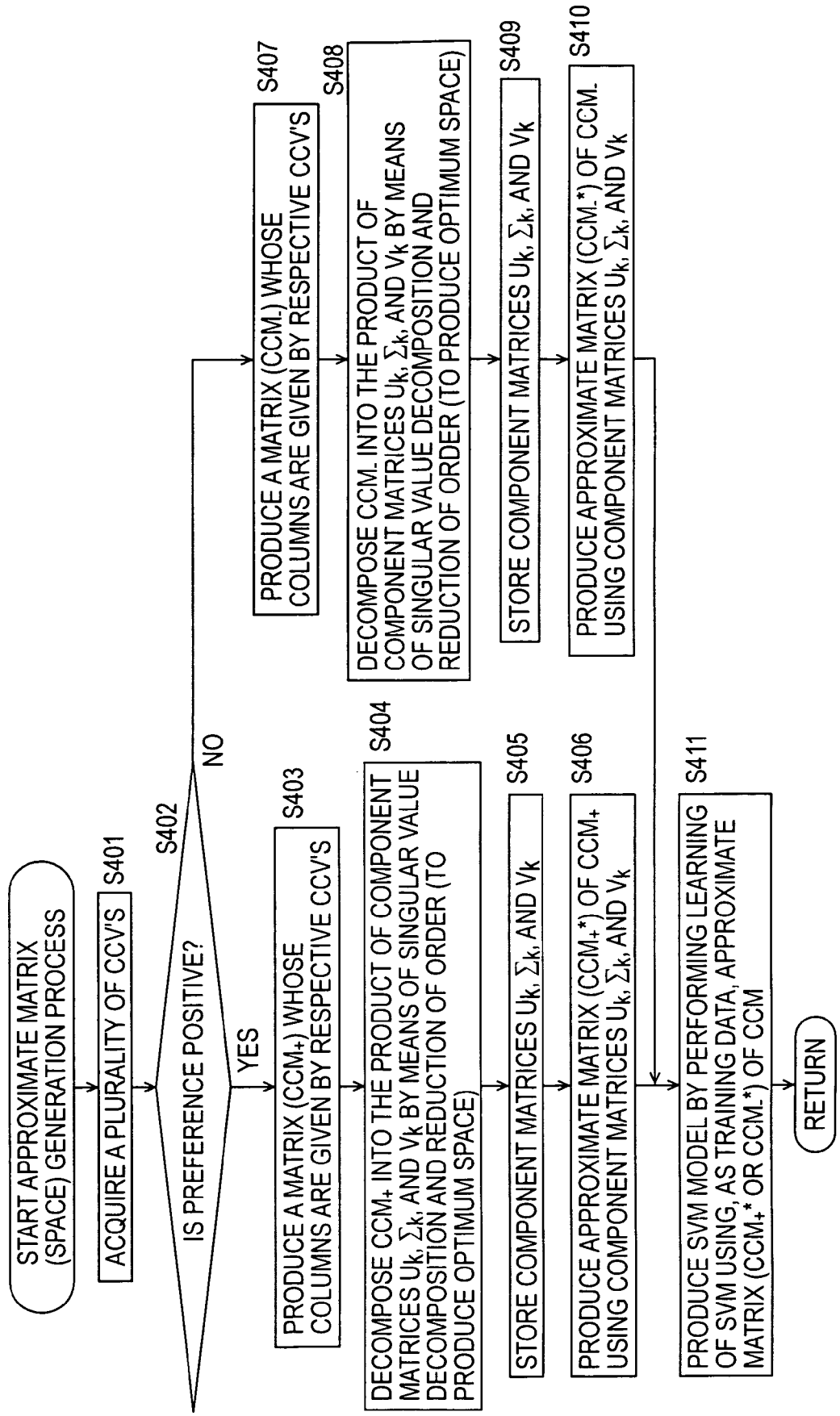
FIG. 27 is a flow chart showing an example of an approximate matrix (space) generation process in the UPV generation process shown in FIG. 3 performed by the information processing apparatus shown in FIG. 26.

FIG. 27 is a flow chart showing an example of a detailed flow of the approximate matrix (space) generation process (step S2) according to the fourth embodiment. Referring to FIG. 27, the details of the approximate matrix (space) generation process (step S2) according to the fourth embodiment are described below.

First, in step S401, the matrix calculator (preference-specific space generator) 212 acquires a plurality of feature vectors CCV from the CCV storage unit 4 (together with information indicating whether these feature vectors CCV is of positive preference or negative preference).

In step S402, the matrix calculator (preference-specific space generator) 212 determines whether the respective acquired feature vectors CCV are of positive preference or negative preference.

If it is determined in step S402 that the acquired feature vectors CCV are of positive preference, steps S403 to S406 corresponding to steps S42 to S45 in FIG. 6 are performed. More specifically, the matrix calculator (preference-specific space generator) 212 produces the approximate matrix CCM+* of the matrix CCM+ and supplies it to the SVM classification learning unit 221. The component matrix $U_k$ (and also the component matrix $\Sigma_k$ and component matrix $V_k$ as required) is stored in the component matrix storage unit 5.

On the other hand, if it is determined in step 402 that the acquired feature vectors CCV are of negative preference (not of positive preference), steps S407 to S410 corresponding to steps S42 to S45 in FIG. 6 are performed. More specifically, the matrix calculator (preference-specific space generator) 212 produces the approximate matrix CCM−* of the matrix CCM− and supplies it to the SVM classification learning unit 221. The component matrix $U_k$ (and also the component matrix $\Sigma_k$ and component matrix $V_k$ as required) is stored in the component matrix storage unit 5.

In step S411, the SVM classification learning unit 221 produces an SVM model by performing SVM learning by using, as training data, the approximate matrix CCM* (approximate matrix CCM+* or CCM−*). The resultant SVM model is stored in the SVM model storage unit 203.

Thus, the approximate matrix (space) generation process (step S2 in FIG. 3) according to the fourth embodiment is completed, and step S3 and steps following that in FIG. 2 are performed in a similar manner to the first embodiment except that in the fourth embodiment, the approximate matrix CCM+* of the matrix CCM+ is used.

The content recommendation process performed by the information processing apparatus according to the fourth embodiment is described below.

The flow of the content recommendation process according to the fourth embodiment is similar to the flow according to the first embodiment shown in FIG. 13.

However, the CUPV setting process (step S101) according to the fourth embodiment is slightly different from that according to the first embodiment (FIG. 14), and the content recommendation calculation process (step S102) according to the fourth embodiment is also slightly different from that according to the first embodiment (FIG. 17).

Figure 29:
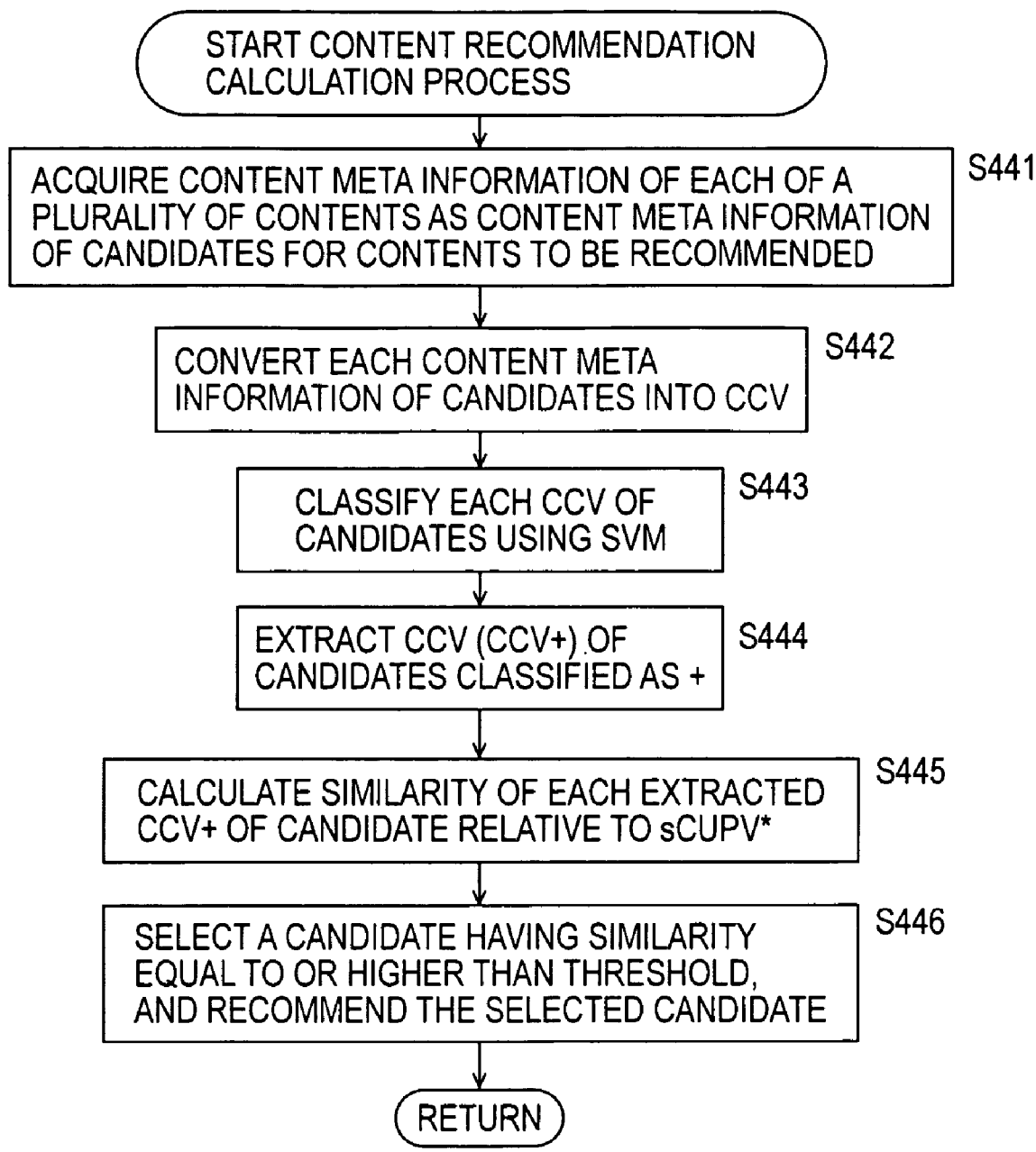
FIG. 29 is a flow chart showing an example of a content recommendation calculation process in the content recommendation process shown in FIG. 13, performed by the information processing apparatus shown in FIG. 26.

FIG. 28 shows the details of the CUPV setting process (step S101) according to the fourth embodiment, and FIG. 29 shows the details of the content recommendation calculation process (step S102) according to the fourth embodiment. First, referring to FIG. 28, the details of the CUPV setting process (step S101) according to the fourth embodiment are described. Thereafter, referring to FIG. 29, the details of the content recommendation calculation process (step S102) according to the fourth embodiment are described.

First, in step S421 in FIG. 28, the SVM classifier 231 shown in FIG. 26 acquires the current context information from the meta information acquisition unit 1 (the context acquisition unit 14).

In step S422, the SVM classifier 231 produces a feature vector CCV from the current context information (that is, produces a current context feature vector cCCV).

In step S423, the SVM classifier 231 classifies the current context feature vector cCCV by using the SVM. More specifically, using the SVM model (classifier) stored in the SVM model storage unit 203, the SVM classifier 231 classifies the current context feature vector cCCV positively or negatively.

In step S424, the SVM classifier 231 determines the result of the classification in step S423.

If it is determined in step S424 that the current context feature vector cCCV is of negative preference (not of positive preference), the CPU setting process according to the fourth embodiment is ended. In this case, the matching unit 204 may present an error message to a user.

On the other hand, in a case in which it is determined in step S424 that the current context feature vector cCCV is of positive preference, the process proceeds to step S425, in which the matching calculator 232 calculates the similarity of the current context feature vector cCCV with respect to each of the user preference vectors CUPV* stored in the UPV storage unit 6.

In step S426, the matching calculator 232 selects a context user preference vector CUPV* having highest similarity and employs it as the specific context user preference vector sCUPV*.

Thus, the CUPV setting process according to the fourth embodiment is completed.

Although not shown in FIG. 28, in the case in which the user preference vector stored in the UPV storage unit 6 is not the context user preference vector CUPV* but the user preference vector UPV*, the matching calculator 232 sets the specific context user preference vector sCUPV* by performing a similar process to that according to the first embodiment (step S124).

After the CUPV setting process (step S101 in FIG. 13) according to the fourth embodiment is completed, the content recommendation calculation process (step S102 in FIG. 13) according to the fourth embodiment is performed.

That is, in step S441 in FIG. 29, the SVM classifier 231 acquires, as content meta information of each candidate content to be recommended, content meta information for each of a plurality of contents from the meta information acquisition unit 1 (text analyzer 12 or the metadata acquisition unit 13).

In step S442, the SVM classifier 231 produce a feature vector CCV from each of content meta information of each candidate content. That is, the SVM classifier 231 produces each feature vector CCV for each of candidates for a content to be recommended.

In-step S443, the SVM classifier 231 classifies, by SVM, each of the feature vectors CCV of the candidates for the content to be recommended. More specifically, using the SVM model (classifier) stored in the SVM model storage unit 203, the SVM classifier 231 classifies the feature vectors CCV positively or negatively.

In step S444, the SVM classifier 231 extracts positive-preference feature vectors CCV associated with candidate contents as feature vectors CCV+ to be processed.

In step S445, the matching calculator 232 calculates the similarity of each of feature vectors CCV+, extracted in step S444, corresponding to the respective candidate contents, with respect to the specific context user preference vector sCUPV* set in the CUPV setting process in step S101 (FIG. 13 (details thereof are shown in FIG. 28)) and supplies the calculation result to the recommender 9.

In step S446, the recommender 9 selects contents corresponding to feature vectors CCV having similarity higher than a threshold value (or a content corresponding to a feature vector CCV having highest similarity) and recommends the selected content(s) to the user.

Thus, the content recommendation calculation process (step S102 shown in FIG. 13) according to the fourth embodiment is completed, and the content recommendation process shown in FIG. 13 is also completed.

In the fourth embodiment, as described above, classification is learned using the lexical space (preference-specific space generated by the matrix calculator 212) specific to the user, that is, using the optimum space UPS of positive preference and the optimum space UPS of negative preference specific to the user. This makes it possible to properly classify a given content.

Although in the example described above, feature vectors CCV of positive preference (positive-preference feature vectors CCV+) are dealt with, feature vectors CCV of negative preference (negative-preference feature vectors CCV−) may also be used in the process of recommending contents. That is, although in the example described above, only positive preference of the user is taken into account in the selection of contents, contents may be selected taking into account both positive and negative preferences of the user.

In this case, the information processing apparatus shown in FIG. 26 performs the following process.

The space generator 201 produces an approximate matrix CCM+* of the matrix CCM+ such that the columns of the approximate matrix CCM+* are given by M positive-preference feature vector CCV+, and also produces an approximate matrix CCM−* of the matrix CCM− such that the columns of the approximate matrix CCM−* are given by M negative-preference feature vector CCV−, The resultant approximate matrix CCM+* and approximate matrix CCM−* are supplied to the preference-specific UPV generator 202.

The user preference vector (UPV) generator 222 produces user preference vectors UPV* from the supplied approximate matrix CCM+* (the produced user preference vectors UPV* are referred to as positive-preference user preference vectors UPV+*), and the user preference vector (UPV) generator 222 also produces user preference vectors UPV* from the supplied approximate matrix CCM−* (the produced user preference vectors UPV* are referred to as negative-preference user preference vectors UPV−*). The resultant positive-preference user preference vectors UPV+* and negative-preference user preference vectors UPV−* are stored in the UPV storage unit 6.

Although not shown in FIG. 26, the SVM classifier 231 may be removed such that information from the meta information acquisition unit 1 is directly supplied to the matching calculator 232. Upon receiving the content meta information for the new content from the meta information acquisition unit 1, the matching calculator 232 produces a feature vector CCV for the new content. The matching calculator 232 calculates the first similarity of each of the positive-preference user preference vectors UPV+* existing in the UPV storage unit 6 with respect to the feature vector CCV associated with the new content and also calculates the second similarity of each of the negative-preference user preference vectors UPV−* existing in the UPV storage unit 6 with respect to the feature vector CCV associated with the new content. The result of the calculation, that is, the first similarity and the second similarity are supplied from the matching calculator 232 to the recommender 9.

The recommender 9 determines, based on the first similarity and the second similarity, whether the new content is suitable as a content to be recommended. If the new content is determined to be suitable, the new content is recommended to the user.

More specifically, for example, if the first similarity is equal to or higher than a first threshold value and the second similarity is lower than a second threshold value, the recommender 9 determines that the new content is suitable as a content to be recommended, and thus the recommender 9 presents the new content as a recommended content to the user.

Alternatively, if the first similarity is higher than the second similarity and the second similarity is lower than a threshold value, the recommender 9 determines that the new content is suitable as a content to be recommended, and thus the recommender 9 presents the new content as a recommended content to the user.

Fifth Embodiment

Now, referring to FIGS. 30 to 33, an information processing apparatus according to a fifth embodiment is described below.

Before the fifth embodiment is described, the background that has brought about the invention of the information processing apparatus according to the fifth embodiment is described.

Content metadata used conventionally includes an item for description of genres. In the case of content metadata associated with television broadcast programs, the content metadata are classified, for example, into main genres such as sports, dramas, movies, and variety shows. Each main genre may have subgenres. For example, the variety show genre may have subgenres such as comedies, popular song shows, general shows, etc.

However, as can be understood from the above-described example, contents are not necessarily classified into proper sub-genres. Classification is often improper to the user.

To solve the above problem, the inventor of the present invention has invented the following technique.

In the approximate matrix CCM* (produced from the matrix CCM by means of the singular value decomposition and dimension reduction), content meta information (words) is clusterized (classified) by means of a common method, and each cluster (class) is employed as a genre. Such genres are herein referred to as UP genres to distinguish them from conventional genres. An SVM model (classifier) is then created by performing learning by using the UP genres as training data using the SVM. By using the created SVM model (classifier), an UP genre of a new content is determined. In the determination of the UP genre, context information associated with the content is not necessarily needed.

In this technique, UP genres do not necessarily need to have their genre names, or a word or a combination or words having a highest weight may be used as a genre name.

The present technique can be used to recommend a content in a particular genre and also can be used to present a plurality of contents that are similar to each other to a user.

The present invention provides an information processing apparatus using the technique described above. An example of the information processing apparatus is shown in FIG. 30.

That is, FIG. 30 shows the information processing apparatus according to the fifth embodiment of the invention. In FIG. 30, similar parts to those of the information processing apparatus according to the fourth embodiment (FIG. 26) are denoted by similar reference numerals.

In the information processing apparatus according to the fifth embodiment, the preference-specific UPV generator 202 according to the forth embodiment is replaced with a UPV/UP genre generator 302, the matching unit 204 according to the forth embodiment is replaced with the genre determination unit 304, and the SVM model storage unit 203 according to the fourth embodiment is replaced with a SVM model storage unit 303 that is similar in function and structure to the SVM model storage unit 203 (but that is different in that the SVM model stored therein is different).

The UPV/UP genre generator 302 includes an SVM classification learning unit (UP genre generator) 321, and a user preference vector (UPV) generator 322.

The SVM classification learning unit (UP genre generator) 321 is similar in function and structure to the SVM classification learning unit 221 according to the forth embodiment. However, unlike the SVM classification learning unit 221 that creates the SVM model for classifying contents into a group of positive preference or a group of negative preference, the SVM classification learning unit (UP genre generator) 321 creates the SVM model for determining an UP genre of a new content.

The user preference vector (UPV) generator 322 according to the fifth embodiment is similar in function and structure to the user preference vector (UPV) generator 222 according to the fourth embodiment, and thus it is not described further herein.

The genre determination unit 304 includes an SVM classifier 331 that is basically similar in function and structure to the SVM classifier 231 according to the forth embodiment. However, unlike the SVM classifier 231 according to the forth embodiment that determines whether a given new content (content meta information associated with the content) is of positive preference or negative preference, the SVM classifier 321 according to the fifth embodiment determines the UP genre of the given new content (that is, classifies the given new content into one of UP genres).

There is no particular restriction on the form of the UPV/UP genre generator 302, the SVM model storage unit 303, and the genre determination unit 304. Note that the UPV and UP genre generator 302 and the genre determination unit 304 may be implemented by means of software, hardware, or a mixture of software and hardware.

Parts other than the UPV/UP genre generator 302, the SVM model storage unit 303, and the genre determination unit 304 are basically the same as corresponding parts according to the fourth embodiment shown in FIG. 26. More specifically, in FIG. 30, the meta information acquisition unit 1, the space generator 201, the CCV storage unit 4, the component matrix storage unit 5, the UPV storage unit 6, the lexical dictionary generator 7, the related information acquisition unit 8, and the recommender 9 are each similar in function and structure to corresponding blocks shown in FIG. 26, and thus a duplicated description thereof is not given herein.

Now, referring to a flow chart shown in FIG. 31, the UPV generation process performed by the information processing apparatus (FIG. 30) according to the fifth embodiment is described.

First, in step S501, a CCV generation process is performed. In step S502, an approximate matrix (space) generation process is performed. In step S503, a CUPV generation process is performed.

The CCV generation process (step S501), the approximate matrix (space) generation process (step S502), and the CUPV generation process (step S503) are performed in a similar manner to corresponding processes according to the previous embodiments. That is, the CCV generation process (step S501) is performed in accordance with the flow chart shown n FIG. 4, the approximate matrix (space) generation process (step S502) is performed in accordance with the flow chart shown in FIG. 6, and the CUPV generation process (step S503) is performed in accordance with the flow chart shown in FIG. 12.

In step S504, the SVM classification learning unit (UP genre generator) 321 produces one or more UP genres. The SVM classification learning unit (UP genre generator) 321 then produces an SVM model by performing SVM learning by using, as training data, the UP genres. The resultant SVM model is stored in the SVM model storage unit 303. This SVM model is used in a content recommendation process in step S544 such that, as will be described in further detail later with reference to FIG. 33, when a new content is given, the genre determination unit 304 selects, based on this SVM model, a genre that best matches the content from the one or more UP genres produced by the SVM classification learning unit (UP genre generator) 321 and employs it as an UP genre of the content.

Such a process (step S504) performed by the SVM classification learning unit (UP genre generator) 321 is referred to as an UP genre generation process. FIG. 32 is a flow chart showing an example of detailed flow of the UP genre generation process (step S504). Referring to FIG. 32, the UP genre generation process" (step S504) described in detail below.

First, in step S521, the SVM classification learning unit (UP genre generator) 321 calculates the similarity of elements among columns of the approximate matrix CCM* supplied from the space generator 201, that is, the similarity among the feature vectors CCV* of the approximate matrix CCM* in terms of context information described in respective elements.

In step S522, the SVM classification learning unit (UP genre generator) 321 classifies each of the feature vectors CCV*. More specifically, the SVM classification learning unit (UP genre generator) 321 selects feature vectors CCV* having similarity equal to or higher than a threshold value, and classify them into the same class. Each class generated in the above-described manner is employed as an UP genre. Thus, in step S522 described above, UP genres are generated.

More specifically, for example, when the matrix $D_k$ shown in FIG. 11 is supplied as an approximate matrix CCM* from the space generator 201, the SVM classification learning unit (UP genre generator) 321 examines the similarity of elements (words) among feature vectors and makes classification such that feature vectors CCV*$_1$, CCV*$_3$, and CCV*$_6$ (corresponding to documents DOC1, DOC3, and DOC6) are classified into a first genre and the other feature vectors are classified into a second genre. Thus, in this example, the SVM classification learning unit (UP genre generator) 321 produces the first genre and the second genre.

In this specific example, the first genre may be named as "kindergarten" or "child", and the second genre may be named as "company" or "tense".

In step S523, the SVM classification learning unit (UP genre generator) 321 performs the SVM learning for feature vectors CCV* belonging to each class (UP genre) (for example, for the feature vectors CCV*$_1$, CCV*$_3$, and CCV*$_6$ belonging to the first genre) to produce an SVM model for each class (UP genre). The resultant SVM model for each class (UP genre) is stored in the SVM model storage unit 303.

Thus, the UP genre generation process (in step S504 in FIG. 31) is completed, and the UPV generation process according to the fifth embodiment (FIG. 31) is completed.

The content recommendation process performed by the information processing apparatus according to the fifth embodiment is described below.

The flow of the content recommendation process according to the fifth embodiment is similar to the flow according to the first (or fourth) embodiment shown in FIG. 13.

However, the content recommendation calculation process (step S102) according to the fifth embodiment is slightly different from that according to the first embodiment (FIG. 17). FIG. 33 is a flow chart showing an example of a detailed flow of the content recommendation calculation process (step S102) according to the fifth embodiment. Referring to FIG. 33, details of the content recommendation calculation process (step S102) according to the fifth embodiment are described below.

First, in step S541, the SVM classifier 331 of genre determination unit 304 shown in FIG. 30 classifies, by using the SVM, the specific context user preference vector sCUPV* produced in the CUPV setting process in step S101 (shown in FIG. 13 and the details thereof are shown in FIG. 14) thereby determining the UP genre thereof. That is, using the SVM model (classifier) stored in the SVM model storage unit 203, the SVM classifier 331 classifies the specific context user preference vector sCUPV* into one of UP genres.

The result of the process in step S541, that is, the UP genre of the specific context user preference vector sCUPV* is supplied to the recommender 9.

In step S542, the SVM classifier 331 acquires, as content meta information of each candidate content to be recommended, content meta information for each of a plurality of contents from the meta information acquisition unit 1 (text analyzer 12 or the metadata acquisition unit 13).

In step S543, the SVM classifier 331 produces a feature vector CCV from each content meta information associated with each candidate content. That is, the SVM classifier 331 produces each feature vector CCV for each candidate content.

In step S544, the SVM classifier 331 classifies, by using the SVM, each of the feature vector CCV associated with respective candidate contents thereby determining the UP genre thereof. More specifically, using the SVM model (classifier) stored in the SVM model storage unit 203, the SVM classifier 331 classifies each feature vector CCV into one of UP genres.

The result of the process in step S544, that is, the UP genre of each candidate content is supplied to the recommender 9.

In step S545, the recommender 9 selects a content whose UP genre is the same as that of the specific context user preference vector sCUPV* and recommends it to the user.

Thus, the content recommendation calculation process (step S102 shown in FIG. 13) according to the fifth embodiment is completed, and the content recommendation process shown in FIG. 13 is also completed.

In the fifth embodiment, as described above, UP genres are created from feature vectors CCV* including context information, and a new content is classified in one of these UP genres. Note that contexts viewed from the user are reflected in the UP genres created via the process described above, and thus the resultant UP genres well match various contexts specific to the user unlike conventional genres created based on metadata.

OTHER EMBODIMENTS

The information processing apparatus according to the present invention has been described above with reference to the first to fifth embodiments. However, the present invention is not limited to these embodiments, but the present invention may be embodied in other various manners.

For example, the present invention may be applied to a single information processing apparatus or may be applied to an information processing system including a plurality of information processing apparatuses such as that shown in FIG. 34.

FIG. 34 shows an example of a functional configuration of the information processing system according to the present invention. In FIG. 34, similar parts to those in the information processing apparatus according to one of first to fifth embodiments (FIG. 1, FIG. 18, FIG. 26, or FIG. 30) are denoted by similar reference numerals.

As shown in FIG. 34, in this information system, a server 401 and a client 403 are connected to each other via a network 402. There is no restriction on the specific form of the network 402. For example, a cable network or a wireless network may be used.

First, the serer 401 is explained. The server 401 includes a high-capacity processor 411, a calculation result storage unit 412, and a communication unit 413.

Of various processes, processes that need a high-capacity processor, such as calculations of matrices, are performed by the high-capacity processor 411. More specifically, the high-capacity processor 411 performs processes corresponding to the process performed by the space/UPV generator 2 (FIG. 1 or 18), the process performed by the space generator 201 (FIG. 26), the process performed by the preference-specific UPV generator 202 (FIG. 26 or 30), and the process performed by the UPV/UP genre generator 302 (FIG. 30) (that is, the high-capacity processor 411 can be regarded as including blocks corresponding to those parts described above as shown in FIG. 34).

The calculation result storage unit 412 stores results of the calculations performed by the high-capacity processor 411 (and/or stores information necessary in the calculations). That is, the calculation result storage unit 412 corresponds to the CCV storage unit 4 (FIG. 1, 18, 26, or 30), the component matrix storage unit 5 (FIG. 1, 18, 26, or 30), the SVM model storage unit 303 (FIG. 26, or 30), and the UPV storage unit 6 (FIG. 1, 18, 26, or 30).

The communication unit 413 controls communication with the client 403 via the network 402. More specifically, if the communication unit 413 receives information to be used by the high-capacity processor 411 from the client 403 via the network 402, the communication unit 413 transfers the received information to the high-capacity processor 411. When the communication unit 413 receives content meta information associated with a content used by the user and context information indicating a context in which the content was used by the user, from the client 403 via the network 402, the communication unit 413 stores the received information in relation with each other in the calculation result storage unit 412. The communication unit 413 acquires information to be used by the client 403 from the calculation result storage unit 412 and transmits it to the client 403 via the network 402.

Now, the client 403 is explained. The client 403 includes the metadata acquisition unit 1, the lexical dictionary generator 7, the related information acquisition unit 8, and the recommender 9, described above, and further includes a recommendation calculation unit 421, a communication unit 422, a voice output unit 423, and a display 424.

The recommendation calculation unit 421 performs processes corresponding to the process performed by the matching unit 3 (FIG. 1), the process performed by projection matching unit 101 (FIG. 18), the process performed by the matching unit 204 (FIG. 26), and the process performed by the genre determination unit 304 (that is, the recommendation calculation unit 421 can be regarded as including blocks corresponding to those parts described above as shown in FIG. 34).

The communication unit 422 controls communication with the server 401 via the network 402. More specifically, when the communication unit 422 receives content data or EPG data from another information processing apparatus (not shown) via the network 402, the communication unit 422 transfers the received data to the metadata acquisition unit 1. The communication unit 422 also serves to transmit content meta information or context information supplied from the metadata acquisition unit 1 to the server 401 via the network 402. Furthermore, the communication unit 422 also serves to transfer various kinds of information received from the server 401 via the network 402 to the recommendation calculation unit 421, the lexical dictionary generator 7, or the information acquisition unit 8, as required.

When voice information is included in information (output from the recommender 9) indicating a content to be recommended, the voice output unit 423 outputs a voice corresponding to the voice information. When image information (still image or motion image information) is included in information (output from the recommender 9) indicating a content to be recommended, an image corresponding to the image information is displayed on the display 424.

The information processing system shown in FIG. 34 performs the following process.

As described above, the server 401 has the high-capacity processor 411 (having high power of performing complicated processing needed in the matrix calculation), and produces the user preference space UPS (approximate matrix CCM*) in which experiences of the user are collected.

More specifically, the client 403 transmits content meta information associated with a content used by a user and context information indicating a context in which the content was used by the user to the server 401 via the network 402.

When the amount of accumulated information (content meta information and context information) has become sufficient, the server 412 produces the matrix CCM described above and further produces the approximate matrix CCM* and the component matrices $U_k$, $\Sigma_k$, and $V_k$ by means of singular value decomposition and dimension reduction. The resultant matrices are stored in the calculation result storage unit 412 disposed in the server 401. The server 412 supplies, as required, information including the approximate matrix CCM*, the component matrices $U_k$, $\Sigma_k$, and $V_k$ of the approximate matrix CCM*, and/or user preference vectors UPV* produced from those matrices to the client 403 via the network 402.

Upon receiving the information, the client 403 performs a necessary process such as a matching process on the received information.

To select a content to be recommended, as described in the fourth and fifth embodiments, it is required to perform the prefiltering process by using the SVM or the like to detect candidate contents that match the preference of the user from all candidate contents. In the information processing system according to the present invention, although not shown in FIG. 34, the prefiltering process may be performed by the server 401. For example, the process according to the fourth embodiment may be performed as follows. The client 403 transmits content meta information associated with contents used by a user together with information indicating whether the contents are of interest to the user (that is, whether the contents are of positive or negative preference) to the server 401 via the network 402. In response, the server 401 determines separation planes (the SVM model indicating the preference of the user) by performing the SVM learning described above, and transmits the result to the client 403 via the network 402 as required.

In a case in which the user does not want to disclose his/her privacy, the calculation of the separation planes (SVM model) may be performed by the client 403 and the result may be transmitted to the server 401 via the network 402. In this case, filtering is performed by the server 401, and the server 401 transmits only content meta information that matches the preference of the user to the client 403 without transmitting content meta information of all candidate contents. This allows a reduction in amount of transmitted data and also allows a reduction in complexity of matching calculation performed by the client 403.

Note that all processes described above may be performed by the client 403. That is, any step of the processing sequence may be performed by the server 401 or the client 403 as long as the processing sequence is performed as a whole.

The sequence of processing steps described above may be performed by means of hardware or software.

Figure 35:
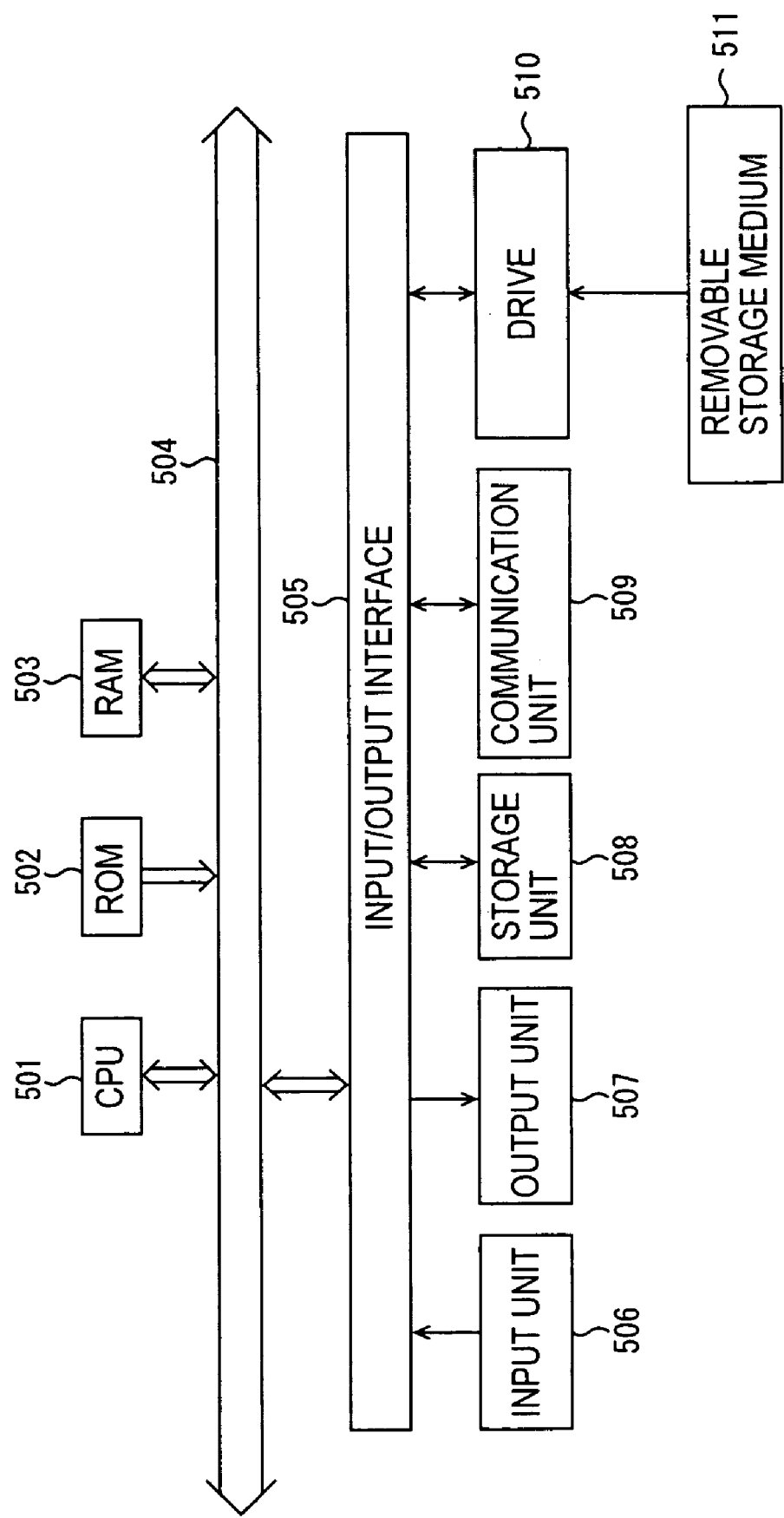
FIG. 35 is a block diagram showing an example of a hardware configuration of an information processing apparatus according to an embodiment of the present invention.

For example, the information processing apparatus according to one of the first to fifth embodiment (FIG. 1, 18, 26, or 30) or the server 401 or the client 403 shown in FIG. 34 may be implemented using software on a personal computer such as that shown in FIG. 35.

As shown in FIG. 35, a CPU (Central Processing Unit) 501 performs various processes in accordance with a program stored in a ROM (Read Only Memory) 502 or in accordance with a program loaded into a RAM (Random Access Memory) 503 from a storage unit 508. The RAM 503 is also used to store data used by the CPU 501 in the execution of various processes.

The CPU 501, the ROM 502, and the RAM 503 are connected to each other via a bus 504. The bus 504 is also connected to an input/output interface 505.

The input/output interface 505 is connected to an input unit 506 including a keyboard, a mouse, and/or the like, an output unit 507 such as a display, a storage unit 508 such as a hard disk, and a communication unit 509 including a modem, a terminal adapter, and/or the like. The communication unit 509 allows communication with another information processing apparatus (not shown) via a network such as the Internet.

Furthermore, the input/output interface 505 is also connected with a drive 510, as required. A removable storage medium 511 such as a magnetic disk, an optical disk, a magnetooptical disk, or a semiconductor memory is mounted on the drive 510 as required, and a computer program is read from the removable storage medium 511 and installed into the storage unit 508, as required.

When the processing sequence is executed by software, a program forming the software may be installed from a storage medium or via a network onto a computer which is provided as dedicated hardware or may be installed onto a general-purpose computer capable of performing various processes in accordance with various programs installed thereon.

A specific example of a storage medium usable for the above purpose is a removable storage medium 511 such as a magnetic disk (such as a floppy disk), an optical disk (such as a CD-ROM (Compact Disk-Read Only Memory) and a DVD (Digital Versatile Disk)), a magnetooptical disk (such as an MD (Mini-Disk, trademark)), and a semiconductor memory, shown in FIG. 35. A program may be stored on such a removable storage medium (in the form of a package medium) and may be supplied to a user separately from a computer. A program may also be supplied to a user by preinstalling it on a built-in ROM 502 or a storage unit 508 such as a hard disk disposed in the computer.

In the present description, the steps described in the program stored in the storage medium may be performed either in time sequence in accordance with the order described in the program or in a parallel or separate fashion.

Note that in the present description, the term "system" is used to describe an overall structure including a plurality of apparatuses or processing units.

What is claimed is:

1. An information processing apparatus comprising:
   modification means for acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1;
   generation means for generating a reference information set including N pieces of individual information for use as a reference in a calculation of similarity, from the M information sets each including N pieces of individual information modified by the modification means; and
   similarity calculation means for acquiring, as a comparative information set, a new information set including N individual information elements and calculating the similarity of the comparative information set with respect to the reference information set produced by the generation means.

2. An image processing apparatus according to claim 1, wherein the N pieces of individual information of each of the M information sets acquired via the modification means includes at least one or more pieces of content meta information indicating a particular content or a part of the particular content or indicating an attribute of the content and also includes at least one or more pieces of context information indicating an internal or external state in which the content was used by the user.

3. An image processing apparatus according to claim 2, wherein the context information includes a value or a normalized value thereof assigned as a weight to location information indicating a spatial location of the user.

4. An image processing apparatus according to claim 2, wherein the context information includes a value or a normalized value assigned as a weight to emotion information indicating emotion of the user.

5. An image processing apparatus according to claim 2, wherein the context information includes a value acquired by the user or by a sensor disposed in the vicinity of the user or a normalized value thereof.

6. An image processing apparatus according to claim 2, wherein the modification means includes:

vectorization means for, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information; and matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized, wherein the generation means produces a reference vector including N elements as the reference information set, based on the M columns of the second matrix produced by the matrix generation means; and the similarity calculation means produces a comparative vector including N elements from the comparative information set and calculates the similarity between the comparative vector and the reference vector produced by the generation means.

7. An image processing apparatus according to claim 6, wherein the generation means selects at least one or more columns of the M columns of the second matrix and adds together elements in each row over all selected columns thereby producing the reference vector.

8. An image processing apparatus according to claim 7, wherein the generation means selects, from the M columns of the second matrix, columns having high similarity to each other in terms of an element corresponding to context information and adds together elements in each row over all selected columns thereby producing the reference vector.

9. An image processing apparatus according to claim 7, wherein the generation means selects, from the M columns of the first matrix, columns having high similarity to each other in terms of an element corresponding to context information, and further selects, from the second matrix, columns corresponding to the selected columns of the first matrix and adds together elements in each row over all columns selected from the second matrix thereby producing the reference vector.

10. An image processing apparatus according to claim 6, wherein the generation means produces reference vectors by directly employing the respective M columns of the second matrix produced by the matrix generation means.

11. An image processing apparatus according to claim 6, wherein the vectorization means assigns the weight value to each of the N pieces of individual information such that the weight value is equal to the number of times that a corresponding piece of individual information appears in the content or equal to a normalized value thereof.

12. An image processing apparatus according to claim 6, wherein the vectorization means produces a feature vector whose elements are respectively given by products of the weight values assigned to the respective N pieces of individual information and N variable coefficients.

13. An image processing apparatus according to claim 6, wherein the similarity calculation means acquires, as the comparative information, an information set including N pieces of individual information associated with a new content, assigns a weight value to each of the N pieces of individual information, produces a comparative vector whose elements are given by the weight values assigned to the N pieces of individual information, and calculates the similarity between the comparative vector and the reference vector, and wherein the image processing apparatus further comprises presentation means for, if the similarity calculated by the similarity calculation means is equal to or higher than a threshold value, presenting the new content as a recommended content to the user.

14. An information processing apparatus according to claim 13, wherein when the presentation means presents the recommended content to the user, the presentation means also presents a reason for the recommendation based on the reference vector.

15. An information processing apparatus according to claim 13, wherein the similarity calculation means calculates the similarity by:

before the comparative vector is produced, further acquiring an information set including N pieces of individual information associated with a content being currently used by the user;

assigning weight values to the respective N pieces of individual information, and producing a feature vector whose elements are given by the weight values assigned to the respective N pieces of individual information for the content being currently used by the user;

calculating similarity between the produced feature vector and one or more reference vectors produced by the generation means;

producing a new reference vector based on a reference vector having similarity equal to or higher than a threshold value; and after the comparative vector is produced, calculating similarity between the reference vector and the comparative vector.

16. An information processing apparatus according to claim 13, wherein the similarity calculation means calculates the similarity by:

before the comparative vector is produced, further acquiring one or more pieces of context information indicating a current context in which the user is;

assigning weight values to the respective pieces of context information;

producing a current context feature vector whose elements corresponding to the respective pieces of context information are given by the assigned weight values and the other elements are given by 0;

calculating similarity between the current context feature vector and one or more reference vectors produced by the generation means;

producing a new reference vector based on a reference vector having similarity equal to or higher than a threshold value; and after the comparative vector is produced, calculating similarity between the reference vector and the comparative vector.

17. An image processing apparatus according to claim 6, wherein the matrix generation means produces the second matrix by:

decomposing the first matrix into the product of a first component matrix with N rows and N columns, a second component matrix with N rows and M columns, and a transpose of a third component matrix with M rows and M columns;

producing a fourth component matrix with N rows and K columns from the first component matrix (where K is an integer less than the rank of the first matrix), producing a fifth component matrix with K rows and K columns from the second component matrix, and producing a sixth component matrix with M rows and K columns from the third component matrix; and producing the second matrix given by the product of the fourth component matrix, the fifth component matrix, and the transpose of the sixth component matrix.

18. An information processing apparatus according to claim 17, wherein the similarity calculation means calculates the similarity by acquiring, as the comparative information, an information set including N pieces of individual information associated with a new content, assigning weight values to the respective N pieces of individual information, producing the comparative feature vector whose elements are given by the weight values assigned to the respective N pieces of individual information, converting the comparative vector and the reference vector into vectors whose dimension is reduced to K by multiplying the comparative vector and the reference vector by the transpose of the fourth component matrix from left, and calculating similarity between the comparative vector with dimensions reduced to K and the reference vector with dimensions reduced to K, and wherein the image processing apparatus further comprises presentation means for, if the similarity calculated by the similarity calculation means is equal to or higher than a threshold value, presenting the new content as a recommended content to the user.

19. An information processing apparatus according to claim 18, wherein when the presentation means presents the recommended content to the user, the presentation means also presents a reason for the recommendation based on the reference vector.

20. An information processing apparatus according to claim 18, wherein the similarity calculation means calculates the similarity by:

before the comparative vector is produced, further acquiring an information set including N pieces of individual information associated with a content being currently used by the user, assigning weight values to the respective N pieces of individual information, and producing a feature vector whose elements are given by the weight values assigned to the respective N pieces of individual information for the content being currently used by the user;

converting the produced feature vector and one or more reference vectors into vectors whose dimension is reduced to K by multiplying the feature vector and the one or more reference vectors by the transpose of the fourth component matrix from left;

calculating similarity between the feature vector with dimensions reduced to K and the one or more reference vectors with dimensions reduced to K, and producing a new K-dimensional reference vector based on a reference vector with reduced dimensions having similarity equal to or higher than a threshold value;

after the comparative vector is produced, converting the comparative vector into a vector whose dimension is reduced to K by multiplying the comparative vector by the transpose of the fourth component matrix from left, and calculating similarity between the new K-dimensional reference vector and the comparative vector with dimensions reduced to K.

21. An information processing apparatus according to claim 18, wherein the similarity calculation means calculates the similarity by:

before the comparative vector is produced, further acquiring one or more pieces of context information indicating a current context in which the user is, assigning weight values to the respective pieces of context information, and producing a current context feature vector whose elements corresponding to the respective pieces of context information are given by the assigned weight values and the other elements are given by 0;

converting the current context feature vector and one or more reference vectors produced by the generation means into vectors whose dimension is reduced to K by multiplying the current context feature vector and the one or more reference vectors by the transpose of the fourth component matrix from left;

calculating similarity between the current context feature vector with dimensions reduced to K and the one or more reference vectors with dimensions reduced to K, and producing a new K-dimensional reference vector based on a reference vector with reduced dimensions having similarity equal to or higher than a threshold value;

after the comparative vector is produced, converting the comparative vector into a vector whose dimension is reduced to K by multiplying the comparative vector by the transpose of the fourth component matrix from left; and calculating similarity between the new K-dimensional reference vector and the comparative vector with dimensions reduced to K.

22. An image processing apparatus according to claim 6, wherein each time a feature vector is produced, the vectorization means classifies the produced feature vector as either a positive-preference feature vector indicating a positive preference factor of the user or a negative-preference feature vector indicating a negative preference factor of the user.

23. An information processing apparatus according to claim 22, wherein the matrix generation means produces the second matrix using the M positive-preference feature vectors produced by the vectorization means.

24. An information processing apparatus according to claim 23, further comprising:

learning means for producing a classifier by learning classification using, as training data, columns of the second matrix produced by the matrix generation means; and classification means for making classification by acquiring an information set including N pieces of individual information associated with a new content, assigning weight values to the respective N pieces of individual information, producing a feature vector whose elements are given by the weight values assigned to the respective N pieces of individual information for the new content, and classifying, using the classifier produced by the learning means, the feature vector associated with the new content as either a positive-preference feature vector or a negative-preference feature vector.

25. An information processing apparatus according to claim 24, wherein the similarity calculation means employs as the comparative vector the feature vector classified by the classification means as the positive-preference feature vector, and calculates similarity between the comparative vector and the reference vector.

26. An information processing apparatus according to claim 23, further comprising registration means for selecting one or more particular elements of columns of the second matrix produced by the matrix generation means, and registers a word identifying each selected element as a word of interest to the user or a word of non-interest to the user in a personal dictionary of the user.

27. An information processing apparatus according to claim 23, wherein:

when M negative-preference feature vectors are produced by the vectorization means, the matrix generation means further produces a second matrix using the M negative-preference feature vectors;

the generation means produces a first reference vector from the second matrix produced by the matrix generation means based on the M positive-preference feature vectors produced by the matrix generation means, and further produces a second reference vector from the second matrix produced by the matrix generation means based on the negative-preference feature vectors; and the similarity calculation means calculates first similarity between the comparative vector and the first reference vector and also calculates second similarity between the comparative vector and the second reference vector.

28. An information processing apparatus according to claim 27, wherein:

the similarity calculation means acquires, as the comparative information, an information set including N pieces of individual information associated with a new content, assigns a weight value to each of the N pieces of individual information, produces a comparative vector whose elements are given by the weight values assigned to the N pieces of individual information, and calculates the first similarity and the second similarity; and the information processing apparatus further comprises presentation means for determining whether the new content is suitable as a content to be recommended based on the first similarity and the second similarity calculated by the similarity calculation means, and, if the new content is determined to be suitable, presenting the new content as the recommended content to the user.

29. An information processing apparatus according to claim 28, wherein when the presentation means presents the recommended content to the user, the presentation means also presents a reason for the recommendation based on the reference vector.

30. An information processing apparatus according to claim 28, wherein if the first similarity is equal to or higher than a first threshold value and the second similarity is lower than a second threshold value, the presentation means determines that the new content is suitable as the content to be recommended and presents the new content as the recommended content to the user.

31. An information processing apparatus according to claim 28, wherein if the first similarity is equal to or higher than the second similarity and the second similarity is lower than a threshold value, the presentation means determines that the new content is suitable as the content to be recommended and presents the new content as the recommended content to the user.

32. An information processing method comprising:

a modification step of acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1;

a generation step of generating a reference information set including N pieces of individual information for use as a reference in a calculation of similarity, from the M information sets each including N pieces of individual information modified in the modification step; and a similarity calculation step of acquiring, as a comparative information set, a new information set including N individual information elements and calculating the similarity of the comparative information set with respect to the reference information set produced in the generation step.

33. A program executed by a computer, comprising:

a modification step of acquiring M information sets each including N pieces of individual information and modifying at least partially the N pieces of individual information of each of the M information sets such that correlations among the N pieces of individual information are emphasized, where N is an integer equal to or greater than 2 and M is an integer equal to or greater than 1;

a generation step of generating a reference information set including N pieces of individual information for use as a reference in a calculation of similarity, from the M information sets each including N pieces of individual information modified in the modification step; and a similarity calculation step of acquiring, as a comparative information set, a new information set including N individual information elements and calculating the similarity of the comparative information set with respect to the reference information set produced in the generation step.

34. An information processing apparatus comprising:

vectorization means for, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information;

matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized;

reference vector generation means for producing a reference vector including N elements for use as a reference in calculation of similarity, from the M columns of the second matrix produced by the matrix generation means;

candidate acquisition means for, each time a reference vector is produced by the reference vector generation means, acquiring a candidate for a content to be recommended to a user, based on the reference vector;

similarity calculation means for acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced by the reference vector generation means; and presentation means for selecting, from candidate contents acquired by the candidate acquisition means, a candidate content corresponding to a reference vector whose similarity calculated by the similarity calculation means is equal to or higher than a threshold value and presenting the selected candidate content as a recommended content to the user.

35. An information processing method comprising:

a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information;

a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized;

a reference vector generation step of producing a reference vector including N elements for use as a reference in calculation of similarity, from the M columns of the second matrix produced in the matrix generation step;

a candidate acquisition step of, each time a reference vector is produced in the reference vector generation step, acquiring a candidate for a content to be recommended to a user, based on the reference vector;

a similarity calculation step of acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced in the reference vector generation step; and a presentation step of selecting, from candidate contents acquired in the candidate acquisition step, a candidate content corresponding to a reference vector whose similarity calculated by the similarity calculation means is equal to or higher than a threshold value and presenting the selected candidate content as a recommended content to the user.

36. A program executed by a computer, comprising:

a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information;

a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized;

a reference vector generation step of producing a reference vector including N elements for use as a reference in calculation of similarity, from the M columns of the second matrix produced in the matrix generation step;

a candidate acquisition step of, each time a reference vector is produced in the reference vector generation step, acquiring a candidate for a content to be recommended to a user, based on the reference vector;

a similarity calculation step of acquiring an information set including N pieces of individual information associated with a new content, assigning a weight value to each of the N pieces of individual information, produces a comparative vector whose elements are given by the weight values assigned to the N pieces of individual information, and calculates the similarity between the comparative vector and one or more reference vectors produced in the reference vector generation step; and a presentation step of selecting, from candidate contents acquired in the candidate acquisition step, a candidate content corresponding to a reference vector whose similarity calculated by the similarity calculation means is equal to or higher than a threshold value and presenting the selected candidate content as a recommended content to the user.

37. An information processing apparatus comprising:

vectorization means for, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information;

matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized; and genre setting means for calculating similarity among the M columns of the second matrix produced by the matrix generation means, classifying each of the M columns based on the calculated similarity, and setting each class obtained in the classification as a genre.

38. An information processing apparatus according to claim 37, wherein:

the genre setting means produces a classifier by learning classification for each genre by using columns belonging to the genre as training data; and the information processing apparatus further comprises classification means for making classification by acquiring an information set including N pieces of individual information associated with a new content, assigning weight values to the respective N pieces of individual information, producing a feature vector whose elements are given by the weight values assigned to the respective N pieces of individual information for the new content, and classifying, using the classifier produced by the genre setting means, the feature vector associated with the new content as being one of the genres set by the genre setting means.

39. An information processing apparatus according to claim 37, wherein each time the genre setting means sets one genre, the genre setting means selects an element from columns belonging to the genre and assigns a name to the genre based on the selected element.

40. An information processing method comprising:
- a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information;
- a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized; and
- a genre setting step of calculating similarity among the M columns of the second matrix produced in the matrix generation step, classifying each of the M columns based on the calculated similarity, and setting each class obtained in the classification as a genre.

41. A program executed by a computer, comprising:
- a vectorization step of, each time a content is used by a user, acquiring an information set including N pieces of individual information associated with the content, assigning a weight value to each of the N pieces of individual information, and producing as a feature vector for the content a vector whose elements are given by the weight values assigned to the respective N pieces of individual information;
- a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized; and
- a genre setting step of calculating similarity among the M columns of the second matrix produced in the matrix generation step, classifying each of the M columns based on the calculated similarity, and setting each class obtained in the classification as a genre.

42. An information processing system including a server and a client used by a user, comprising:
- vectorization means for, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information;
- matrix generation means for, when M feature vectors are produced by the vectorization means, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized;
- reference vector generation means for producing a reference vector including N elements for use as a reference in calculation of similarity, from the M columns of the second matrix produced by the matrix generation means; and
- similarity calculation means for calculating similarity by acquiring a new information set including N pieces of individual information, assigning weight values to the respective N pieces of individual information, producing a comparative feature vector whose elements are given by the weight values assigned to the respective N pieces of individual information, and calculating similarity between the comparative vector and the reference vector produced by the reference vector generation means, wherein
- of the vectorization means, the matrix generation means, the reference vector generation means, and the similarity calculation means, at least the matrix generation means is included in the server.

43. An information processing method for an information processing system including a server and a client used by a user, comprising:
- a vectorization step of, each time a content is used by the user, acquiring an information set including N pieces of individual information associated with the content, assigning a weight value to each of the N pieces of individual information, and producing as a feature vector for the content a vector whose elements are given by the weight values assigned to the respective N pieces of individual information;
- a matrix generation step of, when M feature vectors are produced in the vectorization step, producing a first matrix having N rows and M columns such that the elements thereof are given by the M feature vectors, performing an operation on the first matrix so as to convert the first matrix into a second matrix whose N×M elements are at least partially modified such that correlations among N row elements of each of the M columns are emphasized;
- a reference vector generation step of producing a reference vector including N elements for use as a reference in calculation of similarity, from the M columns of the second matrix produced in the matrix generation step; and
- a similarity calculation step of calculating similarity comprising the substeps of acquiring a new information set including N pieces of individual information, assigning weight values to the respective N pieces of individual information, producing a comparative feature vector whose elements are given by the weight values assigned to the respective N pieces of individual information, and calculating similarity between the comparative vector and the reference vector produced in the reference vector generation step, wherein
- of the vectorization step, the matrix generation step, the reference vector generation step, and the similarity calculation step, at least the matrix generation step is performed by the server.

* * * * *